United States Patent
Koyama et al.

(10) Patent No.: US 7,541,107 B2
(45) Date of Patent: *Jun. 2, 2009

(54) SOLID POLYELECTROLYTE, ASSEMBLY OF MEMBRANE AND ELECTRODES, AMD FUEL CELL

(75) Inventors: Tohru Koyama, Hitachi (JP); Toshiyuki Kobayashi, Tokai (JP); Kenji Yamaga, Hitachi (JP); Tomoichi Kamo, Tokai (JP); Kazutoshi Higashiyama, Naka (JP)

(73) Assignee: Hitachi, Ltd., Tokyo (JP)

( * ) Notice: Subject to any disclaimer, the term of this patent is extended or adjusted under 35 U.S.C. 154(b) by 721 days.

This patent is subject to a terminal disclaimer.

(21) Appl. No.: 10/921,268

(22) Filed: Aug. 19, 2004

(65) Prior Publication Data

US 2005/0031930 A1     Feb. 10, 2005

Related U.S. Application Data

(63) Continuation of application No. 10/208,094, filed on Jul. 31, 2002, now Pat. No. 6,893,764.

(30) Foreign Application Priority Data

Sep. 21, 2001    (JP) .............................. 2001-289493

(51) Int. Cl.
*H01M 8/10* (2006.01)
*H01M 6/18* (2006.01)
*B01J 49/00* (2006.01)
*C08J 5/20* (2006.01)

(52) U.S. Cl. ..................... 429/33; 429/314; 429/317; 521/27

(58) Field of Classification Search ................. None
See application file for complete search history.

(56) References Cited

U.S. PATENT DOCUMENTS 4,012,303 A    3/1977    D'Agostino et al.

(Continued)

FOREIGN PATENT DOCUMENTS

JP    62-269704    11/1987

(Continued)

OTHER PUBLICATIONS

Surface-Modified Polysulfone Hollow Fibers. II. Fibers Having $CH_2CH_2CH_2SO_3$ Segments and Immersed in HCl Solution; Akon Higuchi, et al.; Journal of Applied Polymer Science; 1990; pp. 709-717.

(Continued)

*Primary Examiner*—Patrick Ryan
*Assistant Examiner*—Muhammad Siddiquee
(74) *Attorney, Agent, or Firm*—Antonelli, Terry, Stout & Kraus, LLP.

(57) ABSTRACT

An object of the present invention is to provide a highly durable solid polymer electrolyte that has a deterioration resistance equal to or higher than that of the fluorine-containing solid polymer electrolytes or a deterioration resistance sufficient for practical purposes, and can be produced at a low cost. According to the present invention, there is provided a solid polymer electrolyte comprising a polyether ether sulfone that is used as an electrolyte and has sulfoalkyl groups bonded to its aromatic rings and represented by the general formula $-(CH_2)_n-SO_3H$.

18 Claims, 9 Drawing Sheets

U.S. PATENT DOCUMENTS

| | | | |
|---|---|---|---|
| 4,605,685 A | 8/1986 | Momose et al. | |
| 6,214,488 B1 | 4/2001 | Helmer-Metzmann et al. | |
| 6,245,881 B1 | 6/2001 | Faure et al. | |
| 6,248,469 B1 | 6/2001 | Formato et al. | |
| 6,277,514 B1 | 8/2001 | Ying et al. | |
| 6,425,944 B2 | 7/2002 | Faure et al. | |
| 6,670,065 B2 | 12/2003 | Koyama et al. | |
| 2002/0034677 A1* | 3/2002 | Kawahara | 429/44 |
| 2004/0033407 A1 | 2/2004 | Koyama et al. | |

FOREIGN PATENT DOCUMENTS

| | | |
|---|---|---|
| JP | A-6-93114 | 4/1994 |
| JP | A-9-102322 | 4/1997 |
| JP | A-9-245818 | 9/1997 |
| JP | A-10-503788 | 4/1998 |
| JP | A-11-67224 | 3/1999 |
| JP | A-11-116679 | 4/1999 |
| JP | A-11-510198 | 9/1999 |
| JP | A-11-515040 | 12/1999 |
| JP | A-2000-106203 | 4/2000 |
| WO | WO 01/64322 A1 | 9/2001 |

OTHER PUBLICATIONS

Surface-Modified Polysulfone Hollow Fibers; Akon Higuchi, et al.; Journal of Applied Polymer Science; 1988; pp. 1752-1767.

*New Polymer Experimental Science*, vol. 10, p. 310 (1995)(and partial English translation).

European Search Report issued Nov. 13, 2008, for Application No. EP 02 01 8238.

* cited by examiner

SOLID POLYELECTROLYTE, ASSEMBLY OF MEMBRANE AND ELECTRODES, AMD FUEL CELL

This application is a Continuation Application of prior application Ser. No. 10/208,094, filed Jul. 31, 2002, now U.S. Pat. No. 6,893,764 the contents of which are incorporated herein by reference in their entirety.

BACKGROUND OF THE INVENTION

The present invention relates to a solid polymer electrolyte membrane used in fuel cells, water electrolysis, hydrogen halide acid electrolysis, sodium chloride electrolysis, oxygen concentrators, moisture sensors, gas sensors, etc.; an electrocatalyst-coating solution; an assembly of said membrane and electrodes; and fuel cells.

Solid polymer electrolytes are solid polymeric materials having groups characteristic of the electrolytes (e.g. sulfonic acid groups) in the polymer chain. Since they bind strongly to specific ions or are selectively permeable to cations or anions, they are utilized for various purposes after being molded or shaped into particles, fiber or a membrane. For example, they are utilized in electrodialysis, diffuse dialysis, diaphragms for cell, etc.

In a reformed-gas fuel cell, an electromotive force is obtained by providing a pair of electrodes on both sides, respectively, of a proton-conductive solid polymer electrolyte membrane, supplying hydrogen gas obtained by reforming a low-molecular weight hydrocarbon such as methane, methanol or the like to one of the electrodes (a hydrogen electrode) as a fuel gas, and supplying oxygen gas or air to the other electrode (an oxygen electrode) as an oxidizing agent. In water electrolysis, hydrogen and oxygen are produced by electrolyzing water by the use of a solid polymer electrolyte membrane.

As a solid polymer electrolyte membrane for a fuel cell, water electrolysis or the like, fluorine-containing solid polymer electrolyte membranes represented by perfluorocarbon sulfonic acid solid polymer electrolyte membranes with a high proton conductivity known by their trade names of Nafion® (a registered trade name, mfd. by E.I. du Pont de Nemours & Co.), Aciplex® (a registered trade name, ASAHI Chemical Industry Co., Ltd.) and Flemion® (a trade name, mfd. by Asahi Glass Co., Ltd.) are used because of their excellent chemical stability.

In sodium chloride electrolysis, sodium hydroxide, chlorine and hydrogen are produced by electrolyzing an aqueous sodium chloride solution by the use of a solid polymer electrolyte membrane.

In this case, since the solid polymer electrolyte membrane is exposed to chlorine and an aqueous sodium hydroxide solution of high temperature and concentration, a hydrocarbon solid polymer electrolyte membrane having a low resistance to chlorine and the solution cannot be used. Therefore, as a solid polymer electrolyte membrane for sodium chloride electrolysis, there is generally used a perfluorocarbon sulfonic acid solid polymer electrolyte membrane which is resistant to chlorine and the aqueous sodium hydroxide solution of high temperature and concentration and has carboxylic acid groups introduced partly into the membrane surface in order to prevent the reverse diffusion of ions generated.

The fluorine-containing solid polymer electrolyte membranes represented by the perfluorocarbon sulfonic acid solid polymer electrolyte membranes have a very high chemical stability because of their C—F bonds and hence are used not only as a solid polymer electrolyte membrane for the above-mentioned fuel cell, water electrolysis or sodium chloride electrolysis but also as a solid polymer electrolyte membrane for hydrogen halide acid electrolysis. In addition, they are widely utilized in moisture sensors, gas sensors, oxygen concentrators, etc. by taking advantage of their proton conductivity.

The fluorine-containing solid polymer electrolyte membranes, however, are disadvantageous in that they are difficult to produce and are very expensive. Therefore, the fluorine-containing solid polymer electrolyte membranes are used for special purposes, for example, they are used in solid polymer membrane fuel cells for space research or military use. Thus, they have been difficult to use for livelihood in, for example, a solid polymer membrane fuel cell as a low-pollution power source for automobile.

As inexpensive solid polymer electrolyte membranes, the following aromatic hydrocarbon solid polymer electrolyte membranes, for example, have been proposed. JP-A-6-93114 has proposed a sulfonated polyether ether ketone membrane. JP-A-9-245818 and JP-A-11-116679 have proposed sulfonated polyether sulfone membranes. JP-A-11-67224 has proposed a sulfonated polyether ether sulfone membrane. JP-A-10-503788 has proposed a sulfonated acrylonitrile-butadiene-styrene polymer membrane. JP-A-11-510198 has proposed a sulfonated polysulfide membrane. JP-A-11-515040 has proposed a sulfonated polyphenylene membrane.

These aromatic hydrocarbon solid polymer electrolyte membranes obtained by sulfonating engineering plastics are advantageous in that their production is easier and entails a lower cost as compared with the production of the fluorine-containing solid polymer electrolyte membranes represented by Nafion®.

The sulfonated aromatic hydrocarbon solid polymer electrolyte membranes, however, are disadvantageous in that they tend to be deteriorated. According to JP-A-2000-106203, a solid polymer electrolyte membrane having an aromatic hydrocarbon skeleton tends to be deteriorated because hydrogen peroxide produced in a catalyst layer formed on the boundary surface between the solid polymer electrolyte membrane and an oxygen electrode oxidizes and deteriorates the aromatic hydrocarbon skeleton.

Therefore, for example, JP-9-102322 has proposed a sulfonated polystyrene-grafted ethylene-tetrafluoroethylene copolymer (ETFE) membrane comprising a main chain formed by the copolymerization of a fluorocarbon type vinyl monomer and a hydrocarbon type vinyl monomer and hydrocarbon side chains having sulfonic acid groups, as a solid polymer electrolyte membrane which has an oxidative-deterioration resistance equal to or higher than that of the fluorine-containing solid polymer electrolyte membranes and can be produced at a low cost.

The sulfonated polystyrene-grafted ETFE membrane disclosed in JP-A-9-102322 is reported as follows: it is inexpensive, has a sufficient strength as solid polymer electrolyte membrane for a fuel cell, and can be improved in electric conductivity by increasing the amount of sulfonic acid groups introduced.

However, in the sulfonic acid type polystyrene-grafted ETFE membrane, the main chain portion formed by the copolymerization of a fluorinated vinyl monomer and a vinyl monomer has a high resistance to oxidative deterioration, but the side chain portion having sulfonic acid groups introduced thereinto is an aromatic hydrocarbon polymer which is subject to oxidative deterioration. Therefore, said membrane is disadvantageous in that when the membrane is used in a fuel cell, the resistance to oxidative deterioration of the whole membrane is not sufficient, resulting in a low durability.

U.S. Pat. No. 4,012,303 and U.S. Pat. No. 4,605,685 have proposed sulfonic acid type poly(trifluorostyrene)-grafted ETFE membranes obtained by graft-copolymerizing α,β,β-trifluorostyrene onto a membrane produced by the copolymerization of a fluorinated vinyl monomer and a vinyl monomer, and introducing sulfonic acid groups into the α,β,β-trifluorostyrene units to obtain a solid polymer electrolyte membrane.

These membranes are obtained by using α,β,β-trifluorostyrene prepared by partial fluorination of styrene, in place of styrene on the assumption that the chemical stability of the above-mentioned polystyrene side chain portion having sulfonic acid groups introduced thereinto is not sufficient. The synthesis of α,β,β-trifluorostyrene as a starting material for the side chain portion, however, is difficult. Therefore, when said membranes are used as a solid polymer electrolyte membrane for a fuel cell, there is a cost problem as in the case of the above-mentioned Nafion®.

Moreover, α,β,β-trifluorostyrene is disadvantageous in that because of its low polymerizability, the amount of α,β,β-trifluorostyrene introducible as grafted side chains is small, so that the resulting membrane has a low electric conductivity.

SUMMARY OF THE INVENTION

An object of the present invention is to provide a highly durable solid polymer electrolyte which has a deterioration resistance equal to or higher than that of the fluorine-containing solid polymer electrolytes or a deterioration resistance sufficient for practical purposes, and can be produced at a low cost.

The present inventors investigated in detail the mechanism of deterioration of a solid polymer electrolyte membrane. Consequently, the following was found: in an aqueous solution, an aromatic sulfonic acid having one or more sulfonic acid groups directly bonded to the aromatic ring is in such a state that the aromatic ring and sulfuric acid are in dissociation equilibrium; and with a decrease of the sulfuric acid concentration and a rise of the temperature, the sulfonic acid group(s) is more liable to be released from the aromatic sulfonic acid.

That is, it was found that shortening of the lifetime of a fuel cell using an aromatic hydrocarbon solid polymer electrolyte membrane is caused not by the oxidative deterioration of the membrane itself which has been regarded as a cause, but by the following phenomenon: under conditions for the fuel cell, the sulfuric acid concentration is low, so that the sulfonic acid groups are released from the aromatic ring, resulting in a lowered ionic conductance.

For the achievement of the above object, the highly durable solid polymer electrolyte of the present invention is characterized by comprising a polyether ether sulfone having sulfonic acid groups each introduced thereinto through an alkylene group as shown in the formula [1]:

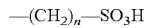

—(CH$_2$)$_n$—SO$_3$H    [1]

wherein n is an integer of 1 to 6. Thus, it becomes possible to obtain a highly durable solid polymer electrolyte which has a durability equal to or higher than that of the fluorine-containing solid polymer electrolytes or a durability sufficient for practical purposes, and is inexpensive.

A solid polymer electrolyte having sulfonic acid groups introduced thereinto through alkylene groups is advantageous in that its ion electric conductivity is higher than that of a solid polymer electrolyte having sulfonic acid groups introduced thereinto without an alkylene group, when these solid polymer electrolytes have the same ion-exchange group equivalent weight. It is conjectured that the higher ion electric conductivity is concerned with the fact that the sulfonic acid groups introduced through alkylene groups are more mobile than the sulfonic acid groups introduced without an alkylene group.

A solid polymer electrolyte obtained when n in the above formula [1] is 3 to 6 is preferable because its ionic conductance is higher than that of a solid polymer electrolyte obtained when n is 1 or 2. The reason for this phenomenon is guessed as follows: when the value of n is increased, SO$_3$H becomes mobile, so that the resulting solid polymer electrolyte tends to have a cohesion structure or an ion channel structure.

A characteristic of the present invention is that a polyether ether sulfone having sulfoalkyl groups of the above formula [1] bonded thereto is used as an electrolyte.

Another characteristic of the present invention is that there is used as an electrolyte a polyether ether sulfone having sulfonic acid groups bonded thereto through alkylene groups which is represented by any of the formulas [2] to [9] exhibited hereinafter.

Further another characteristic of the present invention is that the above-mentioned sulfonic acid groups are bonded so that the sulfonic acid group equivalent weight may be 530 to 970 g/equivalent.

Still another characteristic of the present invention is that the above-mentioned electrolyte is used as an electrolyte membrane.

Still another characteristic of the present invention is an electrocatalyst-coating solution containing the above-mentioned solid polymer electrolyte.

Still another characteristic of the present invention is a membrane-electrodes assembly comprising the above-mentioned solid polymer electrolyte membrane and a pair of electrodes, i.e., an oxygen electrode and a hydrogen electrode which are located on both sides, respectively, of said solid polymer electrolyte membrane.

Still another characteristic of the present invention is a membrane-electrodes assembly comprising a solid polymer electrolyte membrane obtained by the use of a polyether ether sulfone having sulfonic acid groups bonded thereto through alkylene groups which is represented by any of the formulas [1] to [9] exhibited hereinafter, said solid polymer electrolyte membrane being coated with the above-mentioned electrocatalyst-coating solution, and a pair of electrodes, i.e., an oxygen electrode and a hydrogen electrode which are located on both sides, respectively, of said solid polymer electrolyte membrane.

Still another characteristic of the present invention is a membrane-electrodes assembly wherein the above-mentioned electrocatalyst-coating solution is Nafion (a perfluorocarbon sulfonic acid solid polymer electrolyte solution, a registered trade name, mfd. by E.I. du Pont de Nemours & Co.).

Still another characteristic of the present invention is a solid polymer electrolyte fuel cell comprising a membrane-electrodes assembly comprising the above-mentioned solid polymer electrolyte membrane and a pair of electrodes, i.e., an oxygen electrode and a hydrogen electrode which are located on both sides, respectively, of said solid polymer electrolyte membrane; a pair of supporting current collectors provided on both sides, respectively, of said membrane-electrodes assembly; and separators located at the peripheries of said supporting current collectors, respectively.

Other objects, features and advantages of the invention will become apparent from the following description of the embodiments of the invention taken in conjunction with the accompanying drawings.

DESCRIPTION OF REFERENCE NUMERALS

Figure 1:
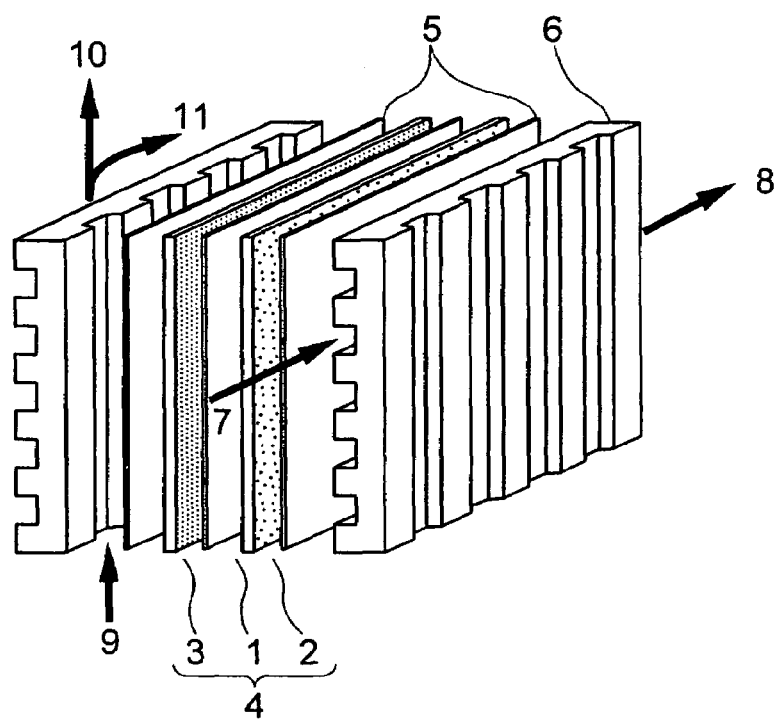
FIG. 1 is a schematic perspective view showing the structure of a single cell for the solid polymer electrolyte fuel cell of the present invention produced in Example 1.

1 - - - solid polymer electrolyte membrane, 2 - - - air electrode, 3 - - - oxygen electrode, 4 - - - membrane-electrodes assembly, 5 - - - supporting current collector, 6 - - - separator, 7 - - - air, 8 - - - air+water, 9 - - - hydrogen+water, 10 - - - residual hydrogen, 11 - - - water.

DETAILED DESCRIPTION OF THE INVENTION

The present inventive polyether ether sulfone solid polymer electrolyte having sulfonic acid groups introduced thereinto through alkylene groups is preferably a polyether ether sulfone solid polymer electrolyte having sulfonic acid groups introduced thereinto through alkylene groups which is represented by the formula [2]:

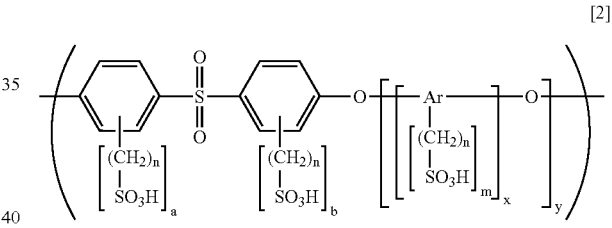

wherein n is an integer of 1 to 6, each of m, a and b is an integer of 0 to 4, provided that m, a and b are not 0 at the same time, x is an integer of 1 to 3, y is an integer of 1 to 5, and Ar is an aromatic residue.

Specific examples of the solid polymer electrolyte of the present invention are polyether ether sulfone solid polymer electrolytes having sulfonic acid groups introduced thereinto through alkylene groups which are represented by the formulas [3] to [8]:

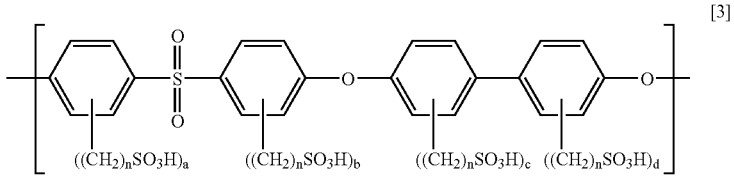

wherein n is an integer of 1 to 6, and each of a, b, c and d is an integer of 0 to 4, provided that b, c and d are not 0 at the same time.

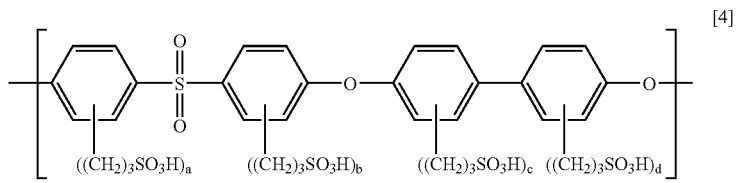

wherein each of a, b, c and d is an integer of 0 to 4, provided that a, b, c and d are not 0 at the same time.

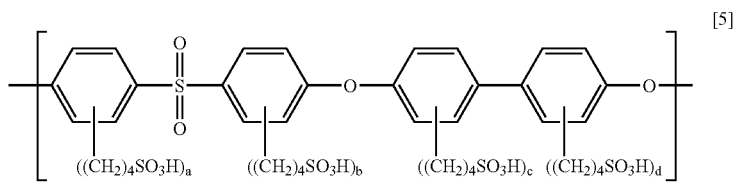

wherein each of a, b, c and d is an integer of 0 to 4, provided that a, b, c and d are not 0 at the same time.

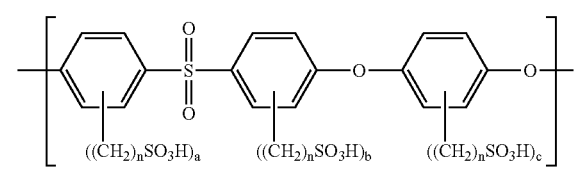

wherein n is an integer of 1 to 6, and each of a, b and c is an integer of 0 to 4, provided that a, b and c are not 0 at the same time.

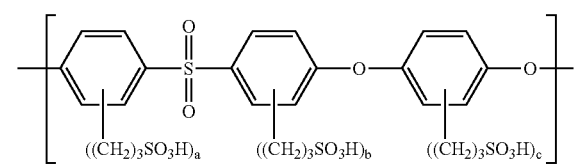

wherein each of a, b and c is an integer of 0 to 4, provided that a, b and c are not 0 at the same time.

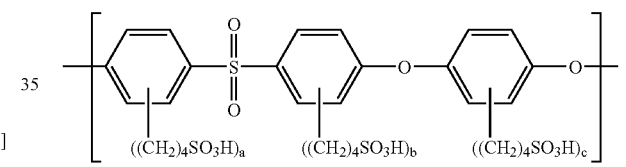

wherein each of a, b and c is an integer of 0 to 4, provided that a, b and c are not 0 at the same time.

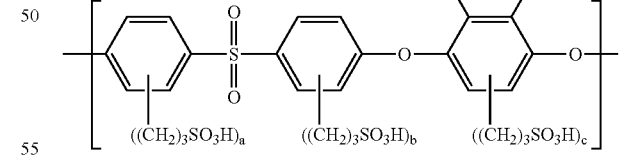

wherein each of a, b, c and d is an integer of 0 to 4, provided that a, b, c and d are not 0 at the same time.

A method for introducing sulfonic acid groups into a polyether ether sulfone or its polymer alloy through alkylene groups is not particularly limited. A specific example of the introduction method is a method of introducing a sulfonic acid group into an aromatic ring by the use of the sultone shown in the scheme (I) as described in J. Amer. Chem. Soc., 76, 5357-5360 (1954):

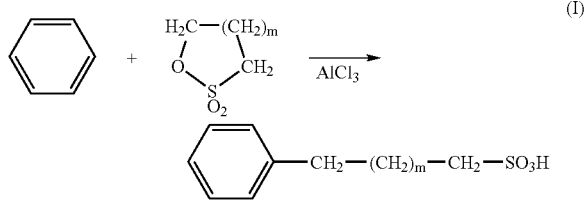

(I)

wherein m is 1 or 2.

Other specific examples of the introduction method are a method of replacing a hydrogen atom in an aromatic ring with a lithium atom, replacing the lithium atom with a halogenoalkylene group by the use of a dihalogenoalkane, and converting the halogenoalkylene group to introduce a sulfonic acid group through an alkylene group; and a method of introducing a halogenobutyl group into the substituted aromatic ring having the lithium atom as the substituent, by the use of a tetramethylenehalogenium ion and converting the halogen to a sulfonic acid group.

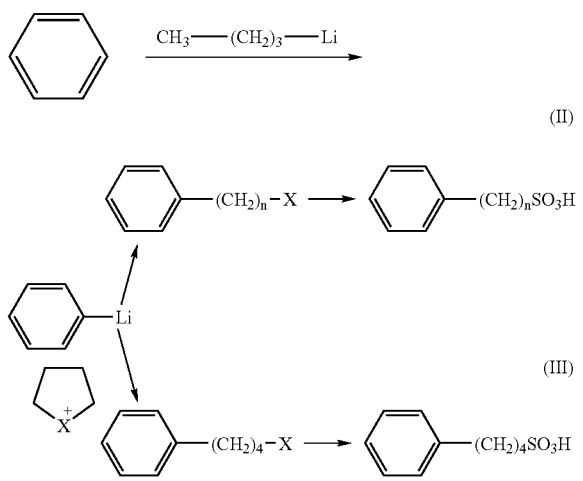

wherein n is an integer of 1 to 6, and x is a halogen atom.

All the reactions for introducing a sulfonic acid group into an aromatic ring through an alkylene group are electrophilic reactions with the aromatic ring. A polyether ether sulfone having the structure according to the present invention in which the electron density of aromatic rings is high is desirable because the reaction takes place under relatively mild conditions as compared with other engineering plastics.

Although a method for introducing sulfonic acid groups into a polyether ether sulfone through alkylene groups is not particularly limited, a method involving a small number of synthesis steps, such as the method shown by the above scheme (I) is preferable from the viewpoint of cost.

The solid polymer electrolyte used in the present invention is a polymer having sulfonic acid groups introduced thereinto through alkylene groups which has an ion-exchange group equivalent weight of 250 to 2,500 g/equivalent. The ion-exchange group equivalent weight is preferably 300 to 1,500 g/equivalent, more preferably 530 to 970 g/equivalent. When the ion-exchange group equivalent weight is more than 2,500 g/equivalent, the output capability is undesirably deteriorated in some cases. When the ion-exchange group equivalent weight is less than 250 g/equivalent, the water resistance of the polymer is undesirably deteriorated.

The term "ion-exchange group equivalent weight" used herein means the molecular weight of the polymer having sulfonic acid groups introduced thereinto through alkylene groups, per unit equivalent of the sulfonic acid groups introduced through the alkylene groups. The smaller the ion-exchange group equivalent weight, the higher the degree of introduction of the sulfonic acid groups introduced through the alkylene groups. The ion-exchange group equivalent weight can be measured by $^1$H-NMR spectroscopy, elemental analysis, the acid-base titration disclosed in the specification of JP-B-1-52866, nonaqueous acid-base titration (normal solution: a solution of potassium methoxide in benzene-methanol) or the like.

As to a method for controlling the ion-exchange group equivalent weight of said solid polymer electrolyte having sulfonic acid groups introduced thereinto through alkylene groups, at 250 to 2,500 g/equivalent, a polymer that has sulfonic acid groups introduced thereinto through alkylene groups and has a desirable ion-exchange group equivalent weight can be obtained by varying the blending ratio of an aromatic hydrocarbon polymer to a sulfoalkylating agent, the reaction temperature, the reaction time, a solvent for reaction, etc.

When used in a fuel cell, the solid polymer electrolyte used in the present invention is usually used in the form of a membrane. A method for forming the polymer having sulfonic acid groups introduced thereinto through alkylene groups into the membrane is not particularly limited. As the method, there can be adopted, for example, a method of forming a film from the polymer in a solution state (a solution cast method) and a method of forming a film from the polymer in a molten state (a melt pressing method or a melt extrusion method). Specifically, in the former method, a film is formed by applying a polymer solution on a glass plate by casting, and removing the solvent.

The solvent used for the film formation is not particularly limited and may be any solvent so long as it permits dissolution of the polymer therein and can be removed after the application. As the solvent, there can be suitably used aprotic polar solvents such as N,N-dimethylformamide, N,N-dimethylacetamide, N-methyl-2-pyrrolidone, dimethyl sulfoxide etc.; alkylene glycol monoalkyl ethers such as ethylene glycol monomethyl ether, ethylene glycol monoethyl ether, propylene glycol monomethyl ether, propylene glycol monoethyl ether, etc.; halogen-containing solvents such as dichloromethane, trichloroethane, etc.; and alcohols such as 1-propyl alcohol, t-butyl alcohol, etc.

Although the thickness of the solid polymer electrolyte membrane is not particularly limited, it is preferably 10 to 200 μm, in particular, 30 to 100 μm. For attaining a film strength sufficient for practical purposes, the thickness is preferably more than 10 μm. For reducing the resistance of the membrane, namely, improving the power-generating capability, the thickness is preferably less than 200 μm. When the solution cast method is adopted, the film thickness can be controlled by adjusting the concentration of the solution or the coating thickness on a substrate. When a film is formed from the polymer in a molten state, the film thickness can be controlled by stretching a film with a predetermined thickness obtained by the melt pressing method or melt extrusion method, by a predetermined factor.

In the production of the solid polymer electrolyte of the present invention, additives (e.g. plasticizers, stabilizers and mold release agents) used in conventional polymers may be used so long as the object of the present invention is not affected.

When the solid polymer electrolyte membrane is used in a fuel cell, electrodes used in an assembly of the membrane and the electrodes are composed of an electroconductive material supporting thereon fine particles of a catalyst metal and may, if necessary, contain water repellents and binders. A layer composed of an electroconductive material supporting no catalyst thereon and optionally a repellent and a binder may be formed on the outer surface of a catalyst layer.

As the catalyst metal used in the electrodes, any metal may be used so long as it accelerates the oxidation of hydrogen and the reduction of oxygen. The catalyst metal includes, for example, platinum, gold, silver, palladium, iridium, rhodium, ruthenium, iron, cobalt, nickel, chromium, tungsten, manganese, vanadium, and alloys thereof.

Of these catalysts, in particular, platinum is often used. The particle size of the metal used as the catalyst is usually 10 to 300 angstrom. The adhesion of such a catalyst to a carrier such as carbon reduces the amount of the catalyst used and hence is advantageous from the viewpoint of cost. The amount of the catalyst supported is preferably 0.01 to 10 mg/cm$^2$ in the electrodes formed.

As the electroconductive material, any material may be used so long as it is an electronically conductive substance. The electroconductive material includes, for example, various metals and carbon materials.

The carbon materials include, for example, carbon blacks (e.g. furnace black, channel black and acetylene black), activated carbon, and graphite. These may be used singly or as a mixture thereof.

As the water repellent, carbon fluoride, for example, is used. As the binder, the electrocatalyst-coating solution of the present invention is preferably used as it is from the viewpoint of adhesion, though other various resins may be used. As these resins, water-repellent fluorine-containing resins are preferable, and water-repellent fluorine-containing resins excellent particularly in heat resistance and oxidation resistance are more preferable. Such resins include, for example, sulfonated polytetrafluoroethylene, sulfonated tetrafluoroethylene-perfluoroalkyl vinyl ether copolymers, and sulfonated tetrafluoroethylene-hexafluoropropylene copolymers.

When the solid polymer electrolyte membrane is used in a fuel cell, a process for producing an assembly of the membrane and electrodes is not particularly limited and a well-known process can be adopted. As a process for producing the membrane-electrodes assembly, there is, for example, the following process. Pt catalyst powder supported on carbon is mixed with a polytetrafluoroethylene suspension, and the mixture is applied on carbon paper and heat-treated to form a catalyst layer. Then, a solution of the same solid polymer electrolyte as that constituting the solid polymer electrolyte membrane is applied on the catalyst layer, and the thus treated catalyst layer and the solid polymer electrolyte membrane are united in a body by hot pressing.

In addition, there are, for example, a process of previously coating Pt catalyst powder with a solution of the same solid polymer electrolyte as that constituting the solid polymer electrolyte membrane, a process of applying a catalyst paste on the solid polymer electrolyte membrane, a process of conducting electroless plating on the solid polymer electrolyte membrane to form electrodes, and a process of adsorbing complex ions of a metal of the platinum group on the solid polymer electrolyte membrane and then reducing the same.

A solid polymer electrolyte fuel cell is constructed as follows. A packing material (a supporting current collector) of thin carbon paper is adhered to each side of the assembly of the solid polymer electrolyte membrane and electrodes produced in the manner described above. An electroconductive separator (a bipolar plate) capable of serving as a separator between electrode chambers and passageways for gas supply to the electrodes is provided on the outer surface of each packing material to obtain a single cell. A plurality of such single cells are laminated, with cooling plates or the like inserted between them, to obtain the solid polymer electrolyte fuel cell. The fuel cell is preferably operated at a high temperature because the high-temperature operation enhances the catalytic activity of the electrodes and reduces the electrode overvoltage. However, since the solid polymer electrolyte membrane does not function without water, the fuel cell has to be operated at a temperature at which water control is possible. A preferable range of the operating temperature for the fuel cell is a range of room temperature to 100° C.

DESCRIPTION OF PREFERRED EMBODIMENT

The present invention is illustrated in further detail with the examples described below. Conditions for measuring each physical property are as follows.

(1) Ion-exchange Group Equivalent Weight

A certain amount (a: gram) of a polymer having sulfonic acid groups introduced thereinto through alkylene groups which was to be subjected to measurement was accurately weighed into a closable glass container, and an excess amount of an aqueous calcium chloride solution was added thereto and stirred overnight. Hydrogen chloride produced in the system was titrated (b: ml) with a 0.1N aqueous sodium hydroxide standard solution (f: titer) by using phenolphthalein as an indicator. The ion-exchange group equivalent weight (g/equivalent) was calculated by the following equation:

$$\text{Ion-exchange group equivalent weight} = (1000 \times a)/(0.1 \times b \times f) \qquad \text{[Expression 1]}$$

(2) Evaluation of the Output Capability of a Single Cell for Fuel Cell

An assembly of a solid polymer electrolyte membrane and electrodes was incorporated into a cell for evaluation and the output capability of the resulting single cell for fuel cell was evaluated.

Hydrogen and oxygen were used as reactive gases. Each of them was wetted by passage through a water bubbler at 23° C. at a pressure of 1 atmosphere and then supplied to the cell for evaluation. The gas flow rates were as follows: hydrogen 60 ml/min and oxygen 40 ml/min. The cell temperature was 70° C. The output capability of the fuel cell was evaluated with a H201B charge and discharge apparatus (mfd. by Hokuto Denko Co., Ltd.).

EXAMPLE 1

(1) Synthesis of a sulfopropylated Poly(1,4-biphenylene ether ether sulfone)

The inner atmosphere of a 500-ml four-necked round bottom flask equipped with a stirrer, a thermometer and a reflux condenser having a calcium chloride tube connected thereto was replaced with nitrogen. Then, 6.00 g (0.0155 mol) of a poly(1,4-biphenylene ether ether sulfone) [($-C_6H_4$-4-$SO_2C_6H_4$-4-$OC_6H_4$-4-$C_6H_4$-4-$O-$)$_n$] dried by its maintenance at 110° C. for 10 hours and 150 ml of dehydrated chloroform for synthesis were placed in the flask and maintained at 60° C. for about 1 hour to effect dissolution. To the resulting solution was added 2.83 g (0.0232 mol) of propanesultone.

Subsequently, 3.10 g (0.0232 mol) of anhydrous aluminum chloride was added thereto with stirring over a period of about 30 minutes. After completion of the addition of anhydrous aluminum chloride, the resulting mixture was stirred with heating at 50° C. for 15 hours. The precipitate was filtered, washed with 150 ml of chloroform and then dried under reduced pressure. The dried precipitate was suspended in 250 ml of water, finely ground in a mixer and then filtered. This procedure was repeated four times, followed by thorough washing with water, and the water-insoluble finely ground substance thus obtained was dried at 90° C. under reduced pressure.

The dried substance was subjected to $^1$H-NMR to find that new peaks due to a —$CH_2CH_2CH_2SO_3H$ group were present at 2.2 ppm and 3.8 ppm. This fact confirmed the introduction of sulfopropyl groups. The sulfonic acid equivalent weight of the sulfopropylated poly(1,4-biphenylene ether ether sulfone) solid polymer electrolyte I thus obtained was 1,100 g/equivalent.

Since the sulfopropylated poly(1,4-biphenylene ether ether sulfone) solid polymer electrolyte I can be produced through one step by using the poly(1,4-biphenylene ether ether sulfone), a relatively inexpensive commercial engineering plastic, as a starting material, the cost of production thereof is as low as less than one-fiftieth that of a perfluorocarbon sulfonic acid solid polymer electrolyte (Nafion 117) produced through five steps by using an expensive starting material.

The sulfopropylated poly(1,4-biphenylene ether ether sulfone) solid polymer electrolyte I is advantageous from the viewpoint of cost because it can be produced through one step and hence can be synthesized at a lower cost as compared with a sulfomethylated poly(1,4-biphenylene ether ether sulfone) solid polymer electrolyte VII and a sulfohexamethylated poly(1,4-biphenylene ether ether sulfone) solid polymer electrolyte VIII which are produced through two steps as described hereinafter in Examples 11 and 12.

In a Teflon-coated closed container made of SUS, 1.0 g of the obtained sulfopropylated poly(1,4-biphenylene ether ether sulfone) solid polymer electrolyte I and 20 ml of ion-exchanged water were maintained at 120° C. for 2 weeks. After cooling and thorough washing with water, the ion-exchange group equivalent weight of the sulfopropylated poly(1,4-biphenylene ether ether sulfone) solid polymer electrolyte I was measured.

As a result, it was found that the ion-exchange group equivalent weight of the sulfopropylated poly(1,4-biphenylene ether ether sulfone) solid polymer electrolyte I was 1,100 g/equivalent, the same value as the initial value, namely, the solid polymer electrolyte I was stable like the expensive perfluorocarbon sulfonic acid solid polymer electrolyte (Nafion 117).

On the other hand, as described hereinafter in Comparative Example 1, (1), the ion-exchange group equivalent weight of an inexpensive sulfonated poly(1,4-biphenylene ether ether sulfone) solid polymer electrolyte II was increased to 1,200 g/equivalent from its initial value of 650 g/equivalent under the same conditions of hydrolysis by heating as above, namely, sulfonic acid groups were released from the solid polymer electrolyte II.

Thus, unlike the inexpensive sulfonated poly(1,4-biphenylene ether ether sulfone) solid polymer electrolyte II described hereinafter in Comparative Example 1, (1), the inexpensive sulfopropylated poly(1,4-biphenylene ether ether sulfone) solid polymer electrolyte I was stable like the expensive perfluorocarbon sulfonic acid solid polymer electrolyte (Nafion 117) and was excellent in both cost and resistance to hydrolysis (durability).

(2) Formation of a Solid Polymer Electrolyte Membrane

The solid polymer electrolyte I obtained in the above item (1) was dissolved in a N,N-dimethylformamide-cyclohexanone-methyl ethyl ketone mixed solvent (volume ratio; 20:80:25) to a concentration of 5 wt %. The resulting solution was spread on a glass plate by spin coating, air-dried and then dried in vacuo at 80° C. to form a solid polymer electrolyte membrane I of 25 µm in thickness. The ion electric conductivity of the obtained solid polymer electrolyte membrane I was 1 S/cm.

In a Teflon-coated closed container made of SUS, the aforesaid solid polymer electrolyte membrane I and 20 ml of ion-exchanged water were maintained at 120° C. for 2 weeks. After the maintenance, the ion electric conductivity of the solid polymer electrolyte membrane I was the same as its initial value like that of a perfluorocarbon sulfonic acid solid polymer electrolyte membrane (Nafion 117) produced at a high cost, and the solid polymer electrolyte membrane I was firm.

On the other hand, as described hereinafter in Comparative Example 1, (2), a relatively inexpensive sulfonated poly(1,4-biphenylene ether ether sulfone) solid polymer electrolyte membrane II was broken to tatters under the same conditions of hydrolysis by heating as above.

Thus, unlike the sulfonated poly(1,4-biphenylene ether ether sulfone) solid polymer electrolyte membrane II described hereinafter in Comparative Example 1, the inexpensive sulfopropylated poly(1,4-biphenylene ether ether sulfone) solid polymer electrolyte membrane I was stable like the expensive perfluorocarbon sulfonic acid solid polymer electrolyte membrane (Nafion 117) and was excellent in both cost and resistance to hydrolysis (durability).

(3) Production of Electrocatalyst-Coating Solutions and Membrane-electrodes Assemblies The same solution as in the above item (2), i.e., a 5 wt % solution of the solid polymer electrolyte I in the N,N-dimethylformamide-cyclohexanone-methyl ethyl ketone mixed solvent was added to platinum-supporting carbon (content of platinum supported: 40 wt %), so that the weight ratio of platinum catalyst to the solid polymer electrolyte might be 2:1. The platinum-supporting carbon was uniformly dispersed in the solution to prepare a paste (an electrocatalyst-coating solution I).

In a Teflon-coated closed container made of SUS, 1.0 g of the aforesaid electrocatalyst-coating solution I and 20 ml of ion-exchanged water were maintained at 120° C. for 2 weeks. After cooling, the solvent was vaporized and the resulting solid was washed with water. Then, the ion-exchange group equivalent weight of the electrocatalyst-coating solution I after the maintenance was measured. As a result, it was found that the ion-exchange group equivalent weight of said solution I was 1,100 g/equivalent, the same value as the initial value, namely, the solution I was stable like an expensive perfluorocarbon sulfonic acid (Nafion 117) electrocatalyst-coating solution.

On the other hand, as described hereinafter in Comparative Example 1, (2), the ion-exchange group equivalent weight of an electrocatalyst-coating solution II was increased to 1,200 g/equivalent from its initial value of 650 g/equivalent under the same conditions of hydrolysis by heating as above, namely, sulfonic acid groups were released.

Thus, unlike the inexpensive electrocatalyst-coating solution II described hereinafter in Comparative Example 1, (2), the inexpensive electrocatalyst-coating solution I was stable like the expensive perfluorocarbon sulfonic acid (Nafion 117) electrocatalyst-coating solution and was excellent in both cost and resistance to hydrolysis (durability).

The aforesaid electrocatalyst-coating solution I was applied on both sides of the solid polymer electrolyte membrane I obtained in the above item (2), and was dried to produce a membrane-electrodes assembly I having an amount of platinum supported of 0.25 mg/cm$^2$.

The electrocatalyst-coating solution II described hereinafter in Comparative Example 1, (2) was applied on both sides of the same solid polymer electrolyte membrane I as that obtained in the above item (2), and was dried to produce a membrane-electrodes assembly I' having an amount of platinum supported of 0.25 mg/cm$^2$.

A 5 wt % solution of the perfluorocarbon sulfonic acid solid polymer electrolyte (Nafion 117) in an alcohol-water mixed solvent was added to platinum-supporting carbon (content of platinum supported: 40 wt %), so that the weight ratio of platinum catalyst to the solid polymer electrolyte might be 2:1. The platinum-supporting carbon was uniformly dispersed in the solution to prepare a paste (an electrocatalyst-coating solution). This electrocatalyst-coating solution was applied on both sides of the same solid polymer electrolyte membrane I as that obtained in the above item (2), and was dried to produce a membrane-electrodes assembly I" having an amount of platinum supported of 0.25 mg/cm$^2$.

In a Teflon-coated closed container made of SUS, the aforesaid membrane-electrodes assembly I obtained and 20 ml of ion-exchanged water were maintained at 120° C. for 2 weeks. The membrane-electrodes assembly I after the maintenance was not different from that before the maintenance like a membrane-electrodes assembly produced at a high cost by using the perfluorocarbon sulfonic acid solid polymer electrolyte membrane (Nafion 117) and the perfluorocarbon sulfonic acid solid polymer electrolyte (Nafion 117), and its membrane was firm.

In a Teflon-coated closed container made of SUS, the aforesaid membrane-electrodes assembly I' obtained and 20 ml of ion-exchanged water were maintained at 120° C. for 2 weeks. In the membrane-electrodes assembly I' after the maintenance, the electrodes were peeling a little but the membrane was firm. The assembly I' after the maintenance had power-generating capability.

In a Teflon-coated closed container made of SUS, the aforesaid membrane-electrodes assembly I" obtained and 20 ml of ion-exchanged water were maintained at 120° C. for 2 weeks. In the membrane-electrodes assembly I" after the maintenance, the electrodes were peeling a little but the membrane was firm. The assembly I" after the maintenance had power-generating capability.

On the other hand, as described hereinafter in Comparative Example 1, (3), the membrane of a membrane-electrodes assembly II produced by using the sulfonated poly(1,4-biphenylene ether ether sulfone) solid polymer electrolyte membrane II and the electrocatalyst-coating solution II was broken to tatters and its electrodes were peeled, under the same conditions of hydrolysis by heating as above.

Thus, unlike the membrane-electrodes assembly II described hereinafter in Comparative Example 1, (3), i.e., the assembly of the sulfonated poly(1,4-biphenylene ether ether sulfone) solid polymer electrolyte membrane and electrodes, the inexpensive assembly of the sulfopropylated poly(1,4-biphenylene ether ether sulfone) solid polymer electrolyte membrane and electrodes was stable like the expensive assembly of the perfluorocarbon sulfonic acid (Nafion 117) membrane and electrodes, and could be obtained as an assembly excellent in both cost and resistance to hydrolysis (durability).

(4) Durability Test on Single Cells for Fuel Cell

The above-mentioned membrane-electrodes assemblies I, I' and I" were allowed to absorb water by immersion in boiling deionized water for 2 hours. Each of the thus treated membrane-electrodes assemblies was incorporated into a cell for evaluation and the output capability of the resulting single cell for fuel cell was evaluated. In detail, the single cell for solid polymer electrolyte fuel cell shown in FIG. 1 was produced by adhering a packing material (a supporting current collector) 5 of thin carbon paper to each of the electrodes of each membrane-electrodes assembly 4 obtained in Example 1 and composed of a solid polymer electrolyte membrane 1, an oxygen electrode 2 and a hydrogen electrode 3, and providing an electroconductive separator (a bipolar plate) 6 capable of serving as a separator between electrode chambers and passageways for gas supply to the electrodes, on the outer surface of each packing material.

The single cells for solid polymer electrolyte fuel cell thus obtained were subjected to a long-term operation test at a current density of 300 mA/cm$^2$. The results obtained are shown in FIG. 2.

Figure 2:
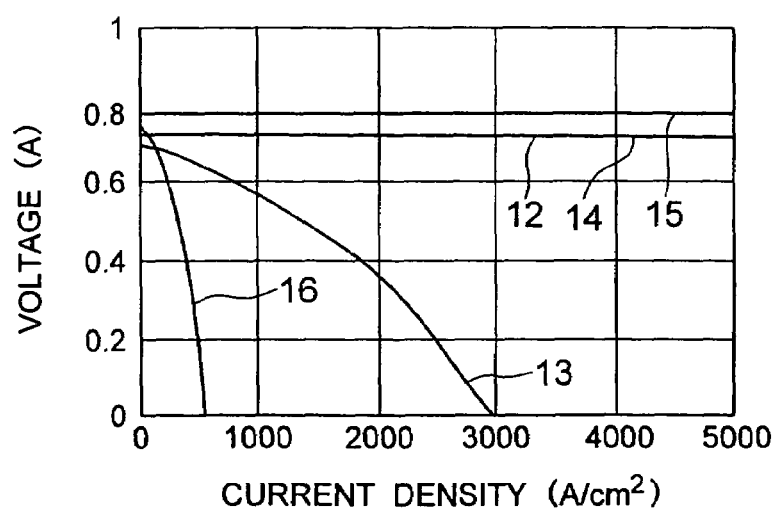
FIG. 2 is a graph showing the results of a durability test on single cells for solid polymer electrolyte fuel cell produced in Example 1.

In FIG. 2, numerals 12, 13 and 14 indicate the results of the durability test on the single cells for fuel cell obtained by the use of the membrane-electrodes assemblies I, I' and I", respectively. In FIG. 2, numeral 15 indicates the result of the durability test on a single cell for fuel cell obtained by using the assembly of the perfluorocarbon sulfonic acid (Nafion 117) membrane and electrodes.

In FIG. 2, numeral 12 indicates the change with time of output voltage of the single cell for fuel cell of Example 1 produced by using a solid polymer electrolyte membrane of a polyether ether sulfone having sulfonic acid groups bonded thereto through alkylene groups and an electrocatalyst-coating solution containing the polyether ether sulfone solid polymer electrolyte having sulfonic acid groups bonded thereto through alkylene groups. Numeral 13 indicates the change with time of output voltage of the single cell for fuel cell produced in Example 1 by using a solid polymer electrolyte membrane of the polyether ether sulfone having sulfonic acid groups bonded thereto through alkylene groups and an electrocatalyst-coating solution containing a polyether ether sulfone solid polymer electrolyte having sulfonic acid groups directly bonded thereto.

Numeral 14 indicates the change with time of output voltage of the single cell for fuel produced in Example 1 by using a solid polymer electrolyte membrane of the polyether ether sulfone having sulfonic acid groups bonded thereto through alkylene groups and an electrocatalyst-coating solution containing the perfluorocarbon sulfonic acid solid polymer electrolyte (Nafion 117). Numeral 15 indicates the change with time of output voltage of the single cell for fuel cell obtained by using the perfluorocarbon sulfonic acid solid polymer electrolyte membrane (Nafion 117). Numeral 16 indicates the change with time of output voltage of the single cell for fuel cell of Comparative Example 1 produced by using a solid polymer electrolyte membrane of a polyether ether sulfone having sulfonic acid groups directly bonded thereto and an electrocatalyst-coating solution containing the polyether ether sulfone solid polymer electrolyte having sulfonic acid groups directly bonded thereto.

As indicated by numerals 12 and 14 in FIG. 2, the initial output voltage of each of the single cells for fuel cell obtained by using the membrane-electrodes assemblies I and I", respectively, is 0.70 V which is lower than the output voltage of the single cell for fuel cell indicated by numeral 15 in FIG. 2, i.e., the single cell for fuel cell produced by using the perfluorocarbon sulfonic acid solid polymer electrolyte membrane (Nafion 117). However, since the output voltage of each of the single cells using the membrane-electrodes assemblies I and I", respectively, is the same as its initial value even after 5,000 hours of operation, these single cells can be satisfactorily used in a fuel cell formed by laminating single cells of each kind, when the number of the single cells laminated is increased.

On the other hand, the initial output voltage of the single cell for fuel cell indicated by numeral 16 in FIG. 2 (the single cell for fuel cell obtained by using the sulfonated poly(1,4-biphenylene ether ether sulfone) solid polymer electrolyte II which is described hereinafter in Comparative Example 1) was 0.73 V, and the output of this single cell was zero after 600 hours of operation. From this fact, it is clear that the single cell for fuel cell produced by using the solid polymer electrolyte membrane I of the sulfopropylated poly(1,4-biphenylene ether ether sulfone) obtained by bonding sulfonic acid groups to the aromatic rings of a poly(1,4-biphenylene ether ether sulfone) is superior in durability to the single cell for fuel cell produced by using the solid polymer electrolyte membrane II of a poly(1,4-biphenylene ether ether sulfone) having sulfonic acid groups directly bonded thereto.

As can be seen from FIG. 2, the single cells for fuel cell obtained by using the membrane-electrodes assemblies I and I", respectively, are superior in durability to the single cell for fuel cell obtained by using the membrane-electrodes assembly I'. That is, the electrocatalyst-coating solution I is more suitable than the electrocatalyst-coating solution II, for coating an electrocatalyst for a membrane-electrodes assembly.

(5) Production of a Fuel Cell

A solid polymer electrolyte fuel cell was produced by laminating 36 single cells produced in the same manner as in the above item (4) according to the present invention. The fuel cell had an output of 3 kw.

COMPARATIVE EXAMPLE 1

(1) Synthesis of a Sulfonated Poly(1,4-biphenylene Ether Ether Sulfone)

The inner atmosphere of a 500-ml four-necked round bottom flask equipped with a stirrer, a thermometer and a reflux condenser having a calcium chloride tube connected thereto was replaced with nitrogen. Then, 4.00 g (0.0103 mol) of a poly(1,4-biphenylene ether ether sulfone) [(—$C_6H_4$-4-$SO_2C_6H_4$-4-$OC_6H_4$-4-$C_6H_4$-4-O—)$_n$] dried by its maintenance at 110° C. for 10 hours and 100 ml of dehydrated chloroform were placed in the flask and maintained at 60° C. for 1 hour to effect dissolution. To the resulting solution was added 50 ml of a solution of 1.165 g (0.01 mol) of chlorosulfonic acid in 1,1,2,2-tetrachloroethane over a period of about 10 minutes.

Subsequently, the resulting mixture was stirred at 60° C. for 4 hours. The precipitate was filtered and then washed with 150 ml of chloroform. The washed precipitate was dissolved in 250 ml of methanol at 60° C., and the resulting solution was dried at 60° C. under reduced pressure.

The polymer thus obtained was finely ground together with 250 ml of water in a mixer, and the resulting mixture was filtered. This procedure was repeated three times and the water-insoluble fine powder thus obtained was dried over phosphorus pentaoxide at 90° C. under reduced pressure.

This fine powder was insoluble in water and soluble in methanol. The dried fine powder was subjected to $^1$HNMR measurement to find that absorptions at 7.3 to 8.00 ppm due to the hydrogen atoms of the phenyl groups in the starting poly (1,4-biphenylene ether ether sulfone) had been decreased, and that a new absorption due to the hydrogen atom of a phenyl group adjacent to a $SO_3H$ group was present at 8.3 ppm. This fact confirmed the introduction of sulfonic acid groups. The sulfonic acid equivalent weight of the sulfonated poly(1,4-biphenylene ether ether sulfone) solid polymer electrolyte II thus obtained was 650 g/equivalent.

In a Teflon-coated closed container made of SUS, 1.0 g of the aforesaid sulfonated poly(1,4-biphenylene ether ether sulfone) solid polymer electrolyte II and 20 ml of ion-exchanged water were maintained at 120° C. for 2 weeks. After cooling and thorough washing with water, the ion-exchange group equivalent weight of the sulfonated poly(1,4-biphenylene ether ether sulfone) solid polymer electrolyte II was measured.

As a result, it was found that the sulfonic acid equivalent weight of the sulfonated poly(1,4-biphenylene ether ether sulfone) solid polymer electrolyte II had been increased to 1,200 g/equivalent from its initial value of 650 g/equivalent, namely, sulfonic acid groups had been released.

(2) Formation of a Solid Polymer Electrolyte Membrane

The sulfonated poly(1,4-biphenylene ether ether sulfone) solid polymer electrolyte II obtained in the above item (1) was dissolved in a N,N-dimethylformamide-cyclohexanone-methyl ethyl ketone mixed solvent (volume ratio; 20:80:25) to a concentration of 5 wt %. The resulting solution was spread on a glass plate by spin coating, air-dried and then dried in vacuo at 80° C. to form a solid polymer electrolyte membrane II of 45 μm in thickness. The ion electric conductivity of the obtained solid polymer electrolyte membrane II was 3 S/cm.

In a Teflon-coated closed container made of SUS, the aforesaid solid polymer electrolyte membrane II and 20 ml of ion-exchanged water were maintained at 120° C. for 2 weeks. As a result, the obtained solid polymer electrolyte membrane II was broken to tatters.

(3) Production of an Electrocatalyst-coating Solution and a Membrane-electrodes Assembly The same solution as in the above item (2), i.e., a 5 wt % solution of the solid polymer electrolyte II in the N,N-dimethylformamide-cyclohexanone-methyl ethyl ketone mixed solvent was added to platinum-supporting carbon (content of platinum supported: 40 wt %), so that the weight ratio of platinum catalyst to the solid polymer electrolyte might be 2:1. The platinum-supporting carbon was uniformly dispersed in the solution to prepare a paste (an electrocatalyst-coating solution II).

In a Teflon-coated closed container made of SUS, 1.0 g of the aforesaid electrocatalyst-coating solution II and 20 ml of ion-exchanged water were maintained at 120° C. for 2 weeks. After cooling, the solvent was vaporized and the resulting solid was washed with water. Then, the ion-exchange group equivalent weight of the electrocatalyst-coating solution II after the maintenance was measured. As a result, it was found that the ion-exchange group equivalent weight of the electrocatalyst-coating solution II had been increased to 1,200 g/equivalent from its initial value of 650 g/equivalent, namely, sulfonic acid groups had been released.

The aforesaid electrocatalyst-coating solution II was applied on both sides of the solid polymer electrolyte membrane II obtained in the above item (2), and was dried to produce a membrane-electrodes assembly II having an amount of platinum supported of 0.25 mg/cm$^2$.

In a Teflon-coated closed container made of SUS, the aforesaid membrane-electrodes assembly II obtained and 20 ml of ion-exchanged water were maintained at 120° C. for 2 weeks. As a result, the membrane of the membrane-electrodes assembly II was broken to tatters and its electrodes were peeled.

(4) Durability Test on a Single Cell for Fuel Cell

A single cell for solid polymer electrolyte fuel cell was produced by adhering a packing material (a supporting current collector) of thin carbon paper to each side of the membrane-electrodes assembly II obtained in Comparative Example 1, and providing an electroconductive separator (a bipolar plate) capable of serving as a separator between electrode chambers and passageways for gas supply to the electrodes, on the outer surface of each packing material. The single cell was subjected to a long-term operation test at a current density of 300 mA/cm$^2$.

As a result, it was found that as indicated by numeral 16 in FIG. 2, the initial output voltage of the single cell was 0.73 V and that the output voltage of the single cell was zero after 600 hours of operation.

EXAMPLE 2

(1) Synthesis of a sulfopropylated poly(1,4-biphenylene ether ether sulfone)

The inner atmosphere of a 500-ml four-necked round bottom flask equipped with a stirrer, a thermometer and a reflux condenser having a calcium chloride tube connected thereto was replaced with nitrogen. Then, 22.6 g (0.0155 mol) of a poly(1,4-biphenylene ether ether sulfone) [(—C$_6$H$_4$-4-SO$_2$C$_6$H$_4$-4-OC$_6$H$_4$-4-C$_6$H$_4$-4-O—)$_n$] dried by its maintenance at 110° C. for 10 hours and 150 ml of dehydrated 1,1,2-trichloroethane were placed in the flask and maintained at 113° C. for about 1 hour to effect dissolution. To the resulting solution was added 24.8 g (0.0155 mol) of propanesultone.

Subsequently, 6.19 g (0.0464 mol) of anhydrous aluminum chloride was added thereto with stirring over a period of about 30 minutes. After completion of the addition of anhydrous aluminum chloride, the resulting mixture was stirred at 113° C. for 30 hours. The polymer precipitated was filtered, washed with 150 ml of chloroform and then dried under reduced pressure. The dried polymer was suspended in 250 ml of water and finely ground in a mixer, and the resulting finely ground substance was filtered. This procedure was repeated four times.

After thorough washing with water, the water-insoluble finely ground substance thus obtained was dried at 90° C. under reduced pressure. The dried substance was subjected to $^1$HNMR measurement to find that new peaks due to a —CH$_2$CH$_2$CH$_2$SO$_3$H group were present at 2.2 ppm and 3.8 ppm. This fact confirmed the introduction of sulfopropyl groups. The sulfonic acid equivalent weight of the sulfopropylated poly(1,4-biphenylene ether ether sulfone) solid polymer electrolyte III thus obtained was 430 g/equivalent.

Since the sulfopropylated poly(1,4-biphenylene ether ether sulfone) solid polymer electrolyte III can be produced through one step by using the poly(1,4-biphenylene ether ether sulfone), a relatively inexpensive commercial engineering plastic, as a starting material, the cost of production thereof is as low as less than one-fiftieth that of the perfluorocarbon sulfonic acid solid polymer electrolyte (Nafion 117) produced through five steps by using an expensive starting material.

In a Teflon-coated closed container made of SUS, 1.0 g of the obtained sulfopropylated poly(1,4-biphenylene ether ether sulfone) solid polymer electrolyte III and 20 ml of ion-exchanged water were maintained at 120° C. for 2 weeks. After cooling and thorough washing with water, the ion-exchange group equivalent weight of the sulfopropylated poly(1,4-biphenylene ether ether sulfone) solid polymer electrolyte III was measured.

As a result, it was found that the ion-exchange group equivalent weight of the sulfopropylated poly(1,4-biphenylene ether ether sulfone) solid polymer electrolyte III was 430 g/equivalent, the same value as the initial value, namely, the solid polymer electrolyte III was stable like the expensive perfluorocarbon sulfonic acid solid polymer electrolyte (Nafion 117).

On the other hand, as described in Comparative Example 1, (1), the ion-exchange group equivalent weight of the sulfonated poly(1,4-biphenylene ether ether sulfone) solid polymer electrolyte II was increased to 1,200 g/equivalent from its initial value of 650 g/equivalent under the same conditions of hydrolysis by heating as above, namely, sulfonic acid groups were released from the solid polymer electrolyte II.

Thus, unlike the sulfonated poly(1,4-biphenylene ether ether sulfone) solid polymer electrolyte II described in Comparative Example 1, (1), the inexpensive sulfopropylated poly(1,4-biphenylene ether ether sulfone) solid polymer electrolyte III was stable like the expensive perfluorocarbon sulfonic acid solid polymer electrolyte (Nafion 117) and was excellent in both cost and resistance to hydrolysis (durability).

(2) Formation of a Solid Polymer Electrolyte Membrane

The product obtained in the above item (1) was dissolved in a N,N-dimethylformamide-cyclohexanone-methyl ethyl ketone mixed solvent (volume ratio; 20:80:25) to a concentration of 5 wt %. The resulting solution was spread on a glass plate by spin coating, air-dried and then dried in vacuo at 80° C. to form a solid polymer electrolyte membrane III of 25 μm in thickness. The ion electric conductivity of the obtained solid polymer electrolyte membrane III was 55 S/cm.

In a Teflon-coated closed container made of SUS, the aforesaid solid polymer electrolyte membrane III and 20 ml of ion-exchanged water were maintained at 120° C. for 2 weeks. After the maintenance, the ion electric conductivity of the solid polymer electrolyte membrane III was the same as its initial value like that of the perfluorocarbon sulfonic acid solid polymer electrolyte membrane (Nafion 117) produced at a high cost, and the solid polymer electrolyte membrane III was firm.

On the other hand, as described in Comparative Example 1, (2), the sulfonated poly(1,4-biphenylene ether ether sulfone) solid polymer electrolyte membrane II was broken to tatters under the same conditions of hydrolysis by heating as above.

Thus, unlike the inexpensive sulfonated poly(1,4-biphenylene ether ether sulfone) solid polymer electrolyte membrane II described in Comparative Example 1, (2), the inexpensive sulfopropylated poly(1,4-biphenylene ether ether sulfone) solid polymer electrolyte membrane III was stable like the expensive perfluorocarbon sulfonic acid solid polymer electrolyte membrane (Nafion 117) and was excellent in both cost and resistance to hydrolysis (durability).

(3) Production of Electrocatalyst-coating Solutions and Membrane-electrodes Assemblies The same solution as in the above item (2), i.e., a 5 wt % solution of the solid polymer electrolyte III in the N,N-dimethylformamide-cyclohexanone-methyl ethyl ketone mixed solvent was added to platinum-supporting carbon (content of platinum supported: 40 wt %), so that the weight ratio of platinum catalyst to the solid polymer electrolyte might be 2:1. The platinum-supporting carbon was uniformly dispersed in the solution to prepare a paste (an electrocatalyst-coating solution III).

In a Teflon-coated closed container made of SUS, 1.0 g of the aforesaid electrocatalyst-coating solution III and 20 ml of ion-exchanged water were maintained at 120° C. for 2 weeks. After cooling, the solvent was vaporized and the resulting solid was washed with water. Then, the ion-exchange group equivalent weight of the electrocatalyst-coating solution III after the maintenance was measured.

As a result, it was found that the ion-exchange group equivalent weight of the electrocatalyst-coating solution III was 430 g/equivalent, the same value as the initial value, namely, the electrocatalyst-coating solution III was stable like the expensive perfluorocarbon sulfonic acid (Nafion 117) electrocatalyst-coating solution.

On the other hand, as described in Comparative Example 1, (2), the ion-exchange group equivalent weight of the electrocatalyst-coating solution II was increased to 1,200 g/equivalent from its initial value of 650 g/equivalent under the same conditions of hydrolysis by heating as above, namely, sulfonic acid groups were released. Thus, unlike the inexpensive electrocatalyst-coating solution II described in Comparative Example 1, (2), the inexpensive electrocatalyst-coating solution III was stable like the expensive perfluorocarbon sulfonic acid (Nafion 117) electrocatalyst-coating solution and was excellent in both cost and resistance to hydrolysis (durability).

The aforesaid electrocatalyst-coating solution III was applied on both sides of the solid polymer electrolyte membrane III obtained in the above item (2), and was dried to produce a membrane-electrodes assembly III having an amount of platinum supported of 0.25 mg/cm$^2$.

The electrocatalyst-coating solution II described in Comparative Example 1, (2) was applied on both sides of the same solid polymer electrolyte membrane III as that obtained in the above item (2), and was dried to produce a membrane-electrodes assembly III' having an amount of platinum supported of 0.25 mg/cm$^2$.

A 5 wt % solution of the perfluorocarbon sulfonic acid solid polymer electrolyte in an alcohol-water mixed solvent was added to platinum-supporting carbon (content of platinum supported: 40 wt %), so that the weight ratio of platinum catalyst to the solid polymer electrolyte might be 2:1. The platinum-supporting carbon was uniformly dispersed in the solution to prepare a paste (an electrocatalyst-coating solution).

This electrocatalyst-coating solution was applied on both sides of the same solid polymer electrolyte membrane III as that obtained in the above item (2), and was dried to produce a membrane-electrodes assembly III" having an amount of platinum supported of 0.25 mg/cm$^2$.

In a Teflon-coated closed container made of SUS, the aforesaid membrane-electrodes assembly III obtained and 20 ml of ion-exchanged water were maintained at 120° C. for 2 weeks. After the maintenance, the membrane-electrodes assembly III was not different from that before the maintenance like a membrane-electrodes assembly produced at a high cost by using the perfluorocarbon sulfonic acid solid polymer electrolyte membrane (Nafion 117) and the perfluorocarbon sulfonic acid solid polymer electrolyte (Nafion 117), and its membrane was firm.

In a Teflon-coated closed container made of SUS, the aforesaid membrane-electrodes assembly III' obtained and 20 ml of ion-exchanged water were maintained at 120° C. for 2 weeks. In the membrane-electrodes assembly III' after the maintenance, the electrodes were peeling a little but the membrane was firm. The assembly III' after the maintenance had a power-generating capability.

In a Teflon-coated closed container made of SUS, the aforesaid membrane-electrodes assembly III" obtained and 20 ml of ion-exchanged water were maintained at 120° C. for 2 weeks. In the membrane-electrodes assembly III" after the maintenance, the electrodes were peeling a little but the membrane was firm. The assembly III" after the maintenance had power-generating capability.

On the other hand, as described in Comparative Example 1, (3), the membrane of the membrane-electrodes assembly II produced by using the relatively inexpensive sulfonated aromatic hydrocarbon solid polymer electrolyte membrane II and the electrocatalyst-coating solution II was broken to tatters and its electrodes were peeled, under the same conditions of hydrolysis by heating as above. Thus, unlike the inexpensive membrane-electrodes assembly II described in Comparative Example 1, (3), i.e., the assembly of the sulfonated poly(1,4-biphenylene ether ether sulfone) solid polymer electrolyte membrane and electrodes, the inexpensive assembly of the sulfopropylated poly(1,4-biphenylene ether ether sulfone) solid polymer electrolyte membrane and electrodes was stable like the expensive assembly of the perfluorocarbon sulfonic acid (Nafion 117) membrane and electrodes, and was excellent in both cost and resistance to hydrolysis (durability).

(4) Evaluation of the Output Capability of Single Cells for Fuel Cell

The above-mentioned membrane-electrodes assemblies III, III' and III" were allowed to absorb water by immersion in boiling deionized water for 2 hours. Each of the thus treated membrane-electrodes assemblies was incorporated into a cell for evaluation and the output capability of the resulting single cell for fuel cell was evaluated.

Figure 3:
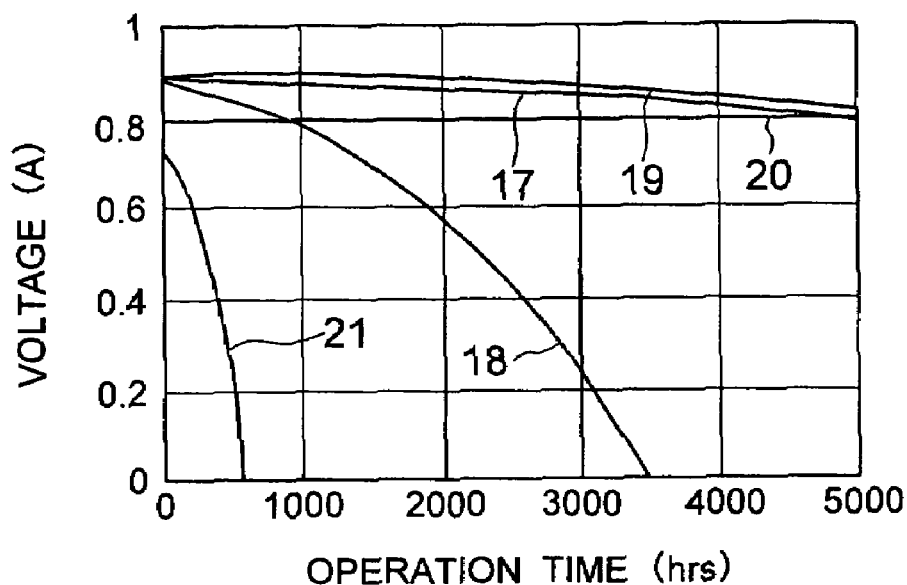
FIG. 3 is a graph showing the results of a durability test on single cells for solid polymer electrolyte fuel cell produced in Example 2.

In detail, the single cell for solid polymer electrolyte fuel cell shown in FIG. 1 was produced by adhering a packing material (a supporting current collector) 5 of thin carbon paper to each of the electrodes of each membrane-electrodes assembly 4 obtained in Example 2 and composed of a solid polymer electrolyte membrane 1, an oxygen electrode 2 and a hydrogen electrode 3, and providing an electroconductive separator (a bipolar plate) 6 capable of serving as a separator between electrode chambers and passageways for gas supply to the electrodes, on the outer surface of each packing material. The single cells for solid polymer electrolyte fuel cell thus obtained were subjected to a long-term operation test at a current density of 300 mA/cm$^2$. The results obtained are shown in FIG. 3. In FIG. 3, numerals 17, 18 and 19 indicate the results of the durability test on the single cells using the membrane-electrodes assemblies III, III' and III", respectively.

In FIG. 3, numeral 17 indicates the change with time of output voltage of the single cell for fuel cell of Example 2 produced by using a solid polymer electrolyte membrane of a polyether ether sulfone having sulfonic acid groups bonded thereto through alkylene groups and an electrocatalyst-coating solution containing the polyether ether sulfone solid polymer electrolyte having sulfonic acid groups bonded thereto through alkylene groups. Numeral 18 indicates the change with time of output voltage of the single cell for fuel cell produced in Example 2 by using a solid polymer electrolyte membrane of the polyether ether sulfone having sulfonic acid groups bonded thereto through alkylene groups and an electrocatalyst-coating solution containing a polyether ether sulfone solid polymer electrolyte having sulfonic acid groups directly bonded thereto.

Numeral 19 indicates the change with time of output voltage of the single cell for fuel cell produced in Example 2 by using a solid polymer electrolyte membrane of the polyether ether sulfone having sulfonic acid groups bonded thereto through alkylene groups and an electrocatalyst-coating solution containing the perfluorocarbon sulfonic acid solid polymer electrolyte (Nafion 117). Numeral 20 indicates the change with time of output voltage of a single cell for fuel cell obtained by using the perfluorocarbon sulfonic acid solid polymer electrolyte membrane (Nafion 117). Numeral 21 indicates the change with time of output voltage of a single cell for fuel cell of Comparative Example 2 produced by using a solid polymer electrolyte membrane of a polyether ether sulfone having sulfonic acid groups directly bonded thereto and an electrocatalyst-coating solution containing the polyether ether sulfone solid polymer electrolyte having sulfonic acid groups directly bonded thereto.

In FIG. 3, numeral 20 indicates the result of the durability test on the single cell for fuel cell obtained by using the assembly of the perfluorocarbon sulfonic acid (Nafion 117) membrane and electrodes.

As indicated by numerals 17 and 19 in FIG. 3, the initial output voltage of each of the single cells for fuel cell obtained by using the membrane-electrodes assemblies III and III", respectively, is 0.88 V, and the output voltage of each single cell is decreased to about 94% of the initial output voltage after 5,000 hours of operation. The decreased value, however, is substantially the same as the output voltage of the single cell for fuel cell produced by using the assembly of the perfluorocarbon sulfonic acid (Nafion 117) membrane and electrodes. Therefore, each of the single cells obtained by using the membrane-electrodes assemblies III and III", respectively, can be satisfactorily used in a fuel cell.

On the other hand, the initial output voltage of the single cell for fuel cell indicated by numeral 21 in FIG. 3 (the single cell for fuel cell of Comparative Example 2 obtained by using the sulfonated aromatic hydrocarbon solid polymer electrolyte II) was 0.73 V, and the output voltage of this single cell was zero after 600 hours of operation.

From this fact, it is clear that the single cell for fuel cell produced by using the aromatic hydrocarbon solid polymer electrolyte III obtained by bonding sulfonic acid groups to the aromatic rings of an aromatic hydrocarbon polymer through alkylene groups is superior in durability to the single cell for fuel cell produced by using the aromatic hydrocarbon solid polymer electrolyte II having sulfonic acid group directly bonded thereto.

The single cells for fuel cell obtained by using the membrane-electrodes assemblies III and III", respectively, are superior in durability to the single cell for fuel cell obtained by using the membrane-electrodes assembly III'.

That is, the electrocatalyst-coating solution III is more suitable for coating an electrocatalyst for a membrane-electrodes assembly than the electrocatalyst-coating solution II described in Comparative Example 1. The reason why the output voltage of the single cell for fuel cell of Example 2 is higher than that of the single cell for fuel cell of Comparative Example 2 though the membrane-electrodes assemblies of Example 2 and Comparative Example 2 have the same amount of platinum supported of 0.25 mg/cm$^2$, is that the ion electric conductivity of the solid polymer electrolyte membrane III and electrocatalyst-coating solution III used in the membrane-electrodes assembly III of Example 2 is higher than that of the solid polymer electrolyte membrane II and electrocatalyst-coating solution II used in the membrane-electrodes assembly II of Comparative Example 2.

(5) Production of a Fuel Cell

A solid polymer electrolyte fuel cell was produced by laminating 36 single cells produced in the same manner as in the above item (4) according to the present invention. The fuel cell had an output of 3 kW.

EXAMPLE 3

(1) Synthesis of a sulfopropylated poly(1,4-biphenylene ether ether sulfone)

The inner atmosphere of a 500-ml four-necked round bottom flask equipped with a stirrer, a thermometer and a reflux condenser having a calcium chloride tube connected thereto was replaced with nitrogen. Then, 6.00 g (0.0155 mol) of a dried poly(1,4-biphenylene ether ether sulfone) [(—$C_6H_4$-4-$SO_2C_6H_4$-4-$OC_6H_4$-4-$C_6H_4$-4-O—)$_n$] and 150 ml of dehydrated chloroform for synthesis were placed in the flask and maintained at 60° C. for about 1 hour to effect dissolution. To the resulting solution was added 5.67 g (0.0464 mol) of propanesultone.

Subsequently, 6.19 g (0.0464 mol) of anhydrous aluminum chloride was added thereto with stirring over a period of about 30 minutes. After completion of the addition of anhydrous aluminum chloride, the resulting mixture was refluxed with stirring at 60° C. for 30 hours. The precipitate was filtered, washed with 150 ml of chloroform and then dried under reduced pressure. The dried precipitate was suspended in 250 ml of water, finely ground in a mixer, and then filtered. This procedure was repeated four times.

After thorough washing with water, the water-insoluble finely ground substance thus obtained was dried at 90° C. under reduced pressure. The dried substance was subjected to $^1$HNMR measurement to find that new peaks due to a —$CH_2CH_2CH_2SO_3H$ group were present at 2.2 ppm and 3.8 ppm.

This fact confirmed the introduction of sulfopropyl groups. The sulfonic acid equivalent weight of the sulfopropylated poly(1,4-biphenylene ether ether sulfone) solid polymer electrolyte IV thus obtained was 970 g/equivalent.

Since the sulfopropylated poly(1,4-biphenylene ether ether sulfone) solid polymer electrolyte IV can be produced through one step by using the poly(1,4-biphenylene ether ether sulfone), a relatively inexpensive commercial engineering plastic, as a starting material, the cost of production thereof is as low as less than one-fiftieth that of the perfluorocarbon sulfonic acid solid polymer electrolyte (Nafion 117) produced through five steps by using an expensive starting material.

In a Teflon-coated closed container made of SUS, 1.0 g of the obtained sulfopropylated poly(1,4-biphenylene ether ether sulfone) solid polymer electrolyte IV and 20 ml of ion-exchanged water were maintained at 120° C. for 2 weeks. After cooling and thorough washing with water, the ion-exchange group equivalent weight of the sulfopropylated poly(1,4-biphenylene ether ether sulfone) solid polymer electrolyte IV was measured.

The ion-exchange group equivalent weight of the solid polymer electrolyte IV was 970 g/equivalent, the same value as the initial value, namely, the solid polymer electrolyte IV was stable like the expensive perfluorocarbon sulfonic acid solid polymer electrolyte (Nafion 117).

On the other hand, the ion-exchange group equivalent weight of the inexpensive sulfonated poly(1,4-biphenylene ether ether sulfone) solid polymer electrolyte II of Comparative Example 1 was increased to 1,200 g/equivalent from its initial value of 650 g/equivalent under the same conditions of hydrolysis by heating as above, namely, sulfonic acid groups were released from the solid polymer electrolyte II. Thus, unlike the sulfonated poly(1,4-biphenylene ether ether sulfone) solid polymer electrolyte II of Comparative Example 1, the inexpensive sulfopropylated poly(1,4-biphenylene ether ether sulfone) solid polymer electrolyte IV was stable like the perfluorocarbon sulfonic acid solid polymer electrolyte (Nafion 117) and was excellent in both cost and resistance to hydrolysis (durability).

(2) Formation of a Solid Polymer Electrolyte Membrane

The solid polymer electrolyte IV obtained in the above item (1) was dissolved in a N,N-dimethylformamide-cyclohexanone-methyl ethyl ketone mixed solvent (volume ratio; 20:80:25) to a concentration of 5 wt %. The resulting solution was spread on a glass plate by spin coating, air-dried and then dried in vacuo at 80° C. to form a solid polymer electrolyte membrane IV of 25 μm in thickness. The ion electric conductivity of the electrolyte membrane IV was 10 S/cm.

In a Teflon-coated closed container made of SUS, the aforesaid solid polymer electrolyte membrane IV and 20 ml of ion-exchanged water were maintained at 120° C. for 2 weeks. After the maintenance, the ion electric conductivity of the solid polymer electrolyte membrane IV was the same as its initial value like that of the perfluorocarbon sulfonic acid solid polymer electrolyte membrane (Nafion 117) produced at a high cost, and the solid polymer electrolyte membrane IV was firm.

On the other hand, as described in Comparative Example 1, (2), the relatively inexpensive sulfonated poly(1,4-biphenylene ether ether sulfone) solid polymer electrolyte membrane II was broken to tatters under the same conditions of hydrolysis by heating as above.

Thus, unlike the sulfonated poly(1,4-biphenylene ether ether sulfone) solid polymer electrolyte membrane II, the inexpensive sulfopropylated poly(1,4-biphenylene ether ether sulfone) solid polymer electrolyte membrane IV was stable like the perfluorocarbon sulfonic acid solid polymer electrolyte membrane (Nafion 117) and was excellent in both cost and resistance to hydrolysis (durability).

(3) Production of Electrocatalyst-coating Solutions and Membrane-electrodes Assemblies The same solution as in the above item (2), i.e., a 5 wt % solution of the solid polymer electrolyte IV in the N,N-dimethylformamide-cyclohexanone-methyl ethyl ketone mixed solvent was added to platinum-supporting carbon (content of platinum supported: 40 wt %), so that the weight ratio of platinum catalyst to the solid polymer electrolyte might be 2:1. The platinum-supporting carbon was uniformly dispersed in the solution to prepare a paste (an electrocatalyst-coating solution IV).

In a Teflon-coated closed container made of SUS, 1.0 g of the aforesaid electrocatalyst-coating solution IV and 20 ml of ion-exchanged water were maintained at 120° C. for 2 weeks. After cooling, the solvent was vaporized and the resulting solid was washed with water. Then, the ion-exchange group equivalent weight of the electrocatalyst-coating solution IV after the maintenance was measured.

As a result, it was found that the ion-exchange group equivalent weight of the electrocatalyst-coating solution IV was 970 g/equivalent, the same value as the initial value, namely, the electrocatalyst-coating solution IV was stable like the perfluorocarbon sulfonic acid (Nafion 117) electrocatalyst-coating solution.

On the other hand, the ion-exchange group equivalent weight of the electrocatalyst-coating solution II of Comparative Example 1 was increased to 1,200 g/equivalent from its initial value of 650 g/equivalent under the same conditions of hydrolysis by heating as above, namely, sulfonic acid groups were released.

Thus, unlike the electrocatalyst-coating solution II of Comparative Example 1, the inexpensive electrocatalyst-coating solution IV was stable like the perfluorocarbon sulfonic acid (Nafion 117) electrocatalyst-coating solution and was excellent in both cost and resistance to hydrolysis (durability).

The aforesaid electrocatalyst-coating solution IV was applied on both sides of the solid polymer electrolyte membrane IV obtained in the above item (2), and was dried to produce a membrane-electrodes assembly IV having an amount of platinum supported of 0.25 mg/cm$^2$.

The electrocatalyst-coating solution II of Comparative Example 1 was applied on both sides of the same solid polymer electrolyte membrane IV as that obtained in the above item (2), and was dried to produce a membrane-electrodes assembly IV' having an amount of platinum supported of 0.25 mg/cm$^2$.

A 5 wt % solution of the perfluorocarbon sulfonic acid solid polymer electrolyte (Nafion 117) in an alcohol-water mixed solvent was added to platinum-supporting carbon (content of platinum supported: 40 wt %), so that the weight ratio of platinum catalyst to the solid polymer electrolyte might be 2:1. The platinum-supporting carbon was uniformly dispersed in the solution to prepare a paste (an electrocatalyst-coating solution). This electrocatalyst-coating solution was applied on both sides of the same solid polymer electrolyte membrane IV as that obtained in the above item (2), and was dried to produce a membrane-electrodes assembly IV" having an amount of platinum supported of 0.25 mg/cm$^2$.

In a Teflon-coated closed container made of SUS, the aforesaid membrane-electrodes assembly IV obtained and 20 ml of ion-exchanged water were maintained at 120° C. for 2 weeks. The membrane-electrodes assembly IV after the maintenance was not different from that before the maintenance like a membrane-electrodes assembly produced at a high cost by using the perfluorocarbon sulfonic acid solid polymer electrolyte membrane (Nafion 117) and the perfluorocarbon sulfonic acid solid polymer electrolyte (Nafion 117), and its membrane was firm.

In a Teflon-coated closed container made of SUS, the aforesaid membrane-electrodes assembly IV' obtained and 20 ml of ion-exchanged water were maintained at 120° C. for 2 weeks. In the membrane-electrodes assembly IV' after the maintenance, the electrodes were peeling a little but the membrane was firm. The assembly IV' after the maintenance had power-generating capability.

In a Teflon-coated closed container made of SUS, the aforesaid membrane-electrodes assembly IV" and 20 ml of ion-exchanged water were maintained at 120° C. for 2 weeks. In the membrane-electrodes assembly IV" after the maintenance, the electrodes were peeling a little but the membrane was firm. The assembly IV" after the maintenance had power-generating capability.

On the other hand, as described in Comparative Example 1, (3), the membrane of the membrane-electrodes assembly II produced by using the relatively inexpensive sulfonated poly (1,4-biphenylene ether ether sulfone) solid polymer electrolyte membrane II and the electrocatalyst-coating solution II was broken to tatters and its electrodes were peeled, under the same conditions of hydrolysis by heating as above.

Thus, unlike the inexpensive membrane-electrodes assembly II of Comparative Example 1, i.e., the assembly of the sulfonated poly(1,4-biphenylene ether ether sulfone) solid polymer electrolyte membrane and electrodes, the inexpensive assembly of the sulfopropylated poly(1,4-biphenylene ether ether sulfone) solid polymer electrolyte membrane and electrodes was stable like the assembly of the perfluorocarbon sulfonic acid (Nafion 117) membrane and electrodes, and was excellent in both cost and resistance to hydrolysis (durability).

(4) Durability Test on Single Cells for Fuel Cell

The above-mentioned membrane-electrodes assemblies IV, IV' and IV" were allowed to absorb water by immersion in boiling deionized water for 2 hours. Each of the thus treated membrane-electrodes assemblies was incorporated into a cell for evaluation and the output capability of the resulting single cell for fuel cell was evaluated. In detail, the single cell for solid polymer electrolyte fuel cell shown in FIG. 1 was produced by adhering a packing material (a supporting current collector) 5 of thin carbon paper to each of the electrodes of each membrane-electrodes assembly 4 obtained in Example 3 and composed of a solid polymer electrolyte membrane 1, an oxygen electrode 2 and a hydrogen electrode 3, and providing an electroconductive separator (a bipolar plate) 6 capable of serving as a separator between electrode chambers and passageways for gas supply to the electrodes, on the outer surface of each packing material.

Figure 4:
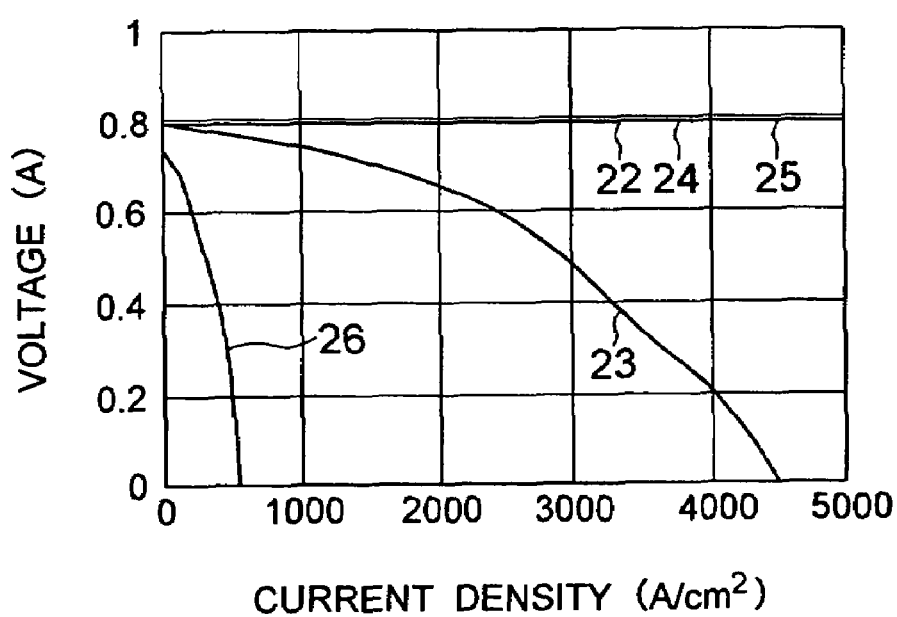
FIG. 4 is a graph showing the results of a durability test on single cells for solid polymer electrolyte fuel cell produced in Example 3.

The single cells for solid polymer electrolyte fuel cell thus obtained were subjected to a long-term operation test at a current density of 300 mA/cm$^2$. In FIG. 4, numerals 22, 23 and 24 indicate the results of the durability test on the single cells for fuel cell obtained by using the membrane-electrodes assemblies IV, IV' and IV", respectively. In FIG. 4, numeral 25 indicates the result of the durability test on a single cell for fuel cell obtained by using the assembly of the perfluorocarbon sulfonic acid (Nafion 117) membrane and electrodes.

In FIG. 4, numeral 22 indicates the change with time of output voltage of the single cell for fuel cell of Example 3 produced by using a solid polymer electrolyte membrane of a polyether ether sulfone having sulfonic acid groups bonded thereto through alkylene groups and an electrocatalyst-coating solution containing the polyether ether sulfone solid polymer electrolyte having sulfonic acid groups bonded thereto through alkylene groups. Numeral 23 indicates the change with time of output voltage of the single cell for fuel cell produced in Example 3 by using a solid polymer electrolyte membrane of the polyether ether sulfone having sulfonic acid groups bonded thereto through alkylene groups and an electrocatalyst-coating solution containing a polyether ether sulfone solid polymer electrolyte having sulfonic acid groups directly bonded thereto.

Numeral 24 indicates the change with time of output voltage of the single cell for fuel cell produced in Example 3 by using a solid polymer electrolyte membrane of the polyether ether sulfone having sulfonic acid groups bonded thereto through alkylene groups and an electrocatalyst-coating solution containing the perfluorocarbon sulfonic acid solid polymer electrolyte (Nafion 117). Numeral 25 indicates the change with time of output voltage of the single cell for fuel cell obtained by using the perfluorocarbon sulfonic acid solid polymer electrolyte membrane (Nafion 117). Numeral 26 indicates the change with time of output voltage of a single cell for fuel cell of Comparative Example 3 produced by using a solid polymer electrolyte membrane of a polyether ether sulfone having sulfonic acid groups directly bonded thereto and an electrocatalyst-coating solution containing the polyether ether sulfone solid polymer electrolyte having sulfonic acid groups directly bonded thereto.

In the case of numerals 22 and 24 in FIG. 4, the initial output voltage was 0.78 V, and the output voltage had the same value as its initial value even after 5,000 hours of operation. These results were equal to those obtained by the use of the perfluorocarbon sulfonic acid solid polymer electrolyte membrane (Nafion 117) IV and indicated by numeral 25 in FIG. 4.

On the other hand, the initial output voltage of the single cell for fuel cell indicated by numeral 26 in FIG. 4 (the single cell for fuel cell of Comparative Example 1 obtained by using the sulfonated poly(1,4-biphenylene ether ether sulfone) solid polymer electrolyte II) was 0.73 V, and the output of this single cell was zero after 600 hours of operation.

From this fact, it is clear that the single cell for fuel cell produced by using the solid polymer electrolyte membrane IV of a poly(1,4-biphenylene ether ether sulfone) having sulfonic acid groups bonded to its aromatic rings through alkylene groups is superior in durability to the single cell for fuel cell produced by using the solid polymer electrolyte membrane II of a poly(1,4-biphenylene ether ether sulfone) having sulfonic acid groups directly bonded thereto.

The single cells for fuel cell obtained by using the membrane-electrodes assemblies IV and IV''', respectively, are superior in durability to the single cell for fuel cell obtained by using the membrane-electrodes assembly IV'. That is, the electrocatalyst-coating solution IV is more suitable for coating an electrocatalyst for a membrane-electrodes assembly than the electrocatalyst-coating solution II of Comparative Example 1.

The reason why the output voltage of the single cell for fuel cell of Example 3 is higher than that of the single cell for fuel cell of Comparative Example 1 though the membrane-electrodes assemblies of Example 3 and Comparative Example 1 have the same amount of platinum supported of 0.25 mg/cm$^2$, is that the ion electric conductivity of the solid polymer electrolyte membrane IV and electrocatalyst-coating solution IV used in the membrane-electrodes assembly of Example 3 is higher than that of the solid polymer electrolyte membrane II and electrocatalyst-coating solution II used in the membrane-electrodes assembly of Comparative Example 1.

(5) Production of a Fuel Cell

A solid polymer electrolyte fuel cell was produced by laminating 36 single cells produced in the same manner as in the above item (4) according to the present invention. The fuel cell had an output of 3 kW.

EXAMPLE 4

(1) Synthesis of a sulfopropylated poly(1,4-biphenylene ether ether sulfone)

In an autoclave, 6.00 g (0.0155 mol) of a dried poly(1,4-biphenylene ether ether sulfone) [(—$C_6H_4$-4-$SO_2C_6H_4$-4-$OC_6H_4$-4-$C_6H_4$-4-O—)$_n$] and 150 ml of dehydrated chloroform were maintained at 60° C. for about 1 hour to effect dissolution. To the resulting solution was added 5.67 g (0.0464 mol) of propanesultone.

Subsequently, 6.19 g (0.0464 mol) of anhydrous aluminum chloride was added thereto with stirring over a period of about 30 minutes. After completion of the addition of anhydrous aluminum chloride, the resulting mixture was stirred at 130° C. for 20 hours. The polymer precipitated was filtered, washed with 150 ml of chloroform and then dried under reduced pressure. The dried polymer was suspended in 250 ml of water and finely ground in a mixer, and the resulting finely ground substance was filtered. This procedure was repeated four times.

After thorough washing with water, the water-insoluble finely ground substance thus obtained was dried at 90° C. under reduced pressure. The dried substance was subjected to $^1$HNMR measurement to find that new peaks due to a —$CH_2CH_2CH_2SO_3H$ group were present at 2.2 ppm and 3.8 ppm. This fact confirmed the introduction of sulfopropyl groups. The sulfonic acid equivalent weight of the sulfopropylated poly(1,4-biphenylene ether ether sulfone) solid polymer electrolyte V thus obtained was 530 g/equivalent.

Since the sulfopropylated poly(1,4-biphenylene ether ether sulfone) solid polymer electrolyte V can be produced through one step by using the poly(1,4-biphenylene ether ether sulfone), a relatively inexpensive commercial engineering plastic, as a starting material, the cost of production thereof is as low as less than one-fiftieth that of the perfluorocarbon sulfonic acid solid polymer electrolyte (Nafion 117) produced through five steps by using an expensive starting material.

In a Teflon-coated closed container made of SUS, 1.0 g of the obtained sulfopropylated poly(1,4-biphenylene ether ether sulfone) solid polymer electrolyte V and 20 ml of ion-exchanged water were maintained at 120° C. for 2 weeks. After cooling and thorough washing with water, the ion-exchange group equivalent weight of the sulfopropylated poly(1,4-biphenylene ether ether sulfone) solid polymer electrolyte V was measured. As a result, it was found that the ion-exchange group equivalent weight of the solid polymer electrolyte V was 530 g/equivalent, the same value as the initial value, namely, the solid polymer electrolyte V was stable like the perfluorocarbon sulfonic acid solid polymer electrolyte (Nafion 117).

On the other hand, as described in Comparative Example 1, (1), the ion-exchange group equivalent weight of the inexpensive sulfonated poly(1,4-biphenylene ether ether sulfone) solid polymer electrolyte II was increased to 1,200 g/equivalent from its initial value of 650 g/equivalent under the same conditions of hydrolysis by heating as above, namely, sulfonic acid groups were released from the solid polymer electrolyte II.

Thus, unlike the sulfonated poly(1,4-biphenylene ether ether sulfone) solid polymer electrolyte II of Comparative Example 1, the inexpensive sulfopropylated poly(1,4-biphenylene ether ether sulfone) solid polymer electrolyte V was stable like the perfluorocarbon sulfonic acid solid polymer electrolyte (Nafion 117) and was excellent in both cost and resistance to hydrolysis (durability).

(2) Formation of a Solid Polymer Electrolyte Membrane

The product obtained in the above item (1) was dissolved in a N,N-dimethylformamide-cyclohexanone-methyl ethyl ketone mixed solvent (volume ratio; 20:80:25) to a concentration of 5 wt %. The resulting solution was spread on a glass plate by spin coating, air-dried and then dried in vacuo at 80° C. to form a solid polymer electrolyte membrane V of 25 μm in thickness. The ion electric conductivity of the obtained solid polymer electrolyte membrane V was 20 S/cm.

In a Teflon-coated closed container made of SUS, the aforesaid solid polymer electrolyte membrane V and 20 ml of ion-exchanged water were maintained at 120° C. for 2 weeks. After the maintenance, the ion electric conductivity of the solid polymer electrolyte membrane V was the same as its initial value like that of the perfluorocarbon sulfonic acid solid polymer electrolyte membrane (Nafion 117) produced at a high cost, and the solid polymer electrolyte membrane V was firm.

On the other hand, as described in Comparative Example 1, (2), the relatively inexpensive sulfonated poly(1,4-biphenylene ether ether sulfone) solid polymer electrolyte membrane II was broken to tatters under the same conditions of hydrolysis by heating as above. Thus, unlike the sulfonated poly(1,4-biphenylene ether ether sulfone) solid polymer electrolyte membrane II of Comparative Example 1, the inexpensive sulfopropylated poly(1,4-biphenylene ether ether sulfone) solid polymer electrolyte membrane V was stable like the perfluorocarbon sulfonic acid solid polymer electrolyte membrane (Nafion 117) and was excellent in both cost and resistance to hydrolysis (durability).

(3) Production of Electrocatalyst-coating Solutions and Membrane-electrodes Assemblies The same solution as in the above item (2), i.e., a 5 wt % solution of the solid polymer electrolyte V in the N,N-dimethylformamide-cyclohexanone-methyl ethyl ketone mixed solvent was added to platinum-supporting carbon (content of platinum supported: 40 wt %), so that the weight ratio of platinum catalyst to the solid polymer electrolyte might be 2:1. The platinum-supporting carbon was uniformly dispersed in the solution to prepare a paste (an electrocatalyst-coating solution V).

In a Teflon-coated closed container made of SUS, 1.0 g of the aforesaid electrocatalyst-coating solution V and 20 ml of ion-exchanged water were maintained at 120° C. for 2 weeks. After cooling, the solvent was vaporized and the resulting solid was washed with water. Then, the ion-exchange group equivalent weight of the electrocatalyst-coating solution V after the maintenance was measured. The ion-exchange group equivalent weight of said solution V was 530 g/equivalent, the same value as the initial value, namely, said solution V was stable like the perfluorocarbon sulfonic acid (Nafion 117) electrocatalyst-coating solution.

On the other hand, as described in Comparative Example 1, (2), the ion-exchange group equivalent weight of the electrocatalyst-coating solution II was increased to 1,200 g/equivalent from its initial value of 650 g/equivalent under the same conditions of hydrolysis by heating as above, namely, sulfonic acid groups were released. Thus, unlike the electrocatalyst-coating solution II of Comparative Example 1, the inexpensive electrocatalyst-coating solution V was stable like the perfluorocarbon sulfonic acid (Nafion 117) electrocatalyst-coating solution and was excellent in both cost and resistance to hydrolysis (durability).

The aforesaid electrocatalyst-coating solution V was applied on both sides of the solid polymer electrolyte membrane V obtained in the above item (2), and was dried to produce a membrane-electrodes assembly V having an amount of platinum supported of 0.25 mg/cm$^2$.

The electrocatalyst-coating solution II described in Comparative Example 1, (2) was applied on both sides of the same solid polymer electrolyte membrane V as that obtained in the above item (2), and was dried to produce a membrane-electrodes assembly V' having an amount of platinum supported of 0.25 mg/cm$^2$.

A 5 wt % solution of the perfluorocarbon sulfonic acid solid polymer electrolyte in an alcohol-water mixed solvent was added to platinum-supporting carbon (content of platinum supported: 40 wt %), so that the weight ratio of platinum catalyst to the solid polymer electrolyte might be 2:1. The platinum-supporting carbon was uniformly dispersed in the solution to prepare a paste (an electrocatalyst-coating solution). This electrocatalyst-coating solution was applied on both sides of the same solid polymer electrolyte membrane V as that obtained in the above item (2), and was dried to produce a membrane-electrodes assembly V''' having an amount of platinum supported of 0.25 mg/cm$^2$.

In a Teflon-coated closed container made of SUS, the aforesaid membrane-electrodes assembly V and 20 ml of ion-exchanged water were maintained at 120° C. for 2 weeks. After the maintenance, the membrane-electrodes assembly V was not different from that before the maintenance like a membrane-electrodes assembly produced at a high cost by using the perfluorocarbon sulfonic acid solid polymer electrolyte membrane (Nafion 117) and the perfluorocarbon sulfonic acid solid polymer electrolyte (Nafion 117), and its membrane was firm.

In a Teflon-coated closed container made of SUS, the aforesaid membrane-electrodes assembly V' and 20 ml of ion-exchanged water were maintained at 120° C. for 2 weeks. In the membrane-electrodes assembly V' after the maintenance, the electrodes were peeling a little but the membrane was firm. The assembly V' after the maintenance had power-generating capability.

In a Teflon-coated closed container made of SUS, the aforesaid membrane-electrodes assembly V''' and 20 ml of ion-exchanged water were maintained at 120° C. for 2 weeks. In the membrane-electrodes assembly V''' after the maintenance, the electrodes were peeling a little but the membrane was firm. The assembly V''' after the maintenance had power-generating capability.

On the other hand, as described in Comparative Example 1, (3), the membrane of the membrane-electrodes assembly II produced by using the relatively inexpensive sulfonated aromatic hydrocarbon solid polymer electrolyte membrane II and the electrocatalyst-coating solution II was broken to tatters and its electrodes were peeled, under the same conditions of hydrolysis by heating as above. Thus, unlike the membrane-electrodes assembly II of Comparative Example 1, i.e., the assembly of the sulfonated poly(1,4-biphenylene ether ether sulfone) solid polymer electrolyte membrane and electrodes, the inexpensive assembly of the sulfopropylated poly (1,4-biphenylene ether ether sulfone) solid polymer electrolyte membrane and electrodes was stable like the assembly of the perfluorocarbon sulfonic acid (Nafion 117) membrane and electrodes, and was excellent in both cost and resistance to hydrolysis (durability).

(4) Evaluation of the Output Capability of Single Cells for Fuel Cell

Figure 5:
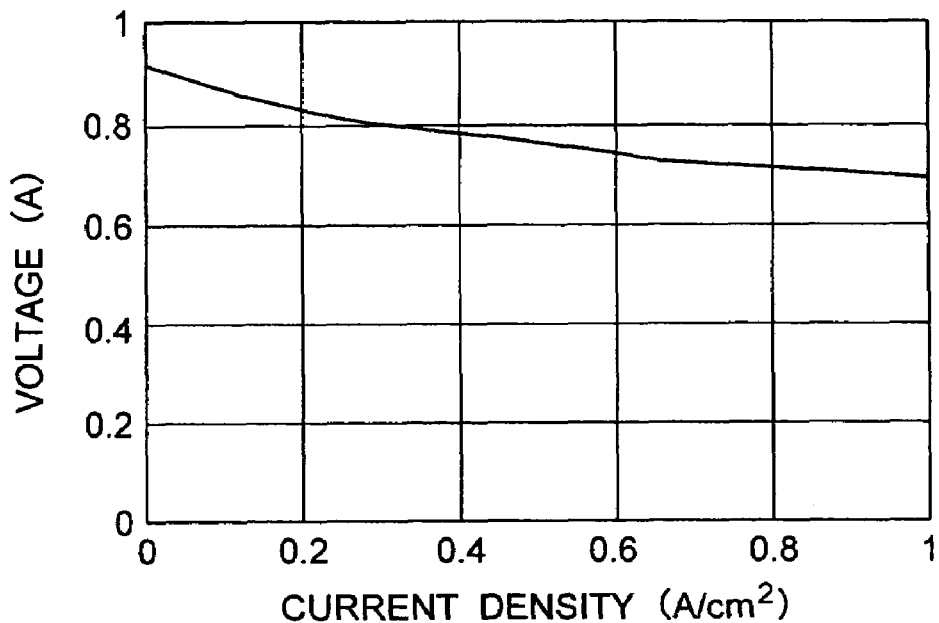
FIG. 5 is a current density-voltage graph showing the output capability of a single cell for solid polymer electrolyte fuel cell produced in Example 4.

The above-mentioned membrane-electrodes assemblies V, V' and V''' were allowed to absorb water by immersion in boiling deionized water for 2 hours. Each of the thus treated membrane-electrodes assemblies was incorporated into a cell for evaluation and the output capability of the resulting single cell for fuel cell was evaluated. FIG. 5 shows a current density-voltage plot obtained for the thus obtained single cell for fuel cell incorporated with the membrane-electrodes assembly V.

The output voltage was 0.70 V at a current density of 1 A/cm$^2$ and 0.80 V at a current density of 300 mA/cm$^2$. Thus, said single cell was satisfactorily usable as a single cell for solid polymer electrolyte fuel cell.

Figure 6:
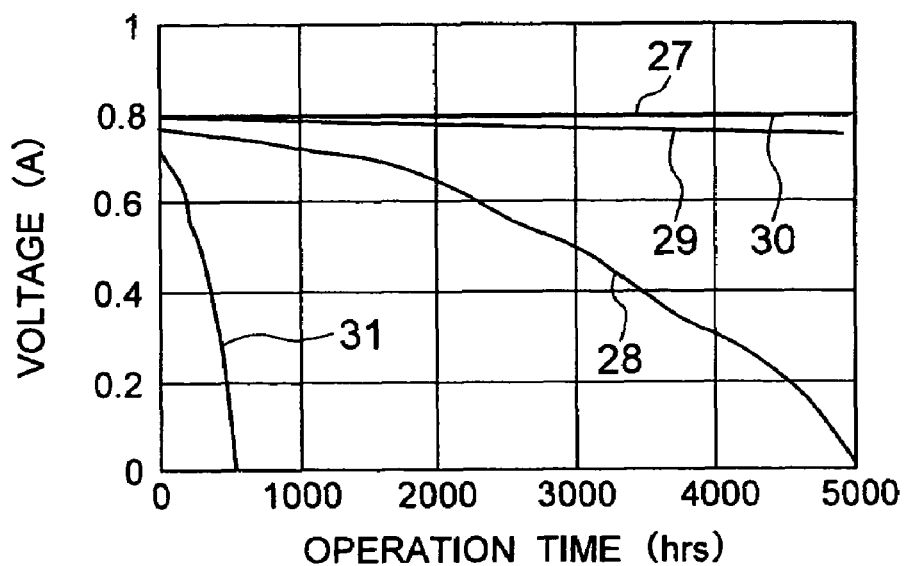
FIG. 6 is a graph showing the results of a durability test on single cells for solid polymer electrolyte fuel cell produced in Example 4.

Then, a long-term operation test was carried out at a current density of 300 mA/cm$^2$. The results obtained are shown in FIG. 6. In FIG. 6, numerals 27, 28 and 29 indicate the results of the durability test on the single cells for fuel cell obtained by using the membrane-electrodes assemblies V, V' and V''', respectively. In FIG. 6, numeral 30 indicates the result of the durability test on a single cell for fuel cell obtained by using the assembly of the perfluorocarbon sulfonic acid (Nafion 117) membrane and electrodes.

In FIG. 6, numeral 27 indicates the change with time of output voltage of the single cell for fuel cell of Example 4 produced by using a solid polymer electrolyte membrane of a polyether ether sulfone having sulfonic acid groups bonded thereto through alkylene groups and an electrocatalyst-coating solution containing the polyether ether sulfone solid polymer electrolyte having sulfonic acid groups bonded thereto through alkylene groups. Numeral 28 indicates the change with time of output voltage of the single cell for fuel cell produced in Example 4 by using a solid polymer electrolyte membrane of the polyether ether sulfone having sulfonic acid groups bonded thereto through alkylene groups and an electrocatalyst-coating solution containing a polyether ether sulfone solid polymer electrolyte having sulfonic acid groups directly bonded thereto.

Numeral 29 indicates the change with time of output voltage of the single cell for fuel cell produced in Example 4 by using a solid polymer electrolyte membrane of the polyether ether sulfone having sulfonic acid groups bonded thereto through alkylene groups and an electrocatalyst-coating solution containing the perfluorocarbon sulfonic acid solid polymer electrolyte (Nafion 117). Numeral 30 indicates the change with time of output voltage of the single cell for fuel cell obtained by using the perfluorocarbon sulfonic acid solid polymer electrolyte membrane (Nafion 117). Numeral 31 indicates the change with time of output voltage of a single cell for fuel cell of Comparative Example 4 produced by using a solid polymer electrolyte membrane of a polyether ether sulfone having sulfonic acid groups directly bonded thereto and an electrocatalyst-coating solution containing the polyether ether sulfone solid polymer electrolyte having sulfonic acid groups directly bonded thereto.

In the case of numerals 27 and 29 in FIG. 6, the initial output voltage was 0.80 V, and the output voltage had substantially the same value as its initial value even after 5,000 hours of operation. These results were equal to those obtained by the use of the perfluorocarbon sulfonic acid solid polymer electrolyte membrane (Nafion 117) and indicated by numeral 30 in FIG. 6.

On the other hand, the initial output voltage of the single cell for fuel cell indicated by numeral 31 in FIG. 6 (the single cell for fuel cell of Comparative Example 1 obtained by using the sulfonated aromatic hydrocarbon solid polymer electrolyte II) was 0.73 V, and the output of this single cell was zero after 600 hours of operation.

From this fact, it is clear that the single cell for fuel cell produced by using the aromatic hydrocarbon solid polymer electrolyte V obtained by bonding sulfonic acid groups to the aromatic rings of an aromatic hydrocarbon polymer through alkylene groups is superior in durability to the single cell for fuel cell produced by using the aromatic hydrocarbon solid polymer electrolyte II having sulfonic acid groups directly bonded thereto.

The single cells for fuel cell obtained by using the membrane-electrodes assemblies V and V''', respectively, are superior in durability to the single cell for fuel cell obtained by using the membrane-electrodes assembly V'. That is, the electrocatalyst-coating solution V is more suitable than the electrocatalyst-coating solution II, for coating an electrocatalyst for a membrane-electrodes assembly.

The reason why the output voltage of the single cell for fuel cell of Example 4 is higher than that of the single cell for fuel cell of Comparative Example 1 though the membrane-electrodes assemblies of Example 4 and Comparative Example 1 have the same amount of platinum supported of 0.25 mg/cm$^2$, is that the ion electric conductivity of the solid polymer electrolyte membrane V and electrocatalyst-coating solution V used in the membrane-electrodes assembly V of Example 4 is higher than that of the solid polymer electrolyte membrane II and electrocatalyst-coating solution II used in the membrane-electrodes assembly II of Comparative Example 1.

As can be seen from Examples 3 and 4, the initial output voltage of a single cell for fuel cell obtained by using a sulfoalkylated polyether ether sulfone solid electrolyte having a sulfonic acid equivalent weight of 530 to 970 g/equivalent is equal to or higher than the output voltage of a single cell for fuel cell obtained by using the perfluorocarbon sulfonic acid (Nafion 117) membrane. The former single cell for fuel cell is especially preferable because it is not deteriorated even when operated for 5,000 hours.

(5) Production of a Fuel Cell

A solid polymer electrolyte fuel cell was produced by laminating 36 single cells produced in the same manner as in the above item (4) according to the present invention. The fuel cell had an output of 3 kW.

EXAMPLES 5 TO 9

The inner atmosphere of a 500-ml four-necked round bottom flask equipped with a stirrer, a thermometer and a reflux condenser having a calcium chloride tube connected thereto was replaced with nitrogen. Then, 6.00 g (0.0155 mol) of a poly(1,4-biphenylene ether ether sulfone) [(—C$_6$H$_4$-4-SO$_2$C$_6$H$_4$-4-OC$_6$H$_4$-4-C$_6$H$_4$-4-O—)$_n$] dried by its maintenance at 110° C. for 10 hours and 150 ml of a dehydrated solvent were placed in the flask and heated to effect dissolution. To the resulting solution was added propanesultone.

Subsequently, anhydrous aluminum chloride thoroughly ground in a mortar was added thereto with stirring over a period of about 30 minutes. The proportions of propanesultone and anhydrous aluminum chloride are shown in Table 1.

After completion of the addition of anhydrous aluminum chloride, the resulting mixture was stirred at the temperature shown in Table 1 for the time shown in Table 1.

The precipitate formed was filtered, washed with 150 ml of chloroform and then dried under reduced pressure. The dried precipitate was suspended in 250 ml of water, finely ground in a mixer and then filtered. This procedure was repeated four times. After thorough washing with water, the water-insoluble finely ground substance thus obtained was dried at 90° C. under reduced pressure. The dried substance was subjected to $^1$HNMR to find that new peaks due to a —CH$_2$CH$_2$CH$_2$SO$_3$H group were present at 2.2 ppm and 3.8 ppm. This fact confirmed the introduction of sulfopropyl groups. There were carried out the measurement of the sulfonic acid equivalent weight of the sulfoalkylated poly(1,4-biphenylene ether ether sulfone) solid polymer electrolytes thus obtained and the evaluation of the resistance to deterioration by water of the solid polymer electrolytes, solid polymer electrolyte membranes, electrocatalyst-coating solutions and assemblies of the solid polymer electrolyte membrane and electrodes, and the evaluation of single cells for fuel cell. The results obtained are shown in Table 1.

TABLE 1

|  | Example 5 | Example 6 | Example 7 | Example 8 | Example 9 |
| --- | --- | --- | --- | --- | --- |
| Propanesultone (g) | 5.67 | 5.67 | 5.67 | 17.0 | 28.4 |
| Anhydrous aluminum chloride (g) | 6.20 | 6.20 | 6.20 | 18.6 | 24.8 |
| Dehydrated solvent | 1,1,2-trichloro-ethane | 1,1,2,2-tetra-chloro-ethane | 1,2,4-trichloro-benzene | Chloro-form | Chloro form |
| Reaction temp. (° C.) | 113 | 145 | 150 | 60 | 60 |
| Reaction time (hr) | 12 | 12 | 12 | 15 | 12 |
| Ion-exchange group equivalent weight (g/equivalent) | 620 | 610 | 590 | 730 | 680 |
| Ion-exchange group equivalent weight (g/equivalent) of a solid polymer electrolyte after its | 620 | 610 | 590 | 730 | 680 |

TABLE 1-continued

|  | Example 5 | Example 6 | Example 7 | Example 8 | Example 9 |
|---|---|---|---|---|---|
| maintenance in ion-exchanged water at 120° C. for 2 weeks |  |  |  |  |  |
| Shape of a solid polymer electrolyte membrane after its maintenance in ion-exchanged water at 120° C. for 2 weeks | No change | No change | No change | No change | No change |
| Ionic conductivity (S/cm) of a solid polymer electrolyte membrane | 16 | 17 | 19 | 13 | 15 |
| Ion-exchange group equivalent weight (g/equivalent) of an electrocatalyst-coating solution containing a solid polymer electrolyte, after its maintenance in ion-exchanged water at 120° C. for 2 weeks | 620 | 610 | 590 | 730 | 680 |
| Shape of an assembly of a solid polymer electrolyte membrane and electrodes after its maintenance in ion-exchanged water at 120° C. for 2 weeks | No change | No change | No change | No change | No change |
| Initial output (V) of a single cell at 300 mA/cm$^2$ | 0.80 | 0.80 | 0.81 | 0.79 | 0.79 |
| Output (% based on initial value) of a single cell after 5,000 hours of operation at 300 mA/cm$^2$ | 97 | 98 | 97 | 99 | 98 |

Since the sulfoalkylated poly(1,4-biphenylene ether ether sulfone) solid polymer electrolytes can be produced through one step by using an inexpensive commercial engineering plastic as a starting material, the cost of production thereof is as low as less than one-forties that of the perfluorocarbon sulfonic acid solid polymer electrolyte (Nafion 117) produced through five steps by using an expensive starting material.

In a Teflon-coated closed container made of SUS, each of the sulfoalkylated poly(1,4-biphenylene ether ether sulfone) solid polymer electrolytes of Examples 5 to 9 was maintained at 120° C. for 2 weeks in ion-exchanged water. The sulfonic acid equivalent weight of each solid polymer electrolyte after the maintenance was the same as its initial value unlike that of the sulfonated poly(1,4-biphenylene ether ether sulfone) solid polymer electrolyte II of Comparative Example 1, namely, the solid polymer electrolytes of Examples 5 to 9 were stable like the perfluorocarbon sulfonic acid solid polymer electrolyte (Nafion 117). Thus, the solid polymer electrolytes of Examples 5 to 9 were excellent in both cost and resistance to hydrolysis (durability).

In a Teflon-coated closed container made of SUS, each of the sulfoalkylated poly(1,4-biphenylene ether ether sulfone) solid polymer electrolyte membranes of Examples 5 to 9 was maintained at 120° C. for 2 weeks in ion-exchanged water. The shape of each solid polymer electrolyte membrane after the maintenance was the same as the initial shape unlike that of the sulfonated poly(1,4-biphenylene ether ether sulfone) solid polymer electrolyte membrane of Comparative Example 1, namely, the solid polymer electrolyte membranes of Examples 5 to 9 were stable like the perfluorocarbon sulfonic acid solid polymer electrolyte membrane (Nafion 117). Thus, the solid polymer electrolyte membranes of Examples 5 to 9 were excellent in both cost and resistance to hydrolysis (durability).

In a Teflon-coated closed container made of SUS, each of the electrocatalyst-coating solutions of Examples 5 to 9 was maintained at 120° C. for 2 weeks in ion-exchanged water. The sulfonic acid equivalent weight of each electrocatalyst-coating solution was the same as its initial value unlike that of the electrocatalyst-coating solution II of Comparative Example 1, namely, the electrocatalyst-coating solutions of Examples 5 to 9 were stable like the perfluorocarbon sulfonic acid (Nafion 117) electrocatalyst-coating solution. Thus, the electrocatalyst-coating solutions of Examples 5 to 9 were excellent in both cost and resistance to hydrolysis (durability).

Even when each of the assemblies of the sulfoalkylated poly(1,4-biphenylene ether ether sulfone) solid polymer electrolyte membrane and electrodes of Examples 5 to 9 was heated at 120° C. for 2 weeks together with ion-exchanged water in a Teflon-coated closed container made of SUS, these assemblies were not changed unlike the assembly of the sulfonated poly(1,4-biphenylene ether ether sulfone) membrane and electrodes of Comparative Example 1, namely, the assemblies of Examples 5 to 9 were stable like the assembly of the perfluorocarbon sulfonic acid (Nafion 117) solid polymer electrolyte membrane and electrodes. Thus, the assemblies of Examples 5 to 9 were excellent in both cost and resistance to hydrolysis (durability).

The single cells using the sulfoalkylated poly(1,4-biphenylene ether ether sulfone) solid polymer electrolyte membranes of Examples 5 to 9, respectively, were operated at 300 mA/cm$^2$ for 5,000 hours. After the operation, the output of each single cell was the same as its initial value unlike that of the single cell using the sulfonated poly(1,4-biphenylene ether ether sulfone) solid polymer electrolyte membrane of Comparative Example 1, namely, the single cells of Examples 5 to 9 were stable like a single cell using the perfluorocarbon sulfonic acid solid polymer electrolyte membrane (Nafion 117). Thus, the single cells of Examples 5 to 9 were excellent in both cost and resistance to hydrolysis (durability).

EXAMPLE 10

(1) Synthesis of a sulfobutylated poly(1,4-biphenylene ether ether sulfone)

The inner atmosphere of a 500-ml four-necked round bottom flask equipped with a stirrer, a thermometer and a reflux condenser having a calcium chloride tube connected thereto was replaced with nitrogen. Then, 6.00 g (0.0155 mol) of a poly(1,4-biphenylene ether ether sulfone) [(—$C_6H_4$-4-$SO_2C_6H_4$-4-$OC_6H_4$-4-$C_6H_4$-4-O—)$_n$] dried by its maintenance at 110° C. for 10 hours and 150 ml of dehydrated chloroform were placed in the flask and maintained at 60° C. for about 1 hour to effect dissolution. To the resulting solution was added 6.26 g (0.0464 mol) of butanesultone.

Subsequently, 6.19 g (0.0464 mol) of anhydrous aluminum chloride thoroughly ground in a mortar was added thereto with stirring over a period of about 30 minutes. After completion of the addition of anhydrous aluminum chloride, the resulting mixture was refluxed with stirring at 60° C. for 20 hours. The precipitate was filtered, washed with 150 ml of chloroform and then dried under reduced pressure. The dried precipitate was suspended in 250 ml of water and finely ground in a mixer, and the resulting finely ground substance was filtered. This procedure was repeated four times. After thorough washing with water, the water-insoluble finely ground substance thus obtained was dried at 90° C. under reduced pressure. The dried substance was subjected to $^1$HNMR measurement to find that new peaks due to a —$CH_2CH_2CH_2CH_2SO_3H$ group were present at 1.6 to 3.8 ppm. This fact confirmed the introduction of sulfobutyl groups.

The sulfonic acid equivalent weight of the sulfobutylated poly(1,4-biphenylene ether ether sulfone) solid polymer electrolyte VI thus obtained was 670 g/equivalent.

Since the sulfobutylated poly(1,4-biphenylene ether ether sulfone) solid polymer electrolyte VI can be produced through one step by using the poly(1,4-biphenylene ether ether sulfone), a relatively inexpensive commercial engineering plastic, as a starting material, the cost of production thereof is as low as less than one-fiftieth that of the perfluorocarbon sulfonic acid solid polymer electrolyte (Nafion 117) produced through five steps by using an expensive starting material.

The sulfobutylated poly(1,4-biphenylene ether ether sulfone) solid polymer electrolyte VI is advantageous from the viewpoint of cost because it can be produced through one step like the sulfopropylated poly(1,4-biphenylene ether ether sulfone) solid polymer electrolyte V and hence can be synthesized at a lower cost as compared with a sulfomethylated poly(1,4-biphenylene ethyl ether sulfone) solid polymer electrolyte and a sulfohexamethylated poly(1,4-biphenylene ether ether sulfone) solid polymer electrolyte which are produced through two steps as described hereinafter in Examples 11 and 12.

In a Teflon-coated closed container made of SUS, 1.0 g of the obtained sulfobutylated poly(1,4-biphenylene ether ether sulfone) solid polymer electrolyte VI and 20 ml of ion-exchanged water were maintained at 120° C. for 2 weeks. After cooling and thorough washing with water, the ion-exchange group equivalent weight of the sulfobutylated poly(1,4-biphenylene ether ether sulfone) solid polymer electrolyte VI was measured.

As a result, it was found that the ion-exchange group equivalent weight of the sulfobutylated poly(1,4-biphenylene ether ether sulfone) solid polymer electrolyte VI was 670 g/equivalent, the same value as the initial value, namely, the solid polymer electrolyte VI was stable like the perfluorocarbon sulfonic acid solid polymer electrolyte (Nafion 117).

On the other hand, as described in Comparative Example 1, (1), the ion-exchange group equivalent weight of the inexpensive sulfonated poly(1,4-biphenylene ether ether sulfone) solid polymer electrolyte II was increased to 1,200 g/equivalent from its initial value of 650 g/equivalent under the same conditions of hydrolysis by heating as above, namely, sulfonic acid groups were released from the solid polymer electrolyte II.

Thus, unlike the sulfonated poly(1,4-biphenylene ether ether sulfone) solid polymer electrolyte II of Comparative Example 1, the inexpensive sulfobutylated poly(1,4-biphenylene ether ether sulfone) solid polymer electrolyte VI was stable like the perfluorocarbon sulfonic acid solid polymer electrolyte (Nafion 117) and was excellent in both cost and resistance to hydrolysis (durability).

(2) Formation of a Solid Polymer Electrolyte Membrane

The product obtained in the above item (1) was dissolved in a N,N-dimethylformamide-cyclohexanone-methyl ethyl ketone mixed solvent (volume ratio; 20:80:25) to a concentration of 5 wt %. The resulting solution was spread on a glass plate by spin coating, air-dried and then dried in vacuo at 80° C. to form a solid polymer electrolyte membrane VI of 25 μm in thickness. The ion electric conductivity of the obtained solid polymer electrolyte membrane VI was 25 S/cm.

In a Teflon-coated closed container made of SUS, the aforesaid solid polymer electrolyte membrane VI and 20 ml of ion-exchanged water were maintained at 120° C. for 2 weeks. After the maintenance, the ion electric conductivity of the electrolyte membrane VI was the same as its initial value like that of the perfluorocarbon sulfonic acid solid polymer electrolyte membrane (Nafion 117) produced at a high cost, and the solid polymer electrolyte membrane VI was firm.

On the other hand, as described in Comparative Example 1, (2), the relatively inexpensive sulfonated aromatic hydrocarbon solid polymer electrolyte membrane II was broken to tatters under the same conditions of hydrolysis by heating as above. Thus, unlike the sulfonated poly(1,4-biphenylene ether ether sulfone) solid polymer electrolyte membrane II of Comparative Example 1, the inexpensive sulfobutylated poly (1,4-biphenylene ether ether sulfone) solid polymer electrolyte membrane VI was stable like the perfluorocarbon sulfonic acid solid polymer electrolyte membrane (Nation 117) and was excellent in both cost and resistance to hydrolysis (durability).

(3) Production of Electrocatalyst-coating Solutions and Membrane-electrodes Assemblies The same solution as in the above item (2), i.e., a 5 wt % solution of the solid polymer electrolyte VI in the N,N-dimethylformamide-cyclohexanone-methyl ethyl ketone mixed solvent was added to platinum-supporting carbon (content of platinum supported: 40 wt %), so that the weight ratio of platinum catalyst to the solid polymer electrolyte might be 2:1. The platinum-supporting carbon was uniformly dispersed in the solution to prepare a paste (an electrocatalyst-coating solution VI).

In a Teflon-coated closed container made of SUS, 1.0 g of the aforesaid electrocatalyst-coating solution VI and 20 ml of ion-exchanged water were maintained at 120° C. for 2 weeks. After cooling, the solvent was vaporized and the resulting solid was washed with water. Then, the ion-exchange group equivalent weight of the electrocatalyst-coating solution VI after the maintenance was measured. As a result, it was found that the ion-exchange group equivalent weight of said solution VI was 670 g/equivalent, the same value as the initial value, namely, the solution VI was stable like the perfluorocarbon sulfonic acid (Nafion 117) electrocatalyst-coating solution.

On the other hand, as described in Comparative Example 1, (2), the ion-exchange group equivalent weight of the electrocatalyst-coating solution II was increased to 1,200 g/equivalent from its initial value of 650 g/equivalent under the same conditions of hydrolysis by heating as above, namely, sulfonic acid groups were released. Thus, unlike the electrocatalyst-coating solution II of Comparative Example 1, the inexpensive electrocatalyst-coating solution VI was stable like the perfluorocarbon sulfonic acid (Nafion 117) electrocatalyst-coating solution and was excellent in both cost and resistance to hydrolysis (durability).

The aforesaid electrocatalyst-coating solution VI was applied on both sides of the solid polymer electrolyte membrane VI obtained in the above item (2), and was dried to produce a membrane-electrodes assembly VI having an amount of platinum supported of 0.25 mg/cm$^2$.

The electrocatalyst-coating solution II described in Comparative Example 1, (2) was applied on both sides of the same solid polymer electrolyte membrane VI as that obtained in the above item (2), and was dried to produce a membrane-electrodes assembly VI' having an amount of platinum supported of 0.25 mg/cm$^2$.

A 5 wt % solution of the perfluorocarbon sulfonic acid solid polymer electrolyte in an alcohol-water mixed solvent was added to platinum-supporting carbon (content of platinum supported: 40 wt %), so that the weight ratio of platinum catalyst to the solid polymer electrolyte might be 2:1. The platinum-supporting carbon was uniformly dispersed in the solution to prepare a paste (an electrocatalyst-coating solution). This electrocatalyst-coating solution was applied on both sides of the same solid polymer electrolyte membrane VI as that obtained in the above item (2), and was dried to produce a membrane-electrodes assembly VI" having an amount of platinum supported of 0.25 mg/cm$^2$.

In a Teflon-coated closed container made of SUS, the aforesaid membrane-electrodes assembly VI obtained and 20 ml of ion-exchanged water were maintained at 120° C. for 2 weeks. After the maintenance, the membrane-electrodes assembly VI was not different from that before the maintenance like a membrane-electrodes assembly produced at a high cost by using the perfluorocarbon sulfonic acid solid polymer electrolyte membrane (Nafion 117) and the perfluorocarbon sulfonic acid solid polymer electrolyte (Nafion 117), and its membrane was firm.

In a Teflon-coated closed container made of SUS, the aforesaid membrane-electrodes assembly VI' and 20 ml of ion-exchanged water were maintained at 120° C. for 2 weeks. In the membrane-electrodes assembly VI' after the maintenance, the electrodes were peeling a little but the membrane was firm. The assembly VI' after the maintenance had power-generating capability.

In a Teflon-coated closed container made of SUS, the aforesaid membrane-electrodes assembly VI" and 20 ml of ion-exchanged water were maintained at 120° C. for 2 weeks. In the membrane-electrodes assembly VI" after the maintenance, the electrodes were peeling a little but the membrane was firm. The assembly VI" after the maintenance had power-generating capability.

On the other hand, as described in Comparative Example 1, (3), the membrane of the membrane-electrodes assembly II produced by using the relatively inexpensive sulfonated aromatic hydrocarbon solid polymer electrolyte membrane II and the electrocatalyst-coating solution II was broken to tatters and the electrodes of the assembly were peeled, under the same conditions of hydrolysis by heating as above.

Thus, unlike the membrane-electrodes assembly II of Comparative Example 1, i.e., the assembly of the sulfonated poly(1,4-biphenylene ether ether sulfone) solid polymer electrolyte membrane and electrodes, the inexpensive assembly VI of the sulfobutylated poly(1,4-biphenylene ether ether sulfone) solid polymer electrolyte membrane and electrodes was stable like the assembly of the perfluorocarbon sulfonic acid (Nafion 117) membrane and electrodes, and was excellent in both cost and resistance to hydrolysis (durability).

(4) Evaluation of the Output Capability of Single Cells for Fuel Cell

Figure 7:
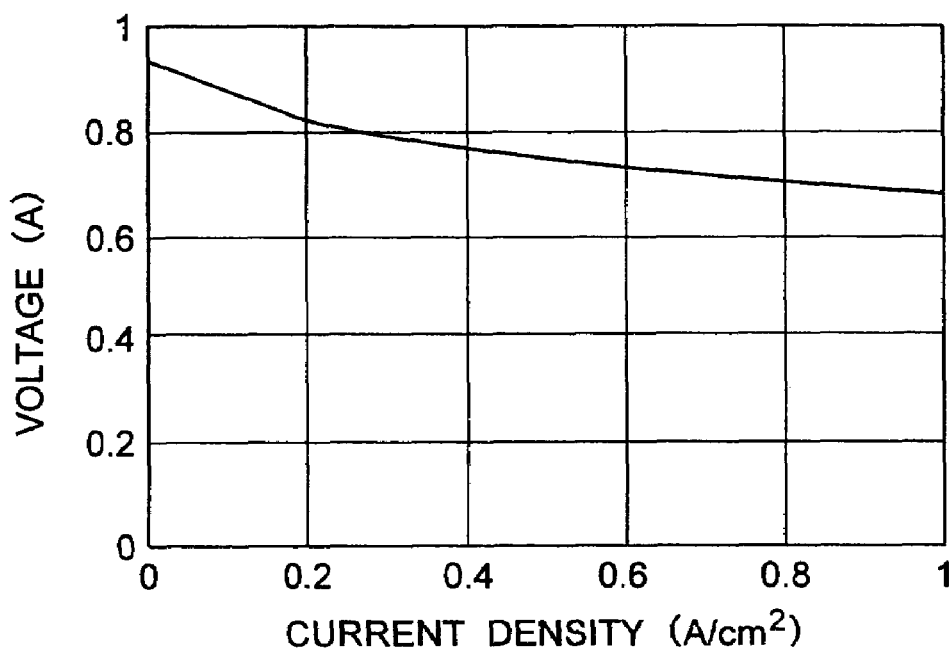
FIG. 7 is a current density-voltage graph showing the output capability of a single cell for solid polymer electrolyte fuel cell produced in Example 10.

The above-mentioned membrane-electrodes assemblies VI, VI' and VI" were allowed to absorb water by immersion in boiling deionized water for 2 hours. Each of the thus treated membrane-electrodes assemblies was incorporated into a cell for evaluation. The output capability of the single cells for fuel cell thus obtained was evaluated. FIG. 7 shows a current density-voltage plot obtained for the thus obtained single cell for fuel cell incorporated with the membrane-electrodes assembly VI.

The output voltage was 0.70 V at a current density of 1 A/cm$^2$ and 0.79 V at a current density of 300 mA/cm$^2$. Thus, said single cell was satisfactorily usable as a single cell for solid polymer electrolyte fuel cell.

The above-mentioned single cells for solid polymer electrolyte fuel cell were produced by adhering a packing material (a supporting current collector) of thin carbon paper to each side of each of the membrane-electrodes assemblies VI, VI' and VI" produced in Example 10, and providing an electroconductive separator (a bipolar plate) capable of serving as a separator between electrode chambers and passageways for gas supply to the electrodes, on the outer surface of each packing material. The single cells were subjected to a long-term operation test at a current density of 300 mA/cm$^2$. The results obtained are shown in FIG. 8.

Figure 8:
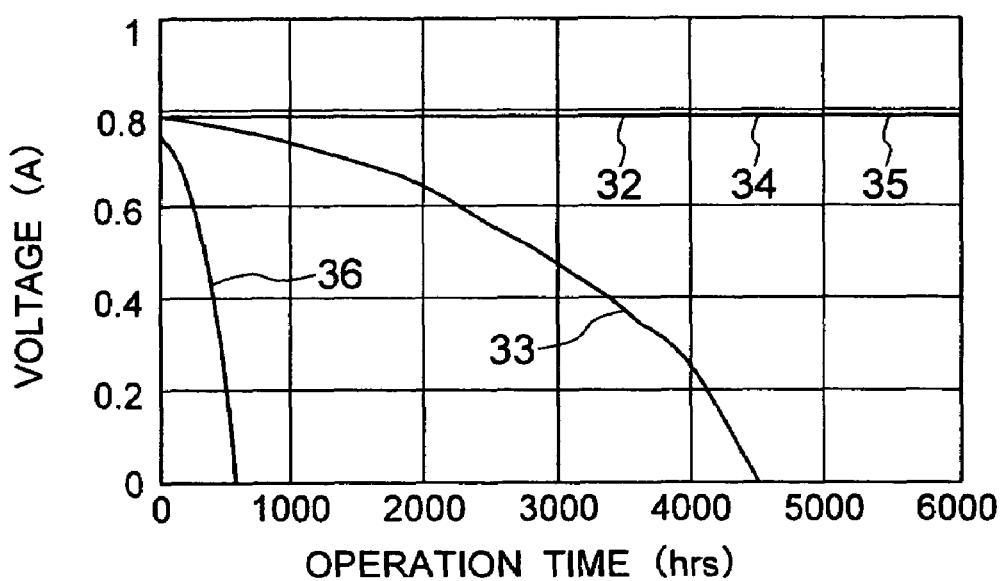
FIG. 8 is a graph showing the results of a durability test on single cells for solid polymer electrolyte fuel cell produced in Example 10.

In FIG. 8, numerals 32, 33 and 34 indicate the results of the durability test on the single cells for fuel cell obtained by using the membrane-electrodes assemblies VI, VI' and VI", respectively. In FIG. 8, numeral 35 indicates the result of the durability test on a single cell for fuel cell obtained by using the assembly of the perfluorocarbon sulfonic acid (Nafion 117) membrane and electrodes.

In FIG. 8, numeral 32 indicates the change with time of output voltage of the single cell for fuel cell of Example 10 produced by using a solid polymer electrolyte membrane of a polyether ether sulfone having sulfonic acid groups bonded thereto through alkylene groups and an electrocatalyst-coating solution containing the polyether ether sulfone solid polymer electrolyte having sulfonic acid groups bonded thereto through alkylene groups. Numeral 33 indicates the change with time of output voltage of the single cell for fuel cell produced in Example 10 by using a solid polymer electrolyte membrane of the polyether ether sulfone having sulfonic acid groups bonded thereto through alkylene groups and an electrocatalyst-coating solution containing a polyether ether sulfone solid polymer electrolyte having sulfonic acid groups directly bonded thereto.

Numeral 34 indicates the change with time of output voltage of the single cell for fuel cell produced in Example 10 by using a solid polymer electrolyte membrane of the polyether ether sulfone having sulfonic acid groups bonded thereto through alkylene groups and an electrocatalyst-coating solution containing the perfluorocarbon sulfonic acid solid polymer electrolyte (Nafion 117). Numeral 35 indicates the change with time of output voltage of the single cell for fuel cell obtained by using the perfluorocarbon sulfonic acid solid polymer electrolyte membrane (Nafion 117). Numeral 36 indicates the change with time of output voltage of a single cell for fuel cell of Comparative Example 10 produced by using a solid polymer electrolyte membrane of a polyether ether sulfone having sulfonic acid groups directly bonded thereto and an electrocatalyst-coating solution containing the polyether ether sulfone solid polymer electrolyte having sulfonic acid groups directly bonded thereto.

In the case of numerals 32 and 34 in FIG. 8, the initial output voltage was 0.79 V, and the output voltage had the same value as its initial value even after 5,000 hours of operation. These results were equal to those obtained by the use of the perfluorocarbon sulfonic acid solid polymer electrolyte membrane (Nafion 117) and indicated by numeral 35 in FIG. 8.

On the other hand, the initial voltage of the single cell for fuel cell indicated by numeral 36 in FIG. 8 (the single cell for fuel cell of Comparative Example 1 obtained by using the sulfonated aromatic hydrocarbon solid polymer electrolyte II) was 0.73 V, and the output of this single cell was zero after 600 hours of operation.

From this fact, it is clear that the single cell for fuel cell produced by using the aromatic hydrocarbon solid polymer electrolyte VI obtained by bonding sulfonic acid groups to the aromatic rings of an aromatic hydrocarbon polymer through alkylene groups is superior in durability to the single cell for fuel cell produced by using the aromatic hydrocarbon solid polymer electrolyte II having sulfonic acid groups directly bonded thereto.

The single cells for fuel cell obtained by using the membrane-electrodes assemblies VI and VI'', respectively, are superior in durability to the single cell for fuel cell obtained by using the membrane-electrodes assembly VI'.

That is, the electrocatalyst-coating solution VI is more suitable than the electrocatalyst-coating solution II, for coating an electrocatalyst for a membrane-electrodes assembly.

The reason why the output voltage of the single cell for fuel cell of Example 10 is higher than that of the single cell for fuel cell of Comparative Example 1 though the membrane-electrodes assemblies of Example 10 and Comparative Example 1 have the same amount of platinum supported of 0.25 mg/cm$^2$, is that the ion electric conductivity of the solid polymer electrolyte membrane VI and electrocatalyst-coating solution VI used in the membrane-electrodes assembly of Example 10 is higher than that of the solid polymer electrolyte membrane II and electrocatalyst-coating solution II used in the membrane-electrodes assembly of Comparative Example 1.

(5) Production of a Fuel Cell

A solid polymer electrolyte fuel cell was produced by laminating 36 single cells produced in the same manner as in the above item (4) according to the present invention. The fuel cell had an output of 3 kW.

EXAMPLE 11

1) Synthesis of a chloromethylated poly(1,4-biphenylene ether ether sulfone)

The inner atmosphere of a 500-ml four-necked round bottom flask equipped with a stirrer, a thermometer and a reflux condenser having a calcium chloride tube connected thereto was replaced with nitrogen. Thereafter, 36.1 g of a poly(1,4-biphenylene ether ether sulfone) [(—$C_6H_4$-4-$SO_2C_6H_4$-4-$OC_6H_4$-4-O—)$_n$], 60 g (2 mols) of paraformaldehyde and 50 ml of dried nitrobenzene were placed in the flask. Then, 73 g of hydrogen chloride gas was bubbled thereinto with stirring while maintaining the temperature at 100° C. After completion of the bubbling, the resulting mixture was maintained at 150° C. for 4 hours.

Subsequently, the reaction solution was slowly dropped into 1 liter of deionized water to precipitate a chloromethylated poly(1,4-biphenylene ether ether sulfone), which was recovered by filtration. The recovered precipitate was repeatedly subjected to washing with deionized water in a mixer and recovery by filtration by suction until the filtrate became neutral. Thereafter, the precipitate thus treated was dried overnight at 80° C. under reduced pressure.

(2) Synthesis of a sulfomethylated poly(1,4-biphenylene ether ether sulfone)

The inner atmosphere of a 500-ml four-necked round bottom flask equipped with a stirrer, a thermometer and a reflux condenser having a calcium chloride tube connected thereto was replaced with nitrogen. Thereafter, 10 g of the aforesaid chloromethylated poly(1,4-biphenylene ether ether sulfone), 50 ml of dried nitrobenzene and 30 g of sodium sulfate were placed in the flask and stirred at 100° C. for 5 hours. Then, 10 ml of ion-exchanged water was added thereto and stirred for 5 hours.

Subsequently, the reaction solution was slowly dropped into 1 liter of deionized water to precipitate a sulfomethylated poly(1,4-biphenylene ether ether sulfone), which was recovered by filtration. The recovered precipitate was repeatedly subjected to washing with deionized water in a mixer and recovery by filtration by suction until the filtrate became neutral. Thereafter, the precipitate thus treated was dried overnight at 120° C. under reduced pressure.

The dried precipitate was subjected to $^1$HNMR measurement to find that a new peak due to a —$CH_2SO_3H$ group was present at 4.5 ppm. This fact confirmed the introduction of sulfomethyl groups. The ion-exchange group equivalent weight of the sulfomethylated poly(1,4-biphenylene ether ether sulfone) solid polymer electrolyte VII thus obtained was 660 g/equivalent.

Since the sulfomethylated poly(1,4-biphenylene ether ether sulfone) solid polymer electrolyte VII can be produced by the above process through two steps by using the poly(1,4-biphenylene ether ether sulfone), an inexpensive commercial engineering plastic, as a starting material, the cost of production thereof is as very low as less than one-thirtieth that of the perfluorocarbon sulfonic acid solid polymer electrolyte (Nafion 117) produced through five steps by using an expensive starting material.

In a Teflon-coated closed container made of SUS, 1.0 g of the obtained sulfomethylated poly(1,4-biphenylene ether ether sulfone) solid polymer electrolyte VII and 20 ml of ion-exchanged water were maintained at 120° C. for 2 weeks. After cooling and thorough washing with water, the ion-exchange group equivalent weight of the sulfomethylated poly(1,4-biphenylene ether ether sulfone) solid polymer electrolyte VII was measured.

As a result, it was found that the ion-exchange group equivalent weight of the sulfomethylated poly(1,4-biphenylene ether ether sulfone) solid polymer electrolyte VII was 660 g/equivalent, the same value as the initial value, namely, the solid polymer electrolyte VII was stable like the perfluorocarbon sulfonic acid solid polymer electrolyte (Nafion 117).

On the other hand, as described in Comparative Example 1, (1), the ion-exchange group equivalent weight of the inexpensive sulfonated aromatic hydrocarbon solid polymer electrolyte II was increased to 1,200 g/equivalent from its initial value of 650 g/equivalent under the same conditions of hydrolysis by heating as above, namely, sulfonic acid groups were released from the solid polymer electrolyte II.

Thus, unlike the inexpensive sulfonated poly(1,4-biphenylene ether ether sulfone) solid polymer electrolyte II, the inexpensive sulfomethylated poly(1,4-biphenylene ether ether sulfone) solid polymer electrolyte VII was stable like the expensive perfluorocarbon sulfonic acid solid polymer electrolyte (Nafion 117) and was excellent in both cost and resistance to hydrolysis (durability).

(3) Formation of a Solid Polymer Electrolyte Membrane

The sulfomethylated poly(1,4-biphenylene ether ether sulfone) solid polymer electrolyte VII obtained in the above item (2) was dissolved in a 1:1 mixed solvent of trichloroethane and dichloroethane to a concentration of 5 wt %. The resulting solution was spread on a glass plate by spin coating, air-dried and then dried in vacuo at 80° C. to form a sulfomethylated poly(1,4-biphenylene ether ether sulfone) solid polymer electrolyte membrane VII of 42 μm in thickness. The ionic conductance of the obtained solid polymer electrolyte membrane VII was 7 S/cm.

In a Teflon-coated closed container made of SUS, the aforesaid sulfomethylated poly(1,4-biphenylene ether ether sulfone) solid polymer electrolyte membrane VII and 20 ml of ion-exchanged water were maintained at 120° C. for 2 weeks. After the maintenance, the ion electric conductivity of the solid polymer electrolyte membrane VII was the same as its initial value like that of the perfluorocarbon sulfonic acid solid polymer electrolyte membrane (Nafion 117) produced at a high cost, and the solid polymer electrolyte membrane VII was firm.

On the other hand, as described in Comparative Example 1, (2), the relatively inexpensive sulfonated poly(1,4-biphenylene ether ether sulfone) solid polymer electrolyte membrane II was broken to tatters under the same conditions of hydrolysis by heating as above. Thus, unlike the inexpensive sulfonated poly(1,4-biphenylene ether ether sulfone) solid polymer electrolyte membrane II, the inexpensive sulfomethylated poly(1,4-biphenylene ether ether sulfone) solid polymer electrolyte membrane VII was stable like the expensive perfluorocarbon sulfonic acid solid polymer electrolyte membrane (Nafion 117) and was excellent in both cost and resistance to hydrolysis (durability).

(4) Production of Electrocatalyst-coating Solutions and Membrane-electrodes Assemblies The same solution as in the above item (3), i.e., a 5 wt % solution of the solid polymer electrolyte VII in the trichloroethane-dichloroethane mixed solvent was added to platinum-supporting carbon (content of platinum supported: 40 wt %), so that the weight ratio of platinum catalyst to the solid polymer electrolyte might be 2:1. The platinum-supporting carbon was uniformly dispersed in the solution to prepare a paste (an electrocatalyst-coating solution VII).

In a Teflon-coated closed container made of SUS, 1.0 g of the aforesaid electrocatalyst-coating solution VII and 20 ml of ion-exchanged water were maintained at 120° C. for 2 weeks. After cooling, the solvent was vaporized and the resulting solid was washed with water. Then, the ion-exchange group equivalent weight of the electrocatalyst-coating solution VII after the maintenance was measured. As a result, it was found that the ion-exchange group equivalent weight of the electrocatalyst-coating solution VII was 660 g/equivalent, the same value as the initial value, namely, the electrocatalyst-coating solution VII was stable like the perfluorocarbon sulfonic acid (Nafion 117) electrocatalyst-coating solution.

On the other hand, as described in Comparative Example 1, (2), the ion-exchange group equivalent weight of the electrocatalyst-coating solution II was increased to 1,200 g/equivalent from its initial value of 650 g/equivalent under the same conditions of hydrolysis by heating as above, namely, sulfonic acid groups were released.

Thus, unlike the electrocatalyst-coating solution II of Comparative Example 1, the inexpensive electrocatalyst-coating solution VII was stable like the perfluorocarbon sulfonic acid (Nafion 117) electrocatalyst-coating solution and was excellent in both cost and resistance to hydrolysis (durability).

The aforesaid electrocatalyst-coating solution VII was applied on both sides of the solid polymer electrolyte membrane VII obtained in the above item (3), and was dried to produce a membrane-electrodes assembly VII having an amount of platinum supported of 0.25 mg/cm$^2$.

The electrocatalyst-coating solution II described in Comparative Example 1, (2) was applied on both sides of the same solid polymer electrolyte membrane VII as that obtained in the above item (2), and was dried to produce a membrane-electrodes assembly VII' having an amount of platinum supported of 0.25 mg/cm$^2$. A 5 wt % solution of the perfluorocarbon sulfonic acid solid polymer electrolyte in an alcohol-water mixed solvent was added to platinum-supporting carbon (content of platinum supported: 40 wt %), so that the weight ratio of platinum catalyst to the solid polymer electrolyte might be 2:1. The platinum-supporting carbon was uniformly dispersed in the solution to prepare a paste (an electrocatalyst-coating solution). This electrocatalyst-coating solution was applied on both sides of the same solid polymer electrolyte membrane VII as that obtained in the above item (3), and was dried to produce a membrane-electrodes assembly VII" having an amount of platinum supported of 0.25 mg/cm$^2$.

In a Teflon-coated closed container made of SUS, the aforesaid membrane-electrodes assembly VII obtained and 20 ml of ion-exchanged water were maintained at 120° C. for 2 weeks. After the maintenance, the membrane-electrodes assembly VII was not different from that before the maintenance like a membrane-electrodes assembly produced at a high cost by using the perfluorocarbon sulfonic acid solid polymer electrolyte membrane (Nafion 117) and the perfluorocarbon sulfonic acid solid polymer electrolyte (Nafion 117), and its membrane was firm.

In a Teflon-coated closed container made of SUS, the aforesaid membrane-electrodes assembly VII' and 20 ml of ion-exchanged water were maintained at 120° C. for 2 weeks. In the membrane-electrodes assembly VII' after the maintenance, the electrodes were peeling a little but the membrane was firm. The assembly VII' after the maintenance had power-generating capability.

In a Teflon-coated closed container made of SUS, the aforesaid membrane-electrodes assembly VII" obtained and 20 ml of ion-exchanged water were maintained at 120° C. for 2 weeks. In the membrane-electrodes assembly VII" after the maintenance, the electrodes were peeling a little but the membrane was firm. The assembly VII" after the maintenance had power-generating capability.

On the other hand, as described in Comparative Example 1, (3), the membrane of the membrane-electrodes assembly II produced by using the relatively inexpensive sulfonated poly (1,4-biphenylene ether ether sulfone) solid polymer electrolyte membrane II and the electrocatalyst-coating solution II was broken to tatters and the electrodes of the assembly were peeled, under the same conditions of hydrolysis by heating as above. Thus, unlike the membrane-electrodes assembly II of Comparative Example 1, i.e., the assembly of the sulfonated poly(1,4-biphenylene ether ether sulfone) solid polymer electrolyte membrane and electrodes, the inexpensive assembly VII of the sulfomethylated poly(1,4-biphenylene ether ether sulfone) solid polymer electrolyte membrane and electrodes was stable like the assembly of the perfluorocarbon sulfonic acid (Nafion 117) membrane and electrodes, and was excellent in both cost and resistance to hydrolysis (durability).

(5) Evaluation of the Output Capability of Single Cells for Fuel Cell

Figure 9:
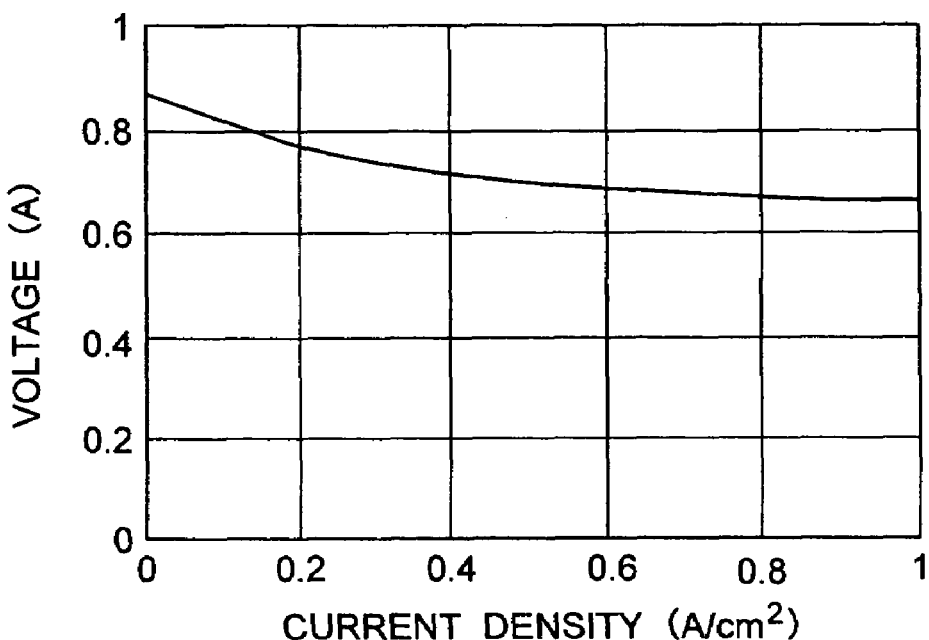
FIG. 9 is a current density-voltage graph showing the output capability of a single cell for solid polymer electrolyte fuel cell produced in Example 11.

The above-mentioned membrane-electrodes assemblies VII, VII' and VII" were allowed to absorb water by immersion in boiling deionized water for 2 hours. Each of the thus treated membrane-electrodes assemblies was incorporated into a cell for evaluation. The output capability of the resulting single cell for fuel cell incorporated with the membrane-electrodes assembly VII was evaluated. FIG. 9 shows a current density-output voltage plot obtained. The output voltage was 0.65 V at a current density of 1 A/cm$^2$ and 0.74 V at a current density of 300 mA/cm$^2$. Thus, the single cell for fuel cell incorporated with the membrane-electrodes assembly VII was satisfactorily usable as a single cell for solid polymer electrolyte fuel cell.

The single cells for solid polymer electrolyte fuel cell obtained above were subjected to a long-term operation test at a current density of 300 mA/cm$^2$. The results obtained are shown in FIG. 10.

Figure 10:
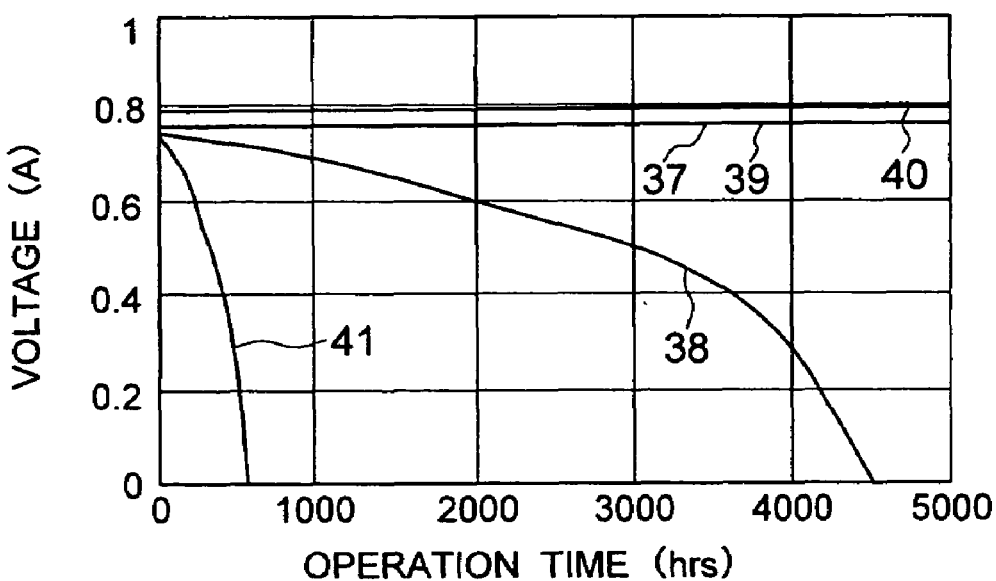
FIG. 10 is a graph showing the results of a durability test on single cells for solid polymer electrolyte fuel cell produced in Example 11.

In FIG. 10, numerals 37, 38 and 39 indicate the results of the durability test on the single cells for fuel cell obtained by using the assemblies VII, VII' and VII", respectively, of the solid polymer electrolyte membrane and electrodes. In FIG. 10, numeral 40 indicates the result of the durability test on a single cell for fuel cell obtained by using the assembly of the perfluorocarbon sulfonic acid (Nafion 117) solid polymer electrolyte membrane and electrodes.

In FIG. 10, numeral 37 indicates the change with time of output voltage of the single cell for fuel cell of Example 11 produced by using a solid polymer electrolyte membrane of a polyether ether sulfone having sulfonic acid groups bonded thereto through alkylene groups and an electrocatalyst-coating solution containing the polyether ether sulfone solid polymer electrolyte having sulfonic acid groups bonded thereto through alkylene groups. Numeral 38 indicates the change with time of output voltage of the single cell for fuel cell produced in Example 11 by using a solid polymer electrolyte membrane of the polyether ether sulfone having sulfonic acid groups bonded thereto through alkylene groups and an electrocatalyst-coating solution containing a polyether ether sulfone solid polymer electrolyte having sulfonic acid groups directly bonded thereto. Numeral 39 indicates the change with time of output voltage of the single cell for fuel cell produced in Example 11 by using a solid polymer electrolyte membrane of the polyether ether sulfone having sulfonic acid groups bonded thereto through alkylene groups and an electrocatalyst-coating solution containing the perfluorocarbon sulfonic acid solid polymer electrolyte (Nafion 117). Numeral 40 indicates the change with time of output voltage of the single cell for fuel cell obtained by using the perfluorocarbon sulfonic acid solid polymer electrolyte membrane (Nafion 117). Numeral 41 indicates the change with time of output voltage of a single cell for fuel cell of Comparative Example 11 produced by using a solid polymer electrolyte membrane of a polyether ether sulfone having sulfonic acid groups directly bonded thereto and an electrocatalyst-coating solution containing the polyether ether sulfone solid polymer electrolyte having sulfonic acid groups directly bonded thereto.

In the case of numerals 37 and 39 in FIG. 10, the initial voltage is 0.74 V, and the voltage had the same value as the initial value even after 5,000 hours of operation. These results were equal to those obtained by the use of the perfluorocarbon sulfonic acid solid polymer electrolyte membrane (Nafion 117) and indicated by numeral 40 in FIG. 10.

On the other hand, the initial voltage of the single cell for fuel cell indicated by numeral 41 in FIG. 10 (the single cell for fuel cell of Comparative Example 1 obtained by using the sulfonated poly(1,4-biphenylene ether ether sulfone) solid polymer electrolyte membrane II) was 0.73 V, and the output of this single cell was zero after 600 hours of operation.

From this fact, it is clear that the single cell for fuel cell produced by using the aromatic hydrocarbon solid polymer electrolyte obtained by bonding sulfonic acid groups to the aromatic rings of an aromatic hydrocarbon polymer through alkylene groups is superior in durability to the single cell for fuel cell produced by using the aromatic hydrocarbon solid polymer electrolyte having sulfonic acid groups directly bonded thereto.

The single cells for fuel cell obtained by using the membrane-electrodes assemblies VII and VII", respectively, are superior in durability to the single cell for fuel cell obtained by using the membrane-electrodes assembly VII'. That is, the electrocatalyst-coating solution VII is more suitable than the electrocatalyst-coating solution II, for coating an electrocatalyst for a membrane-electrodes assembly.

The reason why the output voltage of the single cell for fuel cell of Example 11 is higher than that of the single cell for fuel cell of Comparative Example 1 though the membrane-electrodes assemblies of Example 11 and Comparative Example 1 have the same amount of platinum supported of 0.25 mg/cm$^2$, is that the ion electric conductivity of the solid polymer electrolyte membrane and electrocatalyst-coating solution used in the membrane-electrodes assembly of Example 11 is higher than that of the solid polymer electrolyte membrane and electrocatalyst-coating solution used in the membrane-electrodes assembly of Comparative Example 1.

(6) Production of a Fuel Cell

A solid polymer electrolyte fuel cell was produced by laminating 36 single cells produced in the same manner as in the above item (5) according to the present invention. The fuel cell had an output of 3 kW.

EXAMPLE 12

(1) Synthesis of a bromohexamethylated poly(1,4-biphenylene ether ether sulfone)

The inner atmosphere of a 500-ml four-necked round bottom flask equipped with a stirrer, a thermometer and a reflux condenser having a calcium chloride tube connected thereto was replaced with nitrogen. Thereafter, 38.8 g of a poly(1,4-biphenylene ether ether sulfone) [($-C_6H_4-4-SO_2C_6H_4-4-OC_6H_4-4-C_6H_4-4-O-$)$_n$] and 50 ml of dried nitrobenzene were placed in the flask. Then, 6.5 g of n-butoxylithium was added thereto and the resulting mixture was maintained at room temperature for 2 hours. Subsequently, 100 g of 1,6-dibromohexane was added thereto and stirred for 12 hours. The reaction solution was slowly dropped into 1 liter of deionized water to precipitate a bromohexamethylated poly(1,4-biphenylene ether ether sulfone), which was recovered by filtration.

The recovered precipitate was repeatedly subjected to washing with deionized water in a mixer and recovery by filtration by suction until the filtrate became neutral. Thereafter, the precipitate thus treated was dried overnight at 120° C. under reduced pressure.

(2) Synthesis of a sulfohexamethylated poly(1,4-biphenylene ether ether sulfone)

The inner atmosphere of a 500-ml four-necked round bottom flask equipped with a stirrer, a thermometer and a reflux condenser having a calcium chloride tube connected thereto was replaced with nitrogen. Thereafter, 10 g of the aforesaid bromohexamethylated poly(1,4-biphenylene ether ether sulfone), 50 ml of dried nitrobenzene and 30 g of sodium sulfate were placed in the flask and stirred at 100° C. for 5 hours. Then, 10 ml of ion-exchanged water was added thereto and stirred for 5 hours.

Subsequently, the reaction solution was slowly dropped into 1 liter of deionized water to precipitate a sulfohexamethylated poly(1,4-biphenylene ether ether sulfone), which was recovered by filtration. The recovered precipitate was repeatedly subjected to washing with deionized water in a mixer and recovery by filtration by suction until the filtrate became neutral. Thereafter, the precipitate thus treated was dried overnight at 120° C. under reduced pressure. The dried precipitate was subjected to $^1$HNMR measurement to find that new peaks due to a $-CH_2CH_2CH_2CH_2CH_2CH_2SO_3H$ group were present at 1.3 to 3.8 ppm. This fact confirmed the introduction of sulfohexamethyl groups. The ion-exchange group equivalent weight of the sulfohexamethylated poly(1,4-biphenylene ether ether sulfone) solid polymer electrolyte VIII thus obtained was 670 g/equivalent.

Since the sulfohexamethylated poly(1,4-biphenylene ether ether sulfone) solid polymer electrolyte VIII can be produced by the above process through two steps by using the poly(1,4-biphenylene ether ether sulfone), an inexpensive commercial engineering plastic, as a starting material, the cost of production thereof is as low as less than one-thirtieth that of the perfluorocarbon sulfonic acid solid polymer electrolyte (Nafion 117) produced through five steps by using an expensive starting material.

In a Teflon-coated closed container made of SUS, 1.0 g of the obtained sulfohexamethylated poly(1,4-biphenylene ether ether sulfone) solid polymer electrolyte VIII and 20 ml of ion-exchanged water were maintained at 120° C. for 2 weeks. After cooling and thorough washing with water, the ion-exchange group equivalent weight of the sulfohexamethylated poly(1,4-biphenylene ether ether sulfone) solid polymer electrolyte VIII was measured.

As a result, it was found that the ion-exchange group equivalent weight of the sulfohexamethylated poly(1,4-biphenylene ether ether sulfone) solid polymer electrolyte VIII was 670 g/equivalent, the same value as the initial value, namely, the solid polymer electrolyte VIII was stable like the perfluorocarbon sulfonic acid solid polymer electrolyte (Nafion 117).

On the other hand, as described in Comparative Example 1, (1), the ion-exchange group equivalent weight of the inexpensive sulfonated aromatic hydrocarbon solid polymer electrolyte II was increased to 1,200 g/equivalent from its initial value of 650 g/equivalent under the same conditions of hydrolysis by heating as above, namely, sulfonic acid groups were released from the solid polymer electrolyte II. Thus, unlike the inexpensive sulfonated poly(1,4-biphenylene ether ether sulfone) solid polymer electrolyte II, the inexpensive sulfohexamethylated poly(1,4-biphenylene ether ether sulfone) solid polymer electrolyte VIII was stable like the expensive perfluorocarbon sulfonic acid solid polymer electrolyte (Nafion 117) and was excellent in both cost and resistance to hydrolysis (durability)

(3) Formation of a Solid Polymer Electrolyte Membrane

The product obtained in the above item (2) was dissolved in a N,N-dimethylformamide-cyclohexanone-methyl ethyl ketone mixed solvent (volume ratio; 20:80:25) to a concentration of 5 wt %.

The resulting solution was spread on a glass plate by spin coating, air-dried and then dried in vacuo at 80° C. to form a sulfohexamethylated poly(1,4-biphenylene ether ether sulfone) solid polymer electrolyte membrane VIII of 42 μm in thickness. The ion electric conductivity of the obtained sulfohexamethylated poly(1,4-biphenylene ether ether sulfone) solid polymer electrolyte membrane VIII was 35 S/cm.

In a Teflon-coated closed container made of SUS, the aforesaid sulfohexamethylated poly(1,4-biphenylene ether ether sulfone) solid polymer electrolyte membrane VIII obtained and 20 ml of ion-exchanged water were maintained at 120° C. for 2 weeks. After the maintenance, the ion electric conductivity of the obtained solid polymer electrolyte membrane VIII was the same as its initial value like that of the perfluorocarbon sulfonic acid solid polymer electrolyte membrane (Nafion 117), and the solid polymer electrolyte membrane VIII was firm.

On the other hand, as described in Comparative Example 1, (2), the relatively inexpensive sulfonated aromatic hydrocarbon solid polymer electrolyte membrane II was broken to tatters under the same conditions of hydrolysis by heating as above. Thus, unlike the sulfonated aromatic hydrocarbon solid polymer electrolyte membrane II, the inexpensive sulfohexamethylated poly(1,4-biphenylene ether ether sulfone) solid polymer electrolyte membrane VIII was stable like the perfluorocarbon sulfonic acid solid polymer electrolyte membrane (Nafion 117) and was excellent in both cost and resistance to hydrolysis (durability).

(4) Production of Electrocatalyst-coating Solutions and Membrane-electrodes Assemblies The same solution as in the above item (3), i.e., a 5 wt % solution of the solid polymer electrolyte VIII in the N,N-dimethylformamide-cyclohexanone-methyl ethyl ketone mixed solvent was added to platinum-supporting carbon (content of platinum supported: 40 wt %), so that the weight ratio of platinum catalyst to the solid polymer electrolyte might be 2:1. The platinum-supporting carbon was uniformly dispersed in the solution to prepare a paste (an electrocatalyst-coating solution VIII).

In a Teflon-coated closed container made of SUS, 1.0 g of the aforesaid electrocatalyst-coating solution VIII and 20 ml of ion-exchanged water were maintained at 120° C. for 2 weeks. After cooling, the solvent was vaporized and the resulting solid was washed with water. Then, the ion-exchange group equivalent weight of the electrocatalyst-coating solution VIII after the maintenance was measured. As a result, it was found that the ion-exchange group equivalent weight of the electrocatalyst-coating solution VIII was 670 g/equivalent, the same value as the initial value, namely, the electrocatalyst-coating solution VIII was stable like the perfluorocarbon sulfonic acid (Nafion 117) electrocatalyst-coating solution.

On the other hand, as described in Comparative Example 1, (2), the ion-exchange group equivalent weight of the electrocatalyst-coating solution II was increased to 1,200 g/equivalent from its initial value of 650 g/equivalent under the same conditions of hydrolysis by heating as above, namely, sulfonic acid groups were released. Thus, unlike the electrocatalyst-coating solution II of Comparative Example 1, the inexpensive electrocatalyst-coating solution VIII was stable like the perfluorocarbon sulfonic acid (Nafion 117) electrocatalyst-coating solution and was excellent in both cost and resistance to hydrolysis (durability).

The aforesaid electrocatalyst-coating solution VIII was applied on both sides of the solid polymer electrolyte membrane obtained in the above item (3), and was dried to produce a membrane-electrodes assembly VIII having an amount of platinum supported of 0.25 mg/cm². The electrocatalyst-coating solution II described in Comparative Example 1, (2) was applied on both sides of the same solid polymer electrolyte membrane VIII as that obtained in the above item (3), and was dried to produce a membrane-electrodes assembly VIII' having an amount of platinum supported of 0.25 mg/cm².

A 5 wt % solution of the perfluorocarbon sulfonic acid solid polymer electrolyte in an alcohol-water mixed solvent was added to platinum-supporting carbon (content of platinum supported: 40 wt %), so that the weight ratio of platinum catalyst to the solid polymer electrolyte might be 2:1. The platinum-supporting carbon was uniformly dispersed in the solution to prepare a paste (an electrocatalyst-coating solution). This electrocatalyst-coating solution was applied on both sides of the same solid polymer electrolyte membrane VIII as that obtained in the above item (3), and was dried to produce a membrane-electrodes assembly VIII" having an amount of platinum supported of 0.25 mg/cm².

In a Teflon-coated closed container made of SUS, the aforesaid membrane-electrodes assembly VIII obtained and 20 ml of ion-exchanged water were maintained at 120° C. for 2 weeks. After the maintenance, the membrane-electrodes assembly VIII was not different from that before the maintenance like a membrane-electrodes assembly produced by using the perfluorocarbon sulfonic acid solid polymer electrolyte membrane (Nafion 117) and the perfluorocarbon sulfonic acid solid polymer electrolyte (Nafion 117), and its membrane was firm.

In a Teflon-coated closed container made of SUS, the aforesaid membrane-electrodes assembly VIII' obtained and 20 ml of ion-exchanged water were maintained at 120° C. for 2 weeks. In the membrane-electrodes assembly VIII' after the maintenance, the electrodes were peeling a little but the membrane was firm. The assembly VIII' after the maintenance had power-generating capability.

In a Teflon-coated closed container made of SUS, the aforesaid membrane-electrodes assembly VIII" obtained and 20 ml of ion-exchanged water were maintained at 120° C. for 2 weeks. In the membrane-electrodes assembly VIII" after the maintenance, the electrodes were peeling a little but the membrane was firm. The assembly VIII" after the maintenance had power-generating capability.

(5) Evaluation of the Output Capability of Single Cells for Fuel Cell

The above-mentioned membrane-electrodes assemblies VIII, VIII' and VIII" were allowed to absorb water by immersion in boiling deionized water for 2 hours. Each of the thus treated membrane-electrodes assemblies was incorporated into a cell for evaluation and the output capability of the resulting single cell for fuel cell was evaluated.

Figure 11:
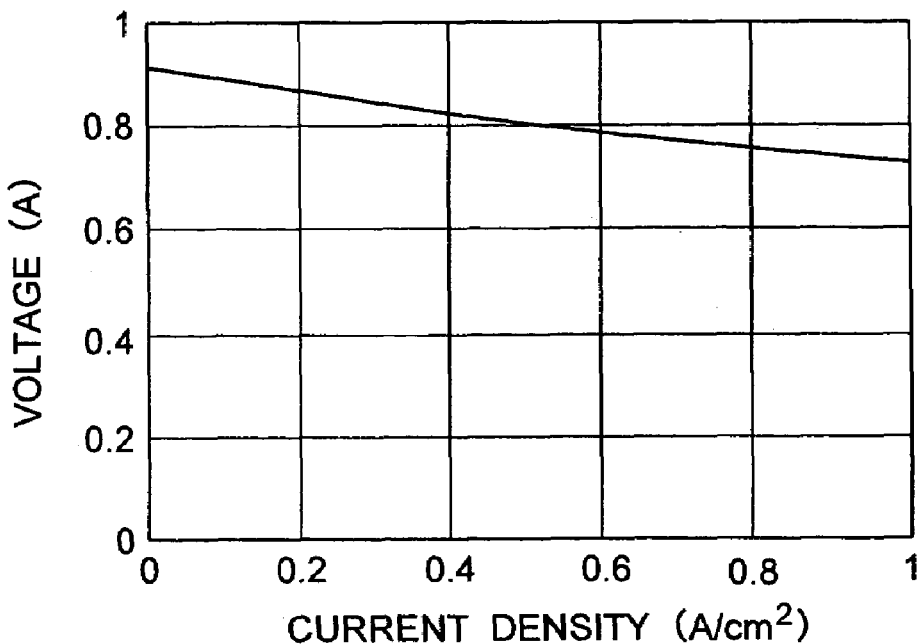
FIG. 11 is a current density-voltage graph showing the output capability of a single cell for solid polymer electrolyte fuel cell produced in Example 12.

FIG. 11 shows a current density-voltage plot obtained for a single cell for fuel cell produced by using the membrane-electrodes assembly VIII. The output voltage was 0.69 V at a current density of 1 A/cm² and 0.83 V at a current density of 300 mA/cm². Thus, said single cell was satisfactorily usable as a single cell for solid polymer electrolyte fuel cell.

The single cells for solid polymer electrolyte fuel cell obtained above were subjected to a long-term operation test at a current density of 300 mA/cm². The results obtained are shown in FIG. 12.

Figure 12:
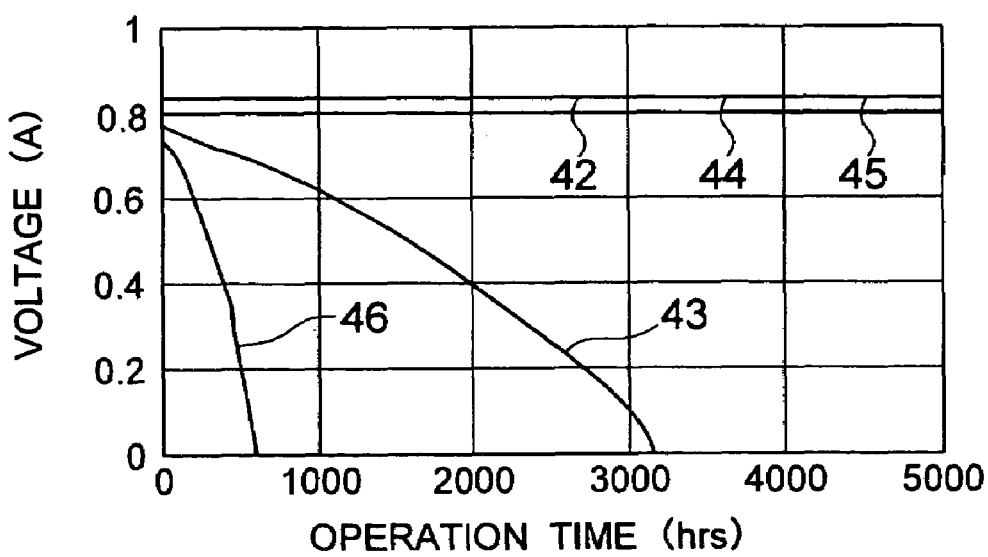
FIG. 12 is a graph showing the results of a durability test on single cells for solid polymer electrolyte fuel cell produced in Example 12.

In FIG. 12, numerals 42, 43 and 44 indicate the results of the durability test on the single cells for fuel cell obtained by using the assemblies VIII, VIII' and VIII", respectively, of the solid polymer electrolyte membrane and electrodes. In FIG. 12, numeral 45 indicates the result of the durability test on a single cell for fuel cell obtained by using the assembly of the perfluorocarbon sulfonic acid (Nafion 117) solid polymer electrolyte membrane and electrodes.

In FIG. 12, numeral 42 indicates the change with time of output voltage of the single cell for fuel cell of Example 12 produced by using a solid polymer electrolyte membrane of a polyether ether sulfone having sulfonic acid groups bonded thereto through alkylene groups and an electrocatalyst-coating solution containing the polyether ether sulfone solid polymer electrolyte having sulfonic acid groups bonded thereto through alkylene groups. Numeral 43 indicates the change with time of output voltage of the single cell for fuel cell produced in Example 12 by using a solid polymer electrolyte membrane of the polyether ether sulfone having sulfonic acid groups bonded thereto through alkylene groups and an electrocatalyst-coating solution containing a polyether ether sulfone solid polymer electrolyte having sulfonic acid groups directly bonded thereto. Numeral 44 indicates the change with time of output voltage of the single cell for fuel cell produced in Example 12 by using a solid polymer electrolyte membrane of the polyether ether sulfone having sulfonic acid groups bonded thereto through alkylene groups and an electrocatalyst-coating solution containing the perfluorocarbon sulfonic acid solid polymer electrolyte (Nafion 117). Numeral 45 indicates the change with time of output voltage of the single cell for fuel cell obtained by using the perfluorocarbon sulfonic acid solid polymer electrolyte membrane (Nafion 117). Numeral 46 indicates the change with time of output voltage of a single cell for fuel cell of Comparative Example 12 produced by using a solid polymer electrolyte membrane of a polyether ether sulfone having sulfonic acid groups directly bonded thereto and an electrocatalyst-coating solution containing the polyether ether sulfone solid polymer electrolyte having sulfonic acid groups directly bonded thereto.

As can be seen from the results indicated by numerals 42 and 44 in FIG. 12, the initial voltage of the single cells obtained by using the assemblies VIII and VIII", respectively, of the solid polymer electrolyte membrane of the present invention and electrodes was 0.83 V, and the single cells had the same voltage as the initial voltage even after 5,000 hours of operation. These results were equal to those obtained by the use of the perfluorocarbon sulfonic acid solid polymer electrolyte membrane (Nafion 117) and indicated by numeral 45 in FIG. 12.

On the other hand, the initial output voltage of the single cell for fuel cell indicated by numeral 46 in FIG. 12 (the single cell for fuel cell of Comparative Example 1 obtained by using the sulfonated aromatic hydrocarbon solid polymer electrolyte membrane) was 0.73 V, and the output of this single cell was zero after 600 hours of operation.

From this fact, it is clear that the single cell for fuel cell produced by using the aromatic hydrocarbon solid polymer electrolyte obtained by bonding sulfonic acid groups to the aromatic rings of an aromatic hydrocarbon polymer through alkylene groups is superior in durability to the single cell for fuel cell produced by using the aromatic hydrocarbon solid polymer electrolyte having sulfonic acid groups directly bonded thereto.

The single cells for fuel cell obtained by using the membrane-electrodes assemblies VIII and VIII", respectively, are superior in durability to the single cell for fuel cell obtained by using the membrane-electrodes assembly VIII'. That is, the electrocatalyst-coating solution VIII is more suitable than the electrocatalyst-coating solution II, for coating an electrocatalyst for a membrane-electrodes assembly.

The reason why the output voltage of the single cell for fuel cell of Example 12 is higher than that of the single cell for fuel cell of Comparative Example 1 though the membrane-electrodes assemblies of Example 12 and Comparative Example 1 have the same amount of platinum supported of 0.25 mg/cm$^2$, is that the ion electric conductivity of the solid polymer electrolyte membrane and electrocatalyst-coating solution used in the membrane-electrodes assembly of Example 12 is higher than that of the solid polymer electrolyte membrane and electrocatalyst-coating solution used in the membrane-electrodes assembly of Comparative Example 1.

As can be seen from the items (1) and (2) in Examples 11, 9, 10 and 12, the values of the ion-exchange group equivalent weight (g/equivalent) of the sulfoalkylated poly(1,4-biphenylene ether ether sulfone) solid electrolytes of the above formula [3] in which the values of n (the number of carbon atoms of the alkylene group) are 1, 3, 4 and 6 are 660, 680, 670 and 670, respectively, which are substantially the same. The values of ionic conductance (S/cm) of the solid polymer electrolyte membranes obtained by using these solid electrolytes are 7, 15, 25 and 35, respectively. That is, with an increase of the value of n in the sulfoalkylated aromatic hydrocarbon solid electrolytes, the ionic conductance and the proton transportability increase, so that an excellent solid polymer electrolyte fuel cell can be obtained.

On the other hand, from the viewpoint of cost, the sulfopropylated poly(1,4-biphenylene ether ether sulfone) solid electrolyte and the sulfobutylated poly(1,4-biphenylene ether ether sulfone) solid electrolyte, which can be synthesized by a one-stage reaction with a sultone, are more advantageous than the sulfohexamethylated poly(1,4-biphenylene ether ether sulfone) solid electrolyte and the sulfomethylated poly (1,4-biphenylene ether ether sulfone) solid electrolyte, which are synthesized by a two-stage reaction. The value of n is preferably 3 or 4 for reconciling the ionic conductance and the cost.

(6) Production of a Fuel Cell

A solid polymer electrolyte fuel cell was produced by laminating 36 single cells produced in the same manner as in the above item (5) according to the present invention. The fuel cell had an output of 3 kW.

EXAMPLE 13

(1) Synthesis of a sulfopropylated poly(1,4-phenylene ether ether sulfone)

The inner atmosphere of a 500-ml four-necked round bottom flask equipped with a stirrer, a thermometer and a reflux condenser having a calcium chloride tube connected thereto was replaced with nitrogen. Then, 4.84 g (0.0155 mol) of a poly(1,4-phenylene ether ether sulfone) [(—C$_6$H$_4$-4-SO$_2$C$_6$H$_4$-4-OC$_6$H$_4$-4-O—)$_n$] dried by its maintenance at 110° C. for 10 hours and 150 ml of dehydrated chloroform were placed in the flask and maintained at 60° C. for about 1 hour to effect dissolution. To the resulting solution was added 5.67 g (0.0464 mol) of propanesultone.

Subsequently, 6.19 g (0.0464 mol) of anhydrous aluminum chloride thoroughly ground in a mortar was added thereto with stirring over a period of about 30 minutes. After completion of the addition of anhydrous aluminum chloride, the resulting mixture was refluxed with stirring at 60° C. for 30 hours. The polymer precipitated was filtered, washed with 150 ml of chloroform and then dried under reduced pressure. The dried polymer was suspended in 250 ml of water and finely ground in a mixer, and the resulting finely ground substance was filtered. This procedure was repeated four times. After thorough washing with water, the water-insoluble finely ground substance thus obtained was dried at 90° C. under reduced pressure.

The dried substance was subjected to $^1$HNMR measurement to find that new peaks due to a —CH$_2$CH$_2$CH$_2$SO$_3$H group were present at 2.2 ppm and 3.8 ppm. This fact confirmed the introduction of sulfopropyl groups.

The sulfonic acid equivalent weight of the sulfopropylated poly(1,4-phenylene ether ether sulfone) solid polymer electrolyte IX thus obtained was 670 g/equivalent.

Since the sulfopropylated poly(1,4-phenylene ether ether sulfone) solid polymer electrolyte IX can be produced through one step by using the poly(1,4-phenylene ether ether sulfone), a relatively inexpensive commercial engineering plastic, as a starting material, the cost of production thereof is as low as less than one-fiftieth that of the perfluorocarbon sulfonic acid solid polymer electrolyte (Nafion 117) produced through five steps by using an expensive starting material.

In a Teflon-coated closed container made of SUS, 1.0 g of the obtained sulfopropylated poly(1,4-phenylene ether ether sulfone) solid polymer electrolyte IX and 20 ml of ion-exchanged water were maintained at 120° C. for 2 weeks. After cooling and thorough washing with water, the ion-exchange group equivalent weight of the sulfopropylated poly(1,4-phenylene ether ether sulfone) solid polymer electrolyte IX was measured.

As a result, it was found that the ion-exchange group equivalent weight of the sulfopropylated poly(1,4-phenylene ether ether sulfone) solid polymer electrolyte IX was 670 g/equivalent, the same value as the initial value, namely, the solid polymer electrolyte IX was stable like the perfluorocarbon sulfonic acid solid polymer electrolyte (Nafion 117).

On the other hand, as described hereinafter in Comparative Example 2, (1), the ion-exchange group equivalent weight of an inexpensive sulfonated poly(1,4-phenylene ether ether sulfone) solid polymer electrolyte X was increased to 1,250 g/equivalent from its initial value of 660 g/equivalent under the same conditions of hydrolysis by heating as above, namely, sulfonic acid groups were released from the solid polymer electrolyte X. Thus, unlike the sulfonated poly(1,4-phenylene ether ether sulfone) solid polymer electrolyte X described hereinafter in Comparative Example 2, the inexpensive sulfopropylated poly(1,4-phenylene ether ether sulfone) solid polymer electrolyte IX was stable like the perfluorocarbon sulfonic acid solid polymer electrolyte (Nafion 117) and was excellent in both cost and resistance to hydrolysis (durability).

(2) Formation of a Solid Polymer Electrolyte Membrane

The product obtained in the above item (1) was dissolved in a N,N-dimethylformamide-cyclohexanone-methyl ethyl ketone mixed solvent (volume ratio; 20:80:25) to a concentration of 5 wt %. The resulting solution was spread on a glass plate by spin coating, air-dried and then dried in vacuo at 80° C. to form a solid polymer electrolyte membrane IX of 25 μm in thickness. The ion electric conductivity of the obtained solid polymer electrolyte membrane IX was 15 S/cm.

In a Teflon-coated closed container made of SUS, the aforesaid solid polymer electrolyte membrane IX obtained and 20 ml of ion-exchanged water were maintained at 120° C. for 2 weeks. After the maintenance, the ion electric conductivity of the solid polymer electrolyte membrane IX obtained was the same as its initial value like that of the perfluorocarbon sulfonic acid solid polymer electrolyte membrane (Nafion 117), and the solid polymer electrolyte membrane IX was firm.

On the other hand, as described hereinafter in Comparative Example 2, (2), the relatively inexpensive sulfonated aromatic hydrocarbon solid polymer electrolyte membrane X was broken to tatters under the same conditions of hydrolysis by heating as above. Thus, unlike the sulfonated poly(1,4-phenylene ether ether sulfone) solid polymer electrolyte membrane X described hereinafter in Comparative Example 2, (2), the inexpensive sulfopropylated poly(1,4-phenylene ether ether sulfone) solid polymer electrolyte membrane IX was stable like the perfluorocarbon sulfonic acid solid polymer electrolyte membrane (Nafion 117) and was excellent in both cost and resistance to hydrolysis (durability).

(3) Production of Electrocatalyst-coating Solutions and Membrane-electrodes Assemblies The same solution as in the above item (2), i.e., a 5 wt % solution of the solid polymer electrolyte IX in the N,N-dimethylformamide-cyclohexanone-methyl ethyl ketone mixed solvent was added to platinum-supporting carbon (content of platinum supported: 40 wt %), so that the weight ratio of platinum catalyst to the solid polymer electrolyte might be 2:1. The platinum-supporting carbon was uniformly dispersed in the solution to prepare a paste (an electrocatalyst-coating solution IX).

In a Teflon-coated closed container made of SUS, 1.0 g of the aforesaid electrocatalyst-coating solution IX and 20 ml of ion-exchanged water were maintained at 120° C. for 2 weeks. After cooling, the solvent was vaporized and the resulting solid was washed with water. Then, the ion-exchange group equivalent weight of the electrocatalyst-coating solution IX after the maintenance was measured. As a result, it was found that the ion-exchange group equivalent weight of the electrocatalyst-coating solution IX was 670 g/equivalent, the same value as the initial value, namely, the electrocatalyst-coating solution IX was stable like the perfluorocarbon sulfonic acid (Nafion 117) electrocatalyst-coating solution.

On the other hand, as described hereinafter in Comparative Example 2, (2), the ion-exchange group equivalent weight of the electrocatalyst-coating solution X was increased to 1,250 g/equivalent from its initial value of 660 g/equivalent under the same conditions of hydrolysis by heating as above, namely, sulfonic acid groups were released. Thus, unlike the electrocatalyst-coating solution X described hereinafter in Comparative Example 2, (2), the inexpensive electrocatalyst-coating solution IX was stable like the perfluorocarbon sulfonic acid (Nafion 117) electrocatalyst-coating solution and was excellent in both cost and resistance to hydrolysis (durability).

The aforesaid electrocatalyst-coating solution IX was applied on both sides of the solid polymer electrolyte membrane IX obtained in the above item (2), and was dried to produce a membrane-electrodes assembly IX having an amount of platinum supported of 0.25 mg/cm$^2$.

The electrocatalyst-coating solution X described hereinafter in Comparative Example 2, (2) was applied on both sides of the same solid polymer electrolyte membrane IX as that obtained in the above item (2), and was dried to produce a membrane-electrodes assembly IX' having an amount of platinum supported of 0.25 mg/cm$^2$.

A 5 wt % solution of the perfluorocarbon sulfonic acid solid polymer electrolyte in an alcohol-water mixed solvent was added to platinum-supporting carbon (content of platinum supported: 40 wt %), so that the weight ratio of platinum catalyst to the solid polymer electrolyte might be 2:1. The platinum-supporting carbon was uniformly dispersed in the solution to prepare a paste (an electrocatalyst-coating solution). This electrocatalyst-coating solution was applied on both sides of the same solid polymer electrolyte membrane IX as that obtained in the above item (2), and was dried to produce a membrane-electrodes assembly IX" having an amount of platinum supported of 0.25 mg/cm$^2$.

In a Teflon-coated closed container made of SUS, the aforesaid membrane-electrodes assembly IX obtained and 20 ml of ion-exchanged water were maintained at 120° C. for 2 weeks. After the maintenance, the membrane-electrodes assembly IX was not different from that before the maintenance like a membrane-electrodes assembly produced by using the perfluorocarbon sulfonic acid solid polymer electrolyte membrane (Nafion 117) and the perfluorocarbon sulfonic acid solid polymer electrolyte (Nafion 117), and its membrane was firm.

In a Teflon-coated closed container made of SUS, the aforesaid membrane-electrodes assembly IX' obtained and 20 ml of ion-exchanged water were maintained at 120° C. for 2 weeks. In the membrane-electrodes assembly IX' after the maintenance, the electrodes were peeling a little but the membrane was firm. The assembly IX' after the maintenance had power-generating capability.

In a Teflon-coated closed container made of SUS, the aforesaid membrane-electrodes assembly IX" obtained and 20 ml of ion-exchanged water were maintained at 120° C. for 2 weeks. In the membrane-electrodes assembly IX" after the maintenance, the electrodes were peeling a little but the membrane was firm. The assembly IX" after the maintenance had power-generating capability.

On the other hand, as described hereinafter in Comparative Example 2, (3), the membrane of a membrane-electrodes assembly X produced by using the relatively inexpensive sulfonated aromatic hydrocarbon solid polymer electrolyte membrane X and the electrocatalyst-coating solution X was broken to tatters and the electrodes of the assembly were peeled, under the same conditions of hydrolysis by heating as above.

Thus, unlike the inexpensive membrane-electrodes assembly X described hereinafter in Comparative Example 2, (3), i.e., the assembly of the sulfonated aromatic hydrocarbon solid polymer electrolyte membrane and electrodes, the inexpensive assembly IX of the sulfopropylated poly(1,4-phenylene ether ether sulfone) solid polymer electrolyte membrane and electrodes was stable like the assembly of the perfluorocarbon sulfonic acid (Nafion 117) membrane and electrodes, and was excellent in both cost and resistance to hydrolysis (durability).

(4) Durability Test on Single Cells for Fuel Cell

The above-mentioned membrane-electrodes assemblies IX, IX' and IX" were allowed to absorb water by immersion in boiling deionized water for 2 hours. Each of the thus treated membrane-electrodes assemblies was incorporated into a cell for evaluation and the output capability of the resulting single cell for fuel cell was evaluated.

In detail, the single cell for solid polymer electrolyte fuel cell shown in FIG. 1 was produced by adhering a packing material (a supporting current collector) 5 of thin carbon paper to each of the electrodes of each membrane-electrodes assembly 4 obtained in Example 13 and composed of a solid polymer electrolyte membrane 1, an oxygen electrode 2 and a hydrogen electrode 3, and providing an electroconductive separator (a bipolar plate) 6 capable of serving as a separator between electrode chambers and passageways for gas supply to the electrodes, on the outer surface of each packing material. The single cells for fuel cells thus obtained were subjected to a long-term deterioration test at a current density of 300 mA/cm². The results obtained are shown in FIG. 13.

Figure 13:
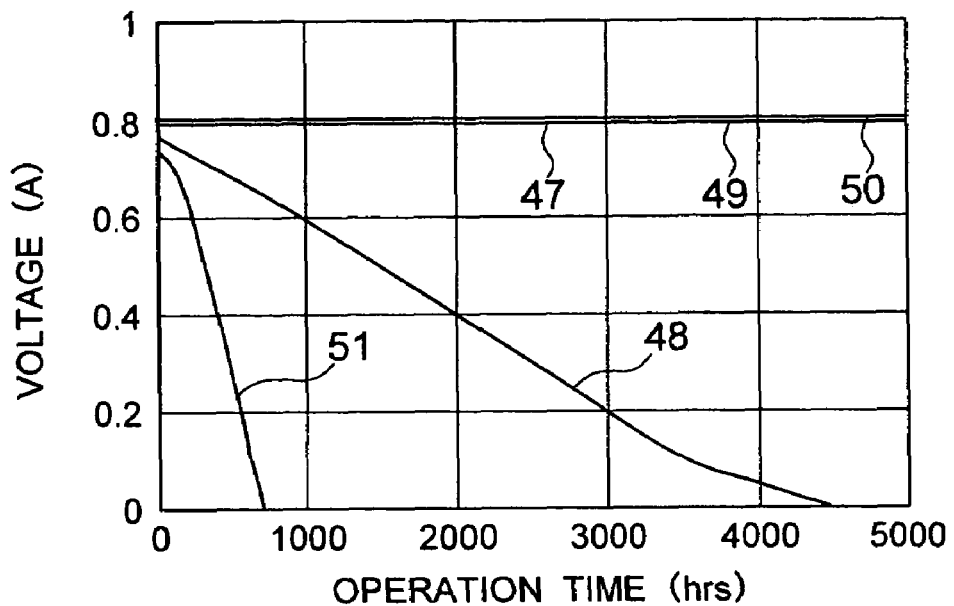
FIG. 13 is a graph showing the results of a durability test on single cells for solid polymer electrolyte fuel cell produced in Example 13.

In FIG. 13, numerals 47, 48 and 49 indicate the results of the durability test on the single cells for fuel cell obtained by using the assemblies IX, IX' and IX", respectively, of the solid polymer electrolyte membrane and electrodes.

In FIG. 13, numeral 50 indicates the result of the durability test on a single cell for fuel cell obtained by using the assembly of the perfluorocarbon sulfonic acid (Nafion 117) solid polymer electrolyte membrane and electrodes.

In FIG. 13, numeral 47 indicates the change with time of output voltage of the single cell for fuel cell of Example 13 produced by using a solid polymer electrolyte membrane of a polyether ether sulfone having sulfonic acid groups bonded thereto through alkylene groups and an electrocatalyst-coating solution containing the polyether ether sulfone solid polymer electrolyte having sulfonic acid groups bonded thereto through alkylene groups. Numeral 48 indicates the change with time of output voltage of the single cell for fuel cell produced in Example 13 by using a solid polymer electrolyte membrane of the polyether ether sulfone having sulfonic acid groups bonded thereto through alkylene groups and an electrocatalyst-coating solution containing a polyether ether sulfone solid polymer electrolyte having sulfonic acid groups directly bonded thereto. Numeral 49 indicates the change with time of output voltage of the single cell for fuel cell produced in Example 13 by using a solid polymer electrolyte membrane of the polyether ether sulfone having sulfonic acid groups bonded thereto through alkylene groups and an electrocatalyst-coating solution containing the perfluorocarbon sulfonic acid solid polymer electrolyte (Nafion 117). Numeral 50 indicates the change with time of output voltage of the single cell for fuel cell obtained by using the perfluorocarbon sulfonic acid solid polymer electrolyte membrane (Nafion 117). Numeral 51 indicates the change with time of output voltage of a single cell for fuel cell of Comparative Example 13 produced by using a solid polymer electrolyte membrane of a polyether ether sulfone having sulfonic acid groups directly bonded thereto and an electrocatalyst-coating solution containing the polyether ether sulfone solid polymer electrolyte having sulfonic acid groups directly bonded thereto.

As can be seen from the results indicated by numerals 47 and 49 in FIG. 13, the initial voltage of the single cells obtained by using the assemblies IX and IX", respectively, of the solid polymer electrolyte membrane of the present invention and electrodes was 0.79 V, and the single cells had the same voltage as the initial voltage even after 5,000 hours of operation. These results were equal to those obtained by the use of the perfluorocarbon sulfonic acid solid polymer electrolyte membrane (Nafion 117) and indicated by numeral 50 in FIG. 13.

On the other hand, the initial output voltage of the single cell for fuel cell indicated by numeral 51 in FIG. 13 (the single cell for fuel cell obtained by using the sulfonated aromatic hydrocarbon solid polymer electrolyte X which is described hereinafter in Comparative Example 2) was 0.73 V, and the output of this single cell was zero after 600 hours of operation.

From this fact, it is clear that the single cell for fuel cell produced by using the aromatic hydrocarbon solid polymer electrolyte obtained by bonding sulfonic acid groups to the aromatic rings of an aromatic hydrocarbon polymer through alkylene groups is superior in durability to the single cell for fuel cell produced by using the aromatic hydrocarbon solid polymer electrolyte having sulfonic acid groups directly bonded thereto.

The single cells for fuel cell obtained by using the membrane-electrodes assemblies IX and IX", respectively, are superior in durability to the single cell for fuel cell obtained by using the membrane-electrodes assembly IX'. That is, the electrocatalyst-coating solution IX is more suitable than the electrocatalyst-coating solution X, for coating an electrocatalyst for a membrane-electrodes assembly.

The reason why the output voltage of the single cell for fuel cell of Example 13 is higher than that of the single cell for fuel cell of Comparative Example 2 though the membrane-electrodes assemblies of Example 13 and Comparative Example 2 have the same amount of platinum supported of 0.25 mg/cm², is that the ion electric conductivity of the solid polymer electrolyte membrane and electrocatalyst-coating solution used in the membrane-electrodes assembly of Example 13 is higher than that of the solid polymer electrolyte membrane and electrocatalyst-coating solution used in the membrane-electrodes assembly of Comparative Example 2.

(5) Production of a Fuel Cell

A solid polymer electrolyte fuel cell was produced by laminating 36 single cells produced in the same manner as in the above item (4) according to the present invention. The fuel cell had an output of 3 kW.

COMPARATIVE EXAMPLE 2

(1) Synthesis of a sulfonated poly(1,4-phenylene ether ether sulfone)

The inner atmosphere of a 500-ml four-necked round bottom flask equipped with a stirrer, a thermometer and a reflux condenser having a calcium chloride tube connected thereto was replaced with nitrogen. Then, 3.22 g (0.0103 mol) of a poly(1,4-phenylene ether ether sulfone) [(—$C_6H_4$-4-$SO_2C_6H_4$-4-$OC_6H_4$-4-O—)$_n$] dried by its maintenance at 110° C. for 10 hours and 100 ml of chloroform were placed in the flask and maintained at 60° C. for about 1 hour to effect dissolution.

To the resulting solution was added a solution of 1.165 g (0.01 mol) of chlorosulfonic acid in 50 ml of 1,1,2,2-tetrachloroethane over a period of about 10 minutes. The resulting mixture was stirred at 60° C. for 4 hours. The precipitate was filtered and then washed with 150 ml of chloroform. The washed precipitate was dissolved in 250 ml of methanol at 60° C. The resulting solution was dried at 60° C. under reduced pressure. The polymer thus obtained was finely ground in a mixer together with 250 ml of water, and the resulting mixture was filtered. This procedure was repeated three times.

The water-insoluble fine powder thus obtained was dried over phosphorus pentaoxide at 90° C. under reduced pressure. This fine powder was insoluble in water and soluble in methanol.

The dried fine powder was subjected to ¹HNMR measurement to find that absorptions at 7.3 to 8.0 ppm due to the hydrogen atoms of the phenyl groups in the starting poly(1,4-phenylene ether ether sulfone) had been decreased, and that a new absorption due to the hydrogen atom of a phenyl group adjacent to a $SO_3H$ group was present at 8.3 ppm. This fact confirmed the introduction of sulfonic acid groups. The sulfonic acid equivalent weight of the sulfonated poly(1,4-phenylene ether ether sulfone) solid polymer electrolyte X thus obtained was 660 g/equivalent.

In a Teflon-coated closed container made of SUS, 1.0 g of the aforesaid sulfonated poly(1,4-phenylene ether ether sulfone) solid polymer electrolyte X obtained and 20 ml of ion-exchanged water were maintained at 120° C. for 2 weeks. After cooling and thorough washing with water, the ion-exchange group equivalent weight of the sulfonated poly(1,4-phenylene ether ether sulfone) solid polymer electrolyte X was measured. As a result, it was found that the sulfonic acid equivalent weight of the sulfonated poly(1,4-phenylene ether sulfone) solid polymer electrolyte X had been increased to 1,250 g/equivalent from its initial value of 660 g/equivalent, namely, sulfonic acid groups had been released.

(2) Formation of a Solid Polymer Electrolyte Membrane

The sulfonated poly(1,4-phenylene ether ether sulfone) solid polymer electrolyte X obtained in the above item (1) was dissolved in a N,N-dimethylformamide-cyclohexanone-methyl ethyl ketone mixed solvent (volume ratio; 20:80:25) to a concentration of 5 wt %. The resulting solution was spread on a glass plate by spin coating, air-dried and then dried in vacuo at 80° C. to form a solid polymer electrolyte membrane X of 45 μm in thickness. The ion electric conductivity of the obtained solid polymer electrolyte membrane X was 8 S/cm.

In a Teflon-coated closed container made of SUS, the aforesaid solid polymer electrolyte membrane X obtained and 20 ml of ion-exchanged water were maintained at 120° C. for 2 weeks. As a result, the solid polymer electrolyte membrane X was broken to tatters.

(3) Production of an Electrocatalyst-coating Solution and a Membrane-electrodes Assembly The same solution as in the above item (2), i.e., a 5 wt % solution of the solid polymer electrolyte X in the N,N-dimethylformamide-cyclohexanone-methyl ethyl ketone mixed solvent was added to platinum-supporting carbon (content of platinum supported: 40 wt %), so that the weight ratio of platinum catalyst to the solid polymer electrolyte might be 2:1. The platinum-supporting carbon was uniformly dispersed in the solution to prepare a paste (an electrocatalyst-coating solution X).

In a Teflon-coated closed container made of SUS, 1.0 g of the aforesaid electrocatalyst-coating solution X and 20 ml of ion-exchanged water were maintained at 120° C. for 2 weeks. After cooling, the solvent was vaporized and the resulting solid was washed with water. Then, the ion-exchange group equivalent weight of the electrocatalyst-coating solution X after the maintenance was measured. As a result, it was found that the ion-exchange group equivalent weight of the electrocatalyst-coating solution X had been increased to 1,250 g/equivalent from its initial value of 660 g/equivalent, namely, sulfonic acid groups had been released.

The aforesaid electrocatalyst-coating solution X was applied on both sides of the solid polymer electrolyte membrane X obtained in the above item (2), and was dried to produce a membrane-electrodes assembly X having an amount of platinum supported of 0.25 mg/cm².

In a Teflon-coated closed container made of SUS, the aforesaid membrane-electrodes assembly X obtained and 20 ml of ion-exchanged water were maintained at 120° C. for 2 weeks. As a result, the membrane of the membrane-electrodes assembly X was broken to tatters and its electrodes were peeled.

(4) Durability Test on a Single Cell for Fuel Cell

A single cell for solid polymer electrolyte fuel cell was produced by adhering a packing material (a supporting current collector) of thin carbon paper to each side of the membrane-electrodes assembly X of Comparative Example 2, and providing an electroconductive separator (a bipolar plate) capable of serving as a separator between electrode chambers and passageways for gas supply to the electrodes, on the outer surface of each packing material. The single cell was subjected to a long-term operation test at a current density of 300 mA/cm². As a result, it was found that as indicated by numeral

51 in FIG. 13, the initial output voltage of the single cell was 0.73 V and that the output voltage of the single cell was zero after 600 hours of operation.

EXAMPLE 14

(1) Synthesis of a sulfobutylated poly(1,4-phenylene ether ether sulfone)

The inner atmosphere of a 500-ml four-necked round bottom flask equipped with a stirrer, a thermometer and a reflux condenser having a calcium chloride tube connected thereto was replaced with nitrogen. Then, 4.84 g (0.0155 mol) of a poly(1,4-phenylene ether ether sulfone) [(—$C_6H_4$-4-$SO_2C_6H_4$-4-$OC6H_4$-4-O—)$_n$] dried by its maintenance at 110° C. for 10 hours and 150 ml of dehydrated chloroform were placed in the flask and maintained at 60° C. for about 1 hour to effect dissolution. To the resulting solution was added 6.26 g (0.0464 mol) of butanesultone. Subsequently, 6.19 g (0.0464 mol) of anhydrous aluminum chloride thoroughly ground in a mortar was added thereto with stirring over a period of about 30 minutes. After completion of the addition of anhydrous aluminum chloride, the resulting mixture was refluxed with stirring at 60° C. for 30 hours. The polymer precipitated was filtered, washed with 150 ml of chloroform and then dried under reduced pressure. The dried polymer was suspended in 250 ml of water and finely ground in a mixer, and the resulting finely ground substance was filtered. This procedure was repeated four times. After thorough washing with water, the water-insoluble finely ground substance thus obtained was dried at 90° C. under reduced pressure.

The dried substance was subjected to $^1$HNMR measurement to find that new peaks due to a —$CH_2CH_2CH_2CH_2SO_3H$ group were present at 1.3 to 3.8 ppm. This fact confirmed the introduction of sulfobutyl groups. The sulfonic acid equivalent weight of the sulfobutylated poly(1,4-phenylene ether ether sulfone) solid polymer electrolyte XI thus obtained was 650 g/equivalent.

Since the sulfobutylated poly(1,4-phenylene ether ether sulfone) solid polymer electrolyte XI can be produced through one step by using the poly(1,4-phenylene ether ether sulfone), a relatively inexpensive commercial engineering plastic, as a starting material, the cost of production thereof is as low as less than one-fiftieth that of the perfluorocarbon sulfonic acid solid polymer electrolyte (Nafion 117) produced through five steps by using an expensive starting material.

In a Teflon-coated closed container made of SUS, 1.0 g of the obtained sulfobutylated poly(1,4-phenylene ether ether sulfone) solid polymer electrolyte XI and 20 ml of ion-exchanged water were maintained at 120° C. for 2 weeks. After cooling and thorough washing with water, the ion-exchange group equivalent weight of the sulfobutylated poly(1,4-phenylene ether ether sulfone) solid polymer electrolyte XI was measured.

As a result, it was found that the ion-exchange group equivalent weight of the sulfobutylated poly(1,4-phenylene ether ether sulfone) solid polymer electrolyte XI was 650 g/equivalent, the same value as the initial value, namely, the solid polymer electrolyte XI was stable like the perfluorocarbon sulfonic acid solid polymer electrolyte (Nafion 117).

On the other hand, as described in Comparative Example 2, (1), the ion-exchange group equivalent weight of the inexpensive sulfonated poly(1,4-phenylene ether ether sulfone) solid polymer electrolyte X was increased to 1,250 g/equivalent from its initial value of 660 g/equivalent under the same conditions of hydrolysis by heating as above, namely, sulfonic acid groups were released from the solid polymer electrolyte X.

Thus, unlike the inexpensive sulfonated poly(1,4-phenylene ether ether sulfone) solid polymer electrolyte X described in Comparative Example 2, (1), the inexpensive sulfobutylated poly(1,4-phenylene ether ether sulfone) solid polymer electrolyte XI was stable like the perfluorocarbon sulfonic acid solid polymer electrolyte (Nafion 117) and was excellent in both cost and resistance to hydrolysis (durability).

(2) Formation of a Solid Polymer Electrolyte Membrane

The product obtained in the above item (1) was dissolved in a N,N-dimethylformamide-cyclohexanone-methyl ethyl ketone mixed solvent (volume ratio; 20:80:25) to a concentration of 5 wt %. The resulting solution was spread on a glass plate by spin coating, air-dried and then dried in vacuo at 80° C. to form a solid polymer electrolyte membrane XI of 25 μm in thickness. The ion electric conductivity of the obtained solid polymer electrolyte membrane XI was 25 S/cm.

In a Teflon-coated closed container made of SUS, the aforesaid solid polymer electrolyte membrane XI obtained and 20 ml of ion-exchanged water were maintained at 120° C. for 2 weeks. After the maintenance, the ion electric conductivity of the obtained solid polymer electrolyte membrane XI was the same as its initial value like that of the perfluorocarbon sulfonic acid solid polymer electrolyte membrane (Nafion 117), and the solid polymer electrolyte membrane XI was firm.

On the other hand, the relatively inexpensive sulfonated aromatic hydrocarbon solid polymer electrolyte membrane X of Comparative Example 2 was broken to tatters under the same conditions of hydrolysis by heating as above. Thus, unlike the sulfonated poly(1,4-phenylene ether ether sulfone) solid polymer electrolyte membrane X of Comparative Example 2, the inexpensive sulfobutylated poly(1,4-phenylene ether ether sulfone) solid polymer electrolyte membrane XI was stable like the perfluorocarbon sulfonic acid solid polymer electrolyte membrane (Nafion 117) and was excellent in both cost and resistance to hydrolysis (durability).

(3) Production of Electrocatalyst-coating Solutions and Membrane-electrodes Assemblies The same solution as in the above item (2), i.e., a 5 wt % solution of the solid polymer electrolyte XI in the N,N-dimethylformamide-cyclohexanone-methyl ethyl ketone mixed solvent was added to platinum-supporting carbon (content of platinum supported: 40 wt %), so that the weight ratio of platinum catalyst to the solid polymer electrolyte might be 2:1. The platinum-supporting carbon was uniformly dispersed in the solution to prepare a paste (an electrocatalyst-coating solution XI).

In a Teflon-coated closed container made of SUS, 1.0 g of the aforesaid electrocatalyst-coating solution XI and 20 ml of ion-exchanged water were maintained at 120° C. for 2 weeks. After cooling, the solvent was vaporized and the resulting solid was washed with water. Then, the ion-exchange group equivalent weight of the electrocatalyst-coating solution XI after maintenance was measured. As a result, it was found that the ion-exchange group equivalent weight of the electrocatalyst-coating solution XI was 650 g/equivalent, the same value as the initial value, namely, the electrocatalyst-coating solution XI was stable like the perfluorocarbon sulfonic acid (Nafion 117) electrocatalyst-coating solution.

On the other hand, as described in Comparative Example 2, (2), the ion-exchange group equivalent weight of the electrocatalyst-coating solution X was increased to 1,250 g/equivalent from its initial value of 660 g/equivalent under the same conditions of hydrolysis by heating as above, namely, sulfonic acid groups were released. Thus, unlike the electrocatalyst-coating solution X of Comparative Example 2, the inexpensive electrocatalyst-coating solution XI was stable like the perfluorocarbon sulfonic acid (Nafion 117) electrocatalyst-coating solution and was excellent in both cost and resistance to hydrolysis (durability).

The aforesaid electrocatalyst-coating solution XI was applied on both sides of the solid polymer electrolyte membrane XI obtained in the above item (2), and was dried to produce a membrane-electrodes assembly XI having an amount of platinum supported of 0.25 mg/cm$^2$.

The electrocatalyst-coating solution X of Comparative Example 2 was applied on both sides of the same solid polymer electrolyte membrane XI as that obtained in the above item (2), and was dried to produce a membrane-electrodes assembly XI' having an amount of platinum supported of 0.25 mg/cm$^2$.

A 5 wt % solution of the perfluorocarbon sulfonic acid solid polymer electrolyte in an alcohol-water mixed solvent was added to platinum-supporting carbon (content of platinum supported: 40 wt %), so that the weight ratio of platinum catalyst to the solid polymer electrolyte might be 2:1. The platinum-supporting carbon was uniformly dispersed in the solution to prepare a paste (an electrocatalyst-coating solution). This electrocatalyst-coating solution was applied on both sides of the same solid polymer electrolyte membrane XI as that obtained in the above item (2), and was dried to produce a membrane-electrodes assembly XI" having an amount of platinum supported of 0.25 mg/cm$^2$.

In a Teflon-coated closed container made of SUS, the aforesaid membrane-electrodes assembly XI obtained and 20 ml of ion-exchanged water were maintained at 120° C. for 2 weeks. After the maintenance, the membrane-electrodes assembly XI was not different from that before the maintenance like a membrane-electrodes assembly produced by using the perfluorocarbon sulfonic acid solid polymer electrolyte membrane (Nafion 117) and the perfluorocarbon sulfonic acid solid polymer electrolyte (Nafion 117), and its membrane was firm.

In a Teflon-coated closed container made of SUS, the aforesaid membrane-electrodes assembly XI' obtained and 20 ml of ion-exchanged water were maintained at 120° C. for 2 weeks. In the membrane-electrodes assembly XI' after the maintenance, the electrodes were peeling a little but the membrane was firm. The assembly XI' after the maintenance had power-generating capability.

In a Teflon-coated closed container made of SUS, the aforesaid membrane-electrodes assembly XI" obtained and 20 ml of ion-exchanged water were maintained at 120° C. for 2 weeks. In the membrane-electrodes assembly XI" after the maintenance, the electrodes were peeling a little but the membrane was firm. The assembly XI" after the maintenance had power-generating capability.

On the other hand, as described in Comparative Example 2, (3), the membrane of the membrane-electrodes assembly X produced by using the relatively inexpensive sulfonated aromatic hydrocarbon solid polymer electrolyte membrane X and the electrocatalyst-coating solution X was broken to tatters and the electrodes of the assembly were peeled, under the same conditions of hydrolysis by heating as above. Thus, unlike the membrane-electrodes assembly X of Comparative Example 2, i.e., the assembly of the sulfonated aromatic hydrocarbon solid polymer electrolyte membrane and electrodes, the inexpensive assembly XI of the sulfobutylated poly(1,4-phenylene ether ether sulfone) solid polymer electrolyte membrane and electrodes was stable like the assembly of the perfluorocarbon sulfonic acid (Nafion 117) membrane and electrodes, and was excellent in both cost and resistance to hydrolysis (durability).

(4) Durability Test on Single Cells for Fuel Cell

The above-mentioned membrane-electrodes assemblies XI, XI' and XI" were allowed to absorb water by immersion in boiling deionized water for 2 hours. Each of the thus treated membrane-electrodes assemblies was incorporated into a cell for evaluation and the output capability of the resulting single cell for fuel cell was evaluated.

In detail, the single cell for solid polymer electrolyte fuel cell shown in FIG. 1 was produced by adhering a packing material (a supporting current collector) 5 of thin carbon paper to each of the electrodes of each membrane-electrodes assembly 4 obtained in Example 14 and composed of a solid polymer electrolyte membrane 1, an oxygen electrode 2 and a hydrogen electrode 3, and providing an electroconductive separator (a bipolar plate) 6 capable of serving as a separator between electrode chambers and passageways for gas supply to the electrodes, on the outer surface of each packing material. The single cells for fuel cells thus obtained were subjected to a long-term deterioration test at a current density of 300 mA/cm$^2$. The results obtained are shown in FIG. 14.

Figure 14:
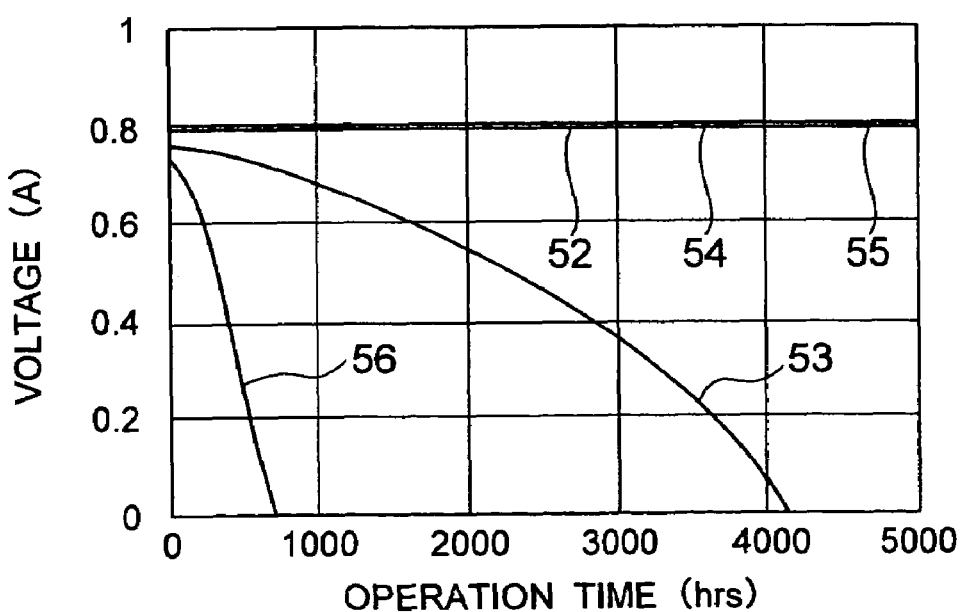
FIG. 14 is a graph showing the results of a durability test on single cells for solid polymer electrolyte fuel cell produced in Example 14.

In FIG. 14, numerals 52, 53 and 54 indicate the results of the durability test on the single cells for fuel cell obtained by using the assemblies XI, XI' and XI", respectively, of the solid polymer electrolyte membrane and electrodes.

In FIG. 14, numeral 55 indicates the result of the durability test on a single cell for fuel cell obtained by using the assembly of the perfluorocarbon sulfonic acid (Nafion 117) solid polymer electrolyte membrane and electrodes.

In FIG. 14, numeral 52 indicates the change with time of output voltage of the single cell for fuel cell of Example 14 produced by using a solid polymer electrolyte membrane of a polyether ether sulfone having sulfonic acid groups bonded thereto through alkylene groups and an electrocatalyst-coating solution containing the polyether ether sulfone solid polymer electrolyte having sulfonic acid groups bonded thereto through alkylene groups. Numeral 53 indicates the change with time of output voltage of the single cell for fuel cell produced in Example 14 by using a solid polymer electrolyte membrane of the polyether ether sulfone having sulfonic acid groups bonded thereto through alkylene groups and an electrocatalyst-coating solution containing a polyether ether sulfone solid polymer electrolyte having sulfonic acid groups directly bonded thereto. Numeral 54 indicates the change with time of output voltage of the single cell for fuel cell produced in Example 14 by using a solid polymer electrolyte membrane of the polyether ether sulfone having sulfonic acid groups bonded thereto through alkylene groups and an electrocatalyst-coating solution containing the perfluorocarbon sulfonic acid solid polymer electrolyte (Nafion 117). Numeral 55 indicates the change with time of output voltage of the single cell for fuel cell obtained by using the perfluorocarbon sulfonic acid solid polymer electrolyte membrane (Nafion 117). Numeral 56 indicates the change with time of output voltage of a single cell for fuel cell of Comparative Example 14 produced by using a solid polymer electrolyte membrane of a polyether ether sulfone having sulfonic acid groups directly bonded thereto and an electrocatalyst-coating solution containing the polyether ether sulfone solid polymer electrolyte having sulfonic acid groups directly bonded thereto.

As can be seen from the results indicated by numerals 52 and 54 in FIG. 14, the initial voltage of the single cells obtained by using the assemblies XI and XI", respectively, of the solid polymer electrolyte membrane of the present invention and electrodes was 0.79 V, and the single cells had the same voltage as the initial voltage even after 5,000 hours of operation. These results were equal to those obtained by the use of the perfluorocarbon sulfonic acid solid polymer electrolyte membrane (Nafion 117) and indicated by numeral 55 in FIG. 14.

On the other hand, the initial output voltage of the single cell for fuel cell indicated by numeral 56 in FIG. 14 (the single cell for fuel cell of Comparative Example 2 obtained by using the sulfonated aromatic hydrocarbon solid polymer electrolyte X) was 0.73 V, and the output of this single cell was zero after 600 hours of operation.

From this fact, it is clear that the single cell for fuel cell produced by using the aromatic hydrocarbon solid polymer electrolyte obtained by bonding sulfonic acid groups to the aromatic rings of an aromatic hydrocarbon polymer through alkylene groups is superior in durability to the single cell for fuel cell produced by using the aromatic hydrocarbon solid polymer electrolyte having sulfonic acid groups directly bonded thereto.

The single cell for fuel cell obtained by using the membrane-electrodes assembly XI of the present invention is superior in durability to the single cell for fuel cell obtained by using the membrane-electrodes assembly XI'. That is, the electrocatalyst-coating solution XI is more suitable than the electrocatalyst-coating solution X, for coating an electrocatalyst for a membrane-electrodes assembly.

The reason why the output voltage of the single cell for fuel cell of Example 14 is higher than that of the single cell for fuel cell of Comparative Example 2 though the membrane-electrodes assemblies of Example 14 and Comparative Example 2 have the same amount of platinum supported of 0.25 mg/cm$^2$, is that the ion electric conductivity of the solid polymer electrolyte membrane and electrocatalyst-coating solution used in the membrane-electrodes assembly of Example 14 is higher than that of the solid polymer electrolyte membrane and electrocatalyst-coating solution used in the membrane-electrodes assembly of Comparative Example 2.

(5) Production of a Fuel Cell

A solid polymer electrolyte fuel cell was produced by laminating 36 single cells produced in the same manner as in the above item (4) according to the present invention. The fuel cell had an output of 3 kW.

EXAMPLE 15

(1) Synthesis of a chloromethylated poly(1,4-phenylene ether ether sulfone)

The inner atmosphere of a 500-ml four-necked round bottom flask equipped with a stirrer, a thermometer and a reflux condenser having a calcium chloride tube connected thereto was replaced with nitrogen. Thereafter, 36.1 g of a poly(1,4-phenylene ether ether sulfone) [(—C$_6$H$_4$-4-SO$_2$C$_6$H$_4$-4-OC$_6$H$_4$-4-O—)$_n$], 60 g (2 mols) of paraformaldehyde and 50 ml of dried nitrobenzene were placed in the flask. Then, 73 g of hydrogen chloride gas was bubbled thereinto with stirring while maintaining the temperature at 100° C. After completion of the bubbling, the resulting mixture was maintained at 150° C. for 4 hours.

Subsequently, the reaction solution was slowly dropped into 1 liter of deionized water to precipitate a chloromethylated poly(1,4-phenylene ether ether sulfone), which was recovered by filtration. The recovered precipitate was repeatedly subjected to washing with deionized water in a mixer and recovery by filtration by suction until the filtrate became neutral. Thereafter, the precipitate thus treated was dried overnight at 80° C. under reduced pressure.

(2) Synthesis of a sulfomethylated poly(1,4-phenylene ether ether sulfone)

The inner atmosphere of a 500-ml four-necked round bottom flask equipped with a stirrer, a thermometer and a reflux condenser having a calcium chloride tube connected thereto was replaced with nitrogen. Thereafter, 10 g of the aforesaid chloromethylated poly(1,4-phenylene ether ether sulfone), 50 ml of dried nitrobenzene and 30 g of sodium sulfate were placed in the flask and stirred at 100° C. for 5 hours. Then, 10 ml of ion-exchanged water was added thereto and stirred for 5 hours.

Subsequently, the reaction solution was slowly dropped into 1 liter of deionized water to precipitate a sulfomethylated poly(1,4-phenylene ether ether sulfone) XII, which was recovered by filtration. The recovered precipitate was repeatedly subjected to washing with deionized water in a mixer and recovery by filtration by suction until the filtrate became neutral. Thereafter, the precipitate thus treated was dried overnight at 120° C. under reduced pressure.

The dried precipitate was subjected to $^1$HNMR measurement to find that a new peak due to a —CH$_2$SO$_3$H group was present at 2.2 ppm. The ion-exchange group equivalent weight of the sulfomethylated poly(1,4-phenylene ether ether sulfone) solid polymer electrolyte XII thus obtained was 650 g/equivalent.

Since the sulfomethylated poly(1,4-phenylene ether ether sulfone) solid polymer electrolyte XII can be produced by the above process through two steps by using the poly(1,4-phenylene ether ether sulfone), an inexpensive commercial engineering plastic, as a starting material, the cost of production thereof is as very low as less than one-thirtieth that of the perfluorocarbon sulfonic acid solid polymer electrolyte (Nafion 117) produced through five steps.

In a Teflon-coated closed container made of SUS, 1.0 g of the obtained sulfomethylated poly(1,4-phenylene ether ether sulfone) solid polymer electrolyte XII and 20 ml of ion-exchanged water were maintained at 120° C. for 2 weeks. After cooling and thorough washing with water, the ion-exchange group equivalent weight of the sulfomethylated poly(1,4-phenylene ether ether sulfone) solid polymer electrolyte XII was measured.

As a result, it was found that the ion-exchange group equivalent weight of the sulfomethylated poly(1,4-phenylene ether ether sulfone) solid polymer electrolyte XII was 650 g/equivalent, the same value as the initial value, namely, the solid polymer electrolyte XII was stable like the perfluorocarbon sulfonic acid solid polymer electrolyte (Nafion 117).

On the other hand, as described in Comparative Example 2, (1), the ion-exchange group equivalent weight of the inexpensive sulfonated aromatic hydrocarbon solid polymer electrolyte X was increased to 1,250 g/equivalent from its initial value of 660 g/equivalent under the same conditions of hydrolysis by heating as above, namely, sulfonic acid groups were released from the solid polymer electrolyte X. Thus, unlike the sulfonated poly(1,4-phenylene ether ether sulfone) solid polymer electrolyte X, the inexpensive sulfomethylated poly(1,4-phenylene ether ether sulfone) solid polymer electrolyte XII was stable like the perfluorocarbon sulfonic acid solid polymer electrolyte (Nafion 117) and was excellent in both cost and resistance to hydrolysis (durability).

(3) Formation of a Solid Polymer Electrolyte Membrane

The sulfomethylated poly(1,4-phenylene ether ether sulfone) solid polymer electrolyte XII obtained in the above item (2) was dissolved in a 1:1 mixed solvent of trichloroethane and dichloroethane to a concentration of 5 wt %. The resulting solution was spread on a glass plate by spin coating, air-dried and then dried in vacuo at 80° C. to form a sulfomethylated poly(1,4-phenylene ether ether sulfone) solid polymer electrolyte membrane XII of 42 µm in thickness. The ionic conductance of the obtained solid polymer electrolyte membrane XII was 5 S/cm.

In a Teflon-coated closed container made of SUS, the aforesaid sulfomethylated poly(1,4-phenylene ether ether sulfone) solid polymer electrolyte membrane XII and 20 ml of ion-exchanged water were maintained at 120° C. for 2 weeks. After the maintenance, the ion electric conductivity of the solid polymer electrolyte membrane XII was the same as its initial value like that of the perfluorocarbon sulfonic acid solid polymer electrolyte membrane (Nafion 117), and the solid polymer electrolyte membrane XII was firm.

On the other hand, as described in Comparative Example 2, (2), the relatively inexpensive sulfonated poly(1,4-phenylene ether ether sulfone) solid polymer electrolyte membrane X was broken to tatters under the same conditions of hydrolysis by heating as above. Thus, unlike the inexpensive sulfonated poly(1,4-phenylene ether ether sulfone) solid polymer electrolyte membrane X, the inexpensive sulfomethylated poly (1,4-phenylene ether ether sulfone) solid polymer electrolyte membrane XII was stable like the perfluorocarbon sulfonic acid solid polymer electrolyte membrane (Nafion 117) and was excellent in both cost and resistance to hydrolysis (durability).

(4) Production of Electrocatalyst-coating Solutions and Membrane-electrodes Assemblies The same solution as in the above item (3), i.e., a 5 wt % solution of the solid polymer electrolyte XII in the trichloroethane-dichloroethane mixed solvent was added to platinum-supporting carbon (content of platinum supported: 40 wt %), so that the weight ratio of platinum catalyst to the solid polymer electrolyte might be 2:1. The platinum-supporting carbon was uniformly dispersed in the solution to prepare a paste (an electrocatalyst-coating solution XII).

In a Teflon-coated closed container made of SUS, 1.0 g of the aforesaid electrocatalyst-coating solution XII and 20 ml of ion-exchanged water were maintained at 120° C. for 2 weeks. After cooling, the solvent was vaporized and the resulting solid was washed with water. Then, the ion-exchange group equivalent weight of the electrocatalyst-coating solution XII after the maintenance was measured. As a result, it was found that the ion-exchange group equivalent weight of the electrocatalyst-coating solution XII was 650 g/equivalent, the same value as the initial value, namely, the electrocatalyst-coating solution XII was stable like the perfluorocarbon sulfonic acid (Nafion 117) electrocatalyst-coating solution.

On the other hand, as described in Comparative Example 2, (2), the ion-exchange group equivalent weight of the electrocatalyst-coating solution X was increased to 1,250 g/equivalent from its initial value of 660 g/equivalent under the same conditions of hydrolysis by heating as above, namely, sulfonic acid groups were released. Thus, unlike the inexpensive electrocatalyst-coating solution X described in Comparative Example 2, (2), the inexpensive electrocatalyst-coating solution XII was stable like the perfluorocarbon sulfonic acid (Nafion 117) electrocatalyst-coating solution and was excellent in both cost and resistance to hydrolysis (durability).

The aforesaid electrocatalyst-coating solution XII was applied on both sides of the solid polymer electrolyte membrane XII obtained in the above item (3), and was dried to produce a membrane-electrodes assembly XII having an amount of platinum supported of 0.25 mg/cm$^2$.

The electrocatalyst-coating solution X described in Comparative Example 2, (2) was applied on both sides of the same solid polymer electrolyte membrane XII as that obtained in the above item (3), and was dried to produce a membrane-electrodes assembly XII' having an amount of platinum supported of 0.25 mg/cm$^2$.

A 5 wt % solution of the perfluorocarbon sulfonic acid solid polymer electrolyte (Nafion 117) in an alcohol-water mixed solvent was added to platinum-supporting carbon (content of platinum supported: 40 wt %), so that the weight ratio of platinum catalyst to the solid polymer electrolyte might be 2:1. The platinum-supporting carbon was uniformly dispersed in the solution to prepare a paste (an electrocatalyst-coating solution). This electrocatalyst-coating solution was applied on both sides of the same solid polymer electrolyte membrane XII as that obtained in the above item (3), and was dried to produce a membrane-electrodes assembly XII" having an amount of platinum supported of 0.25 mg/cm$^2$.

In a Teflon-coated closed container made of SUS, the aforesaid membrane-electrodes assembly XII obtained and 20 ml of ion-exchanged water were maintained at 120° C. for 2 weeks. After the maintenance, the membrane-electrodes assembly XII was not different from that before the maintenance like a membrane-electrodes assembly produced by using the perfluorocarbon sulfonic acid solid polymer electrolyte membrane (Nafion 117) and the perfluorocarbon sulfonic acid solid polymer electrolyte (Nafion 117), and its membrane was firm.

In a Teflon-coated closed container made of SUS, the aforesaid membrane-electrodes assembly XII' obtained and 20 ml of ion-exchanged water were maintained at 120° C. for 2 weeks. In the membrane-electrodes assembly XII' after the maintenance, the electrodes were peeling a little but the membrane was firm. The assembly XII' after the maintenance had power-generating capability.

In a Teflon-coated closed container made of SUS, the aforesaid membrane-electrodes assembly XII" obtained and 20 ml of ion-exchanged water were maintained at 120° C. for 2 weeks. In the membrane-electrodes assembly XII" after the maintenance, the electrodes were peeling a little but the membrane was firm. The assembly XII" after the maintenance had power-generating capability.

On the other hand, as described in Comparative Example 2, (3), the membrane of the membrane-electrodes assembly X produced by using the relatively inexpensive sulfonated poly (1,4-phenylene ether ether sulfone) solid polymer electrolyte membrane X and the electrocatalyst-coating solution X was broken to tatters and the electrodes of the assembly were peeled, under the same conditions of hydrolysis by heating as above.

Thus, unlike the membrane-electrodes assembly X of Comparative Example 2, i.e., the assembly of the sulfonated poly(1,4-phenylene ether ether sulfone) solid polymer electrolyte membrane and electrodes, the inexpensive assembly XII of the sulfomethylated poly(1,4-phenylene ether ether sulfone) solid polymer electrolyte membrane and electrodes was stable like the assembly of the perfluorocarbon sulfonic acid (Nafion 117) membrane and electrodes, and was excellent in both cost and resistance to hydrolysis (durability).

(5) Durability Test on Single Cells for Fuel Cell

The above-mentioned membrane-electrodes assemblies XII, XII' and XII" were allowed to absorb water by immersion in boiling deionized water for 2 hours. Each of the thus treated membrane-electrodes assemblies was incorporated into a cell for evaluation. The output capability of the resulting single cell for fuel cell was evaluated.

In detail, the single cell for solid polymer electrolyte fuel cell shown in FIG. 1 was produced by adhering a packing material (a supporting current collector) 5 of thin carbon paper to each of the electrodes of each membrane-electrodes assembly 4 obtained in Example 15 and composed of a solid polymer electrolyte membrane 1, an oxygen electrode 2 and a hydrogen electrode 3, and providing an electroconductive separator (a bipolar plate) 6 capable of serving as a separator between electrode chambers and passageways for gas supply to the electrodes, on the outer surface of each packing material. The single cells for solid polymer electrolyte fuel cell thus obtained were subjected to a long-term deterioration test at a current density of 300 mA/cm$^2$. The results are shown in FIG. 15.

Figure 15:
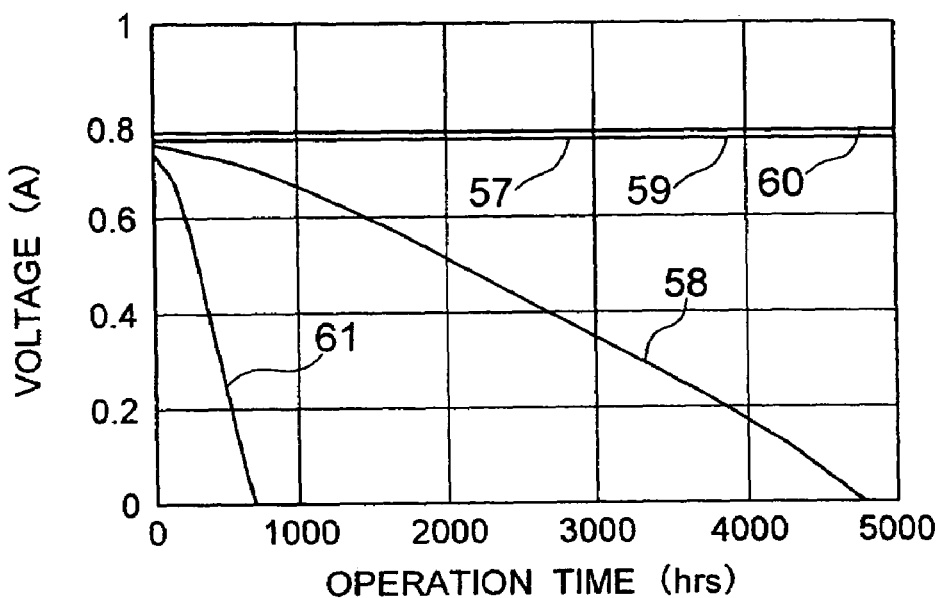
FIG. 15 is a graph showing the results of a durability test on single cells for solid polymer electrolyte fuel cell produced in Example 15.

In FIG. 15, numerals 57, 58 and 59 indicate the results of the durability test on the single cells for fuel cell obtained by using the assemblies XII, XII' and XII", respectively, of the solid polymer electrolyte membrane and electrodes.

In FIG. 15, numeral 60 indicates the result of the durability test on a single cell for fuel cell obtained by using the assembly of the perfluorocarbon sulfonic acid (Nafion 117) solid polymer electrolyte membrane and electrodes.

In FIG. 15, numeral 57 indicates the change with time of output voltage of the single cell for fuel cell of Example 15 produced by using a solid polymer electrolyte membrane of a polyether ether sulfone having sulfonic acid groups bonded thereto through alkylene groups and an electrocatalyst-coating solution containing the polyether ether sulfone solid polymer electrolyte having sulfonic acid groups bonded thereto through alkylene groups. Numeral 58 indicates the change with time of output voltage of the single cell for fuel cell produced in Example 15 by using a solid polymer electrolyte membrane of the polyether ether sulfone having sulfonic acid groups bonded thereto through alkylene groups and an electrocatalyst-coating solution containing a polyether ether sulfone solid polymer electrolyte having sulfonic acid groups directly bonded thereto.

Numeral 59 indicates the change with time of output voltage of the single cell for fuel cell produced in Example 15 by using a solid polymer electrolyte membrane of the polyether ether sulfone having sulfonic acid groups bonded thereto through alkylene groups and an electrocatalyst-coating solution containing the perfluorocarbon sulfonic acid solid polymer electrolyte (Nafion 117). Numeral 60 indicates the change with time of output voltage of the single cell for fuel cell obtained by using the perfluorocarbon sulfonic acid solid polymer electrolyte membrane (Nafion 117). Numeral 61 indicates the change with time of output voltage of a single cell for fuel cell of Comparative Example 15 produced by using a solid polymer electrolyte membrane of a polyether ether sulfone having sulfonic acid groups directly bonded thereto and an electrocatalyst-coating solution containing the polyether ether sulfone solid polymer electrolyte having sulfonic acid groups directly bonded thereto.

As can be seen from the results indicated by numerals 57 and 59 in FIG. 15, the initial voltage of the single cells obtained by using the assemblies XII and XII", respectively, of the solid polymer electrolyte membrane of the present invention and electrodes was 0.74 V, and the single cells had the same voltage as the initial voltage even after 5,000 hours of operation. These results were equal to those obtained by the use of the perfluorocarbon sulfonic acid solid polymer electrolyte membrane (Nafion 117) and indicated by numeral 60 in FIG. 15.

On the other hand, the initial output voltage of the single cell for fuel cell indicated by numeral 61 in FIG. 15 (the single cell for fuel cell of Comparative Example 2 obtained by using the sulfonated aromatic hydrocarbon solid polymer electrolyte membrane) was 0.73 V, and the output of this single cell was zero after 600 hours of operation.

From this fact, it is clear that the single cell for fuel cell produced by using the aromatic hydrocarbon solid polymer electrolyte obtained by bonding sulfonic acid groups to the aromatic rings of an aromatic hydrocarbon polymer through alkylene groups is superior in durability to the single cell for fuel cell produced by using the aromatic hydrocarbon solid polymer electrolyte having sulfonic acid groups directly bonded thereto.

The single cell for fuel cell obtained by using the membrane-electrodes assembly XII of the present invention is superior in durability to the single cell for fuel cell obtained by using the membrane-electrodes assembly XII'. That is, the electrocatalyst-coating solution XII is more suitable than the electrocatalyst-coating solution X, for coating an electrocatalyst for a membrane-electrodes assembly.

The reason why the output voltage of the single cell for fuel cell of Example 15 is higher than that of the single cell for fuel cell of Comparative Example 2 though the membrane-electrodes assemblies of Example 15 and Comparative Example 2 have the same amount of platinum supported of 0.25 mg/cm$^2$, is that the ion electric conductivity of the solid polymer electrolyte membrane and electrocatalyst-coating solution used in the membrane-electrodes assembly of Example 15 is higher than that of the solid polymer electrolyte membrane and electrocatalyst-coating solution used in the membrane-electrodes assembly of Comparative Example 2.

(6) Production of a Fuel Cell

A solid polymer electrolyte fuel cell was produced by laminating 36 single cells produced in the same manner as in the above item (5) according to the present invention. The fuel cell had an output of 3 kW.

EXAMPLE 16

(1) Synthesis of a bromohexamethylated poly(1,4-phenylene ether ether sulfone)

The inner atmosphere of a 500-ml four-necked round bottom flask equipped with a stirrer, a thermometer and a reflux condenser having a calcium chloride tube connected thereto was replaced with nitrogen. Thereafter, 38.8 g of a poly(1,4-phenylene ether ether sulfone) [(—C$_6$H$_4$-4-SO$_2$C$_6$H$_4$-4-OC$_6$H$_4$-4-C$_6$H$_4$-4-O—)$_n$] and 50 ml of dried nitrobenzene were placed in the flask. Then, 6.5 g of n-butoxylithium was added thereto and the resulting mixture was maintained at room temperature for 2 hours. Subsequently, 100 g of 1,6-dibromohexane was added thereto and stirred for 12 hours.

The reaction solution was slowly dropped into 1 liter of deionized water to precipitate a bromohexamethylated poly (1,4-phenylene ether ether sulfone), which was recovered by filtration. The recovered precipitate was repeatedly subjected to washing with deionized water in a mixer and recovery by filtration by suction until the filtrate became neutral. The precipitate thus treated was dried overnight at 120° C. under reduced pressure.

(2) Synthesis of a sulfohexamethylated poly(1,4-phenylene ether ether sulfone)

The inner atmosphere of a 500-ml four-necked round bottom flask equipped with a stirrer, a thermometer and a reflux condenser having a calcium chloride tube connected thereto was replaced with nitrogen. Thereafter, 10 g of the aforesaid bromohexamethylated poly(1,4-phenylene ether ether sulfone), 50 ml of dried nitrobenzene and 30 g of sodium sulfate were placed in the flask and stirred at 100° C. for 5 hours. Then, 10 ml of ion-exchanged water was added thereto and stirred for 5 hours.

Subsequently, the reaction solution was slowly dropped into 1 liter of deionized water to precipitate a sulfohexamethylated poly(1,4-phenylene ether ether sulfone), which was recovered by filtration. The recovered precipitate was repeatedly subjected to washing with deionized water in a mixer and recovery by filtration by suction until the filtrate became neutral. The precipitate thus treated was dried overnight at 120° C. under reduced pressure.

The dried precipitate was subjected to $^1$HNMR measurement to find that new peaks due to a $-CH_2CH_2CH_2CH_2CH_2CH_2SO_3H$ group were present at 1.3 to 4.6 ppm. This fact confirmed the introduction of sulfohexamethyl groups. The ion-exchange group equivalent weight of the sulfohexamethylated poly(1,4-phenylene ether ether sulfone) solid polymer electrolyte XIII thus obtained was 660 g/equivalent.

Since the sulfohexamethylated poly(1,4-phenylene ether ether sulfone) solid polymer electrolyte XIII can be produced by the above process through two steps by using the poly(1,4-phenylene ether ether sulfone), an inexpensive commercial engineering plastic, as a starting material, the cost of production thereof is as low as less than one-thirtieth that of the perfluorocarbon sulfonic acid solid polymer electrolyte (Nafion 117) produced through five steps by using an expensive starting material.

In a Teflon-coated closed container made of SUS, 1.0 g of the obtained sulfohexamethylated poly(1,4-phenylene ether ether sulfone) solid polymer electrolyte XIII and 20 ml of ion-exchanged water were maintained at 120° C. for 2 weeks. After cooling and thorough washing with water, the ion-exchange group equivalent weight of the sulfohexamethylated poly(1,4-phenylene ether ether sulfone) solid polymer electrolyte XIII was measured.

As a result, it was found that the ion-exchange group equivalent weight of the sulfohexamethylated poly(1,4-phenylene ether ether sulfone) solid polymer electrolyte XIII was 660 g/equivalent, the same value as the initial value, namely, the solid polymer electrolyte XIII was stable like the perfluorocarbon sulfonic acid solid polymer electrolyte (Nafion 117).

On the other hand, as described in Comparative Example 2, (1), the ion-exchange group equivalent weight of the inexpensive sulfonated poly(1,4-phenylene ether ether sulfone) solid polymer electrolyte X was increased to 1,250 g/equivalent from its initial value of 660 g/equivalent under the same conditions of hydrolysis by heating as above, namely, sulfonic acid groups were released from the solid polymer electrolyte X.

Thus, unlike the inexpensive sulfonated poly(1,4-phenylene ether ether sulfone) solid polymer electrolyte X, the inexpensive sulfohexamethylated poly(1,4-phenylene ether ether sulfone) solid polymer electrolyte XIII was stable like the perfluorocarbon sulfonic acid solid polymer electrolyte (Nafion 117) and was excellent in both cost and resistance to hydrolysis (durability).

(3) Formation of a Solid Polymer Electrolyte Membrane

The product obtained in the above item (2) was dissolved in a N,N-dimethylformamide-cyclohexanone-methyl ethyl ketone mixed solvent (volume ratio; 20:80:25) to a concentration of 5 wt %. The resulting solution was spread on a glass plate by spin coating, air-dried and then dried in vacuo at 80° C. to form a sulfohexamethylated poly(1,4-phenylene ether ether sulfone) solid polymer electrolyte membrane XIII of 42 μm in thickness. The ion electric conductivity of the obtained sulfohexamethylated poly(1,4-phenylene ether ether sulfone) solid polymer electrolyte membrane XIII was 40 S/cm.

In a Teflon-coated closed container made of SUS, the aforesaid sulfohexamethylated poly(1,4-phenylene ether ether sulfone) solid polymer electrolyte membrane XIII and 20 ml of ion-exchanged water were maintained at 120° C. for 2 weeks. After the maintenance, the ion electric conductivity of the obtained solid polymer electrolyte membrane XIII was the same as its initial value like that of the perfluorocarbon sulfonic acid solid polymer electrolyte membrane (Nafion 117), and the solid polymer electrolyte membrane XIII was firm.

On the other hand, as described in Comparative Example 2, (2), the relatively inexpensive sulfonated poly(1,4-phenylene ether ether sulfone) solid polymer electrolyte membrane X was broken to tatters under the same conditions of hydrolysis by heating as above.

Thus, unlike the sulfonated poly(1,4-phenylene ether ether sulfone) solid polymer electrolyte membrane X, the inexpensive sulfohexamethylated poly(1,4-phenylene ether ether sulfone) solid polymer electrolyte membrane XIII was stable like the perfluorocarbon sulfonic acid solid polymer electrolyte membrane (Nafion 117) and was excellent in both cost and resistance to hydrolysis (durability).

(4) Production of Electrocatalyst-coating Solutions and Membrane-electrodes Assemblies The same solution as in the above item (3), i.e., a 5 wt % solution of the solid polymer electrolyte XIII in the N,N-dimethylformamide-cyclohexanone-methyl ethyl ketone mixed solvent was added to platinum-supporting carbon (content of platinum supported: 40 wt %), so that the weight ratio of platinum catalyst to the solid polymer electrolyte might be 2:1. The platinum-supporting carbon was uniformly dispersed in the solution to prepare a paste (an electrocatalyst-coating solution XIII).

In a Teflon-coated closed container made of SUS, 1.0 g of the aforesaid electrocatalyst-coating solution XIII and 20 ml of ion-exchanged water were maintained at 120° C. for 2 weeks. After cooling, the solvent was vaporized and the resulting solid was washed with water. Then, the ion-exchange group equivalent weight of the electrocatalyst-coating solution XIII after the maintenance was measured. As a result, it was found that the ion-exchange group equivalent weight of the electrocatalyst-coating solution XIII was 660 g/equivalent, the same value as the initial value, namely, the electrocatalyst-coating solution XIII was stable like the perfluorocarbon sulfonic acid (Nafion 117) electrocatalyst-coating solution.

On the other hand, as described in Comparative Example 2, (2), the ion-exchange group equivalent weight of the electrocatalyst-coating solution X was increased to 1,250 g/equivalent from its initial value of 660 g/equivalent under the same conditions of hydrolysis by heating as above, namely, sulfonic acid groups were released.

Thus, unlike the inexpensive electrocatalyst-coating solution X described in Comparative Example 2, (2), the inexpensive electrocatalyst-coating solution XIII was stable like the perfluorocarbon sulfonic acid (Nafion 117) electrocatalyst-coating solution and was excellent in both cost and resistance to hydrolysis (durability).

The aforesaid electrocatalyst-coating solution XIII was applied on both sides of the solid polymer electrolyte membrane XIII obtained in the above item (3), and was dried to produce a membrane-electrodes assembly XIII having an amount of platinum supported of 0.25 mg/cm$^2$.

The electrocatalyst-coating solution X described in Comparative Example 2, (2) was applied on both sides of the same solid polymer electrolyte membrane XIII as that obtained in the above item (3), and was dried to produce a membrane-electrodes assembly XIII' having an amount of platinum supported of 0.25 mg/cm$^2$.

A 5 wt % solution of the perfluorocarbon sulfonic acid solid polymer electrolyte (Nafion 117) in an alcohol-water mixed solvent was added to platinum-supporting carbon (content of platinum supported: 40 wt %), so that the weight ratio of platinum catalyst to the solid polymer electrolyte might be 2:1. The platinum-supporting carbon was uniformly dispersed in the solution to prepare a paste (an electrocatalyst-coating solution). This electrocatalyst-coating solution was applied on both sides of the same solid polymer electrolyte membrane XIII as that obtained in the above item (3), and was dried to produce a membrane-electrodes assembly XIII" having an amount of platinum supported of 0.25 mg/cm$^2$.

In a Teflon-coated closed container made of SUS, the aforesaid membrane-electrodes assembly XIII obtained and 20 ml of ion-exchanged water were maintained at 120° C. for 2 weeks. After the maintenance, the membrane-electrodes assembly XIII was not different from that before the maintenance like a membrane-electrodes assembly produced by using the perfluorocarbon sulfonic acid solid polymer electrolyte membrane (Nafion 117) and the perfluorocarbon sulfonic acid solid polymer electrolyte (Nafion 117), and its membrane was firm.

In a Teflon-coated closed container made of SUS, the aforesaid membrane-electrodes assembly XIII' obtained and 20 ml of ion-exchanged water were maintained at 120° C. for 2 weeks. In the membrane-electrodes assembly XIII' after the maintenance, the electrodes were peeling a little but the membrane was firm. The assembly XIII' after the maintenance had power-generating capability.

In a Teflon-coated closed container made of SUS, the aforesaid membrane-electrodes assembly XIII" obtained and 20 ml of ion-exchanged water were maintained at 120° C. for 2 weeks. In the membrane-electrodes assembly XIII" after the maintenance, the electrodes were peeling a little but the membrane was firm. The assembly XIII" after the maintenance had power-generating capability.

(5) Durability Test on Single Cells for Fuel Cell

The above-mentioned membrane-electrodes assemblies XIII, XIII' and XIII" were allowed to absorb water by immersion in boiling deionized water for 2 hours. Each of the thus treated membrane-electrodes assemblies was incorporated into a cell for evaluation and the output capability of the resulting single cell for fuel cell was evaluated. In detail, the single cell for solid polymer electrolyte fuel cell shown in FIG. 1 was produced by adhering a packing material (a supporting current collector) 5 of thin carbon paper to each of the electrodes of each membrane-electrodes assembly 4 obtained in Example 16 and composed of a solid polymer electrolyte membrane 1, an oxygen electrode 2 and a hydrogen electrode 3, and providing an electroconductive separator (a bipolar plate) 6 capable of serving as a separator between electrode chambers and passageways for gas supply to the electrodes, on the outer surface of each packing material. The single cells for fuel cells thus obtained were subjected to a long-term deterioration test at a current density of 300 mA/cm$^2$. The results obtained are shown in FIG. 16.

Figure 16:
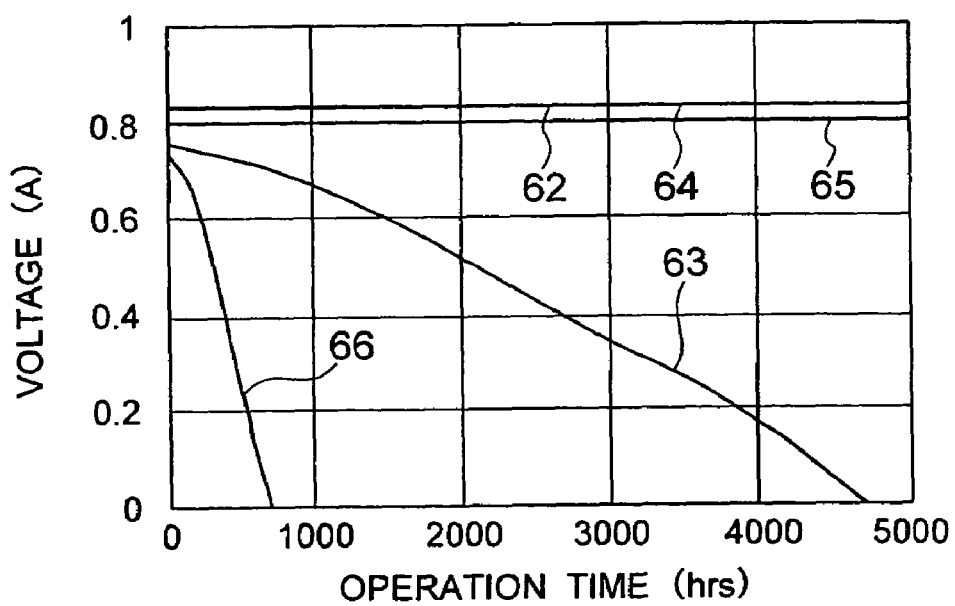
FIG. 16 is a graph showing the results of a durability test on single cells for solid polymer electrolyte fuel cell produced in Example 16.

In FIG. 16, numerals 62, 63 and 64 indicate the results of the durability test on the single cells for fuel cell obtained by using the assemblies XIII, XIII' and XIII", respectively, of the solid polymer electrolyte membrane of the present invention and electrodes.

In FIG. 16, numeral 65 indicates the result of the durability test on a single cell for fuel cell obtained by using the assembly of the perfluorocarbon sulfonic acid (Nafion 117) solid polymer electrolyte membrane and electrodes.

In FIG. 16, numeral 62 indicates the change with time of output voltage of the single cell for fuel cell of Example 16 produced by using a solid polymer electrolyte membrane of a polyether ether sulfone having sulfonic acid groups bonded thereto through alkylene groups and an electrocatalyst-coating solution containing the polyether ether sulfone solid polymer electrolyte having sulfonic acid groups bonded thereto through alkylene groups. Numeral 63 indicates the change with time of output voltage of the single cell for fuel cell produced in Example 16 by using a solid polymer electrolyte membrane of the polyether ether sulfone having sulfonic acid groups bonded thereto through alkylene groups and an electrocatalyst-coating solution containing a polyether ether sulfone solid polymer electrolyte having sulfonic acid groups directly bonded thereto. Numeral 64 indicates the change with time of output voltage of the single cell for fuel cell produced in Example 16 by using a solid polymer electrolyte membrane of the polyether ether sulfone having sulfonic acid groups bonded thereto through alkylene groups and an electrocatalyst-coating solution containing the perfluorocarbon sulfonic acid solid polymer electrolyte (Nafion 117). Numeral 65 indicates the change with time of output voltage of the single cell for fuel cell obtained by using the perfluorocarbon sulfonic acid solid polymer electrolyte membrane (Nafion 117). Numeral 66 indicates the change with time of output voltage of a single cell for fuel cell of Comparative Example 16 produced by using a solid polymer electrolyte membrane of a polyether ether sulfone having sulfonic acid groups directly bonded thereto and an electrocatalyst-coating solution containing the polyether ether sulfone solid polymer electrolyte having sulfonic acid groups directly bonded thereto.

As can be seen from the results indicated by numerals 62 and 64 in FIG. 16, the initial voltage of the single cells obtained by using the assemblies XIII and XIII", respectively, of the solid polymer electrolyte membrane of the present invention and electrodes was 0.83 V, and the single cells had the same voltage as the initial voltage even after 5,000 hours of operation. These results were equal to those obtained by the use of the perfluorocarbon sulfonic acid solid polymer electrolyte membrane (Nafion 117) and indicated by numeral 65 in FIG. 16.

On the other hand, the initial output voltage of the single cell for fuel cell indicated by numeral 66 in FIG. 16 (the single cell for fuel cell of Comparative Example 2 obtained by using the sulfonated aromatic hydrocarbon solid polymer electrolyte X) was 0.73 V, and the output of this single cell was zero after 600 hours of operation.

From this fact, it is clear that the single cell for fuel cell produced by using the aromatic hydrocarbon solid polymer electrolyte obtained by bonding sulfonic acid groups to the aromatic rings of an aromatic hydrocarbon polymer through alkylene groups is superior in durability to the single cell for fuel cell produced by using the aromatic hydrocarbon solid polymer electrolyte having sulfonic acid groups directly bonded thereto.

The single cell for fuel cell obtained by using the membrane-electrodes assembly XIII of the present invention is superior in durability to the single cell for fuel cell obtained by using the membrane-electrodes assembly XIII'. That is, the electrocatalyst-coating solution XIII is more suitable than the electrocatalyst-coating solution X, for coating an electrocatalyst for a membrane-electrodes assembly.

The reason why the output voltage of the single cell for fuel cell of Example 16 is higher than that of the single cell for fuel cell of Comparative Example 2 though the membrane-electrodes assemblies of Example 16 and Comparative Example 2 have the same amount of platinum supported of 0.25 mg/cm$^2$, is that the ion electric conductivity of the solid polymer electrolyte membrane and electrocatalyst-coating solution used in the membrane-electrodes assembly of Example 16 is higher than that of the solid polymer electrolyte membrane and electrocatalyst-coating solution used in the membrane-electrodes assembly of Comparative Example 2.

(6) Production of a Fuel Cell

A solid polymer electrolyte fuel cell was produced by laminating 36 single cells produced in the same manner as in the above item (5) according to the present invention. The fuel cell had an output of 3 kW.

As can be seen from Examples 15, 13, 14 and 16, the values of the ion-exchange group equivalent weight (g/equivalent) of the sulfoalkylated poly(1,4-phenylene ether ether sulfone) solid electrolytes in which the values of n (the number of carbon atoms of the alkylene group) are 1, 3, 4 and 6 are 650, 670, 650 and 660, respectively, which are substantially the same. The values of ionic conductance (S/cm) of the solid polymer electrolyte membranes obtained by using these solid electrolytes are 5, 15, 25 and 40, respectively.

That is, with an increase of the value of n in the sulfoalkylated aromatic hydrocarbon solid electrolytes, the ionic conductance and the proton transportability increase, so that an excellent solid polymer electrolyte fuel cell can be obtained.

On the other hand, from the viewpoint of cost, the sulfopropylated aromatic hydrocarbon solid polymer electrolyte and the sulfobutylated aromatic hydrocarbon solid polymer electrolyte, which can be synthesized by a one-stage reaction with a sultone, are more advantageous than the sulfohexamethylated aromatic hydrocarbon solid polymer electrolyte and the sulfomethylated aromatic hydrocarbon solid polymer electrolyte, which are synthesized by a two-stage reaction.

That is, the value of n is preferably 3 or 4 for reconciling the ionic conductance and the cost.

EXAMPLE 17

(1) Synthesis of a sulfopropylated poly(1,6-naphthalene ether ether sulfone)

The inner atmosphere of a 500-ml four-necked round bottom flask equipped with a stirrer, a thermometer and a reflux condenser having a calcium chloride tube connected thereto was replaced with nitrogen. Then, 6.08 g (0.0155 mol) of a poly(1,5-naphthalene ether ether sulfone) [(—C$_6$H$_4$-4-SO$_2$C$_6$H$_4$-1-OC$_{10}$H$_6$-5-O—)$_n$] dried by its maintenance at 110° C. for 10 hours and 150 ml of dehydrated chloroform were placed in the flask and maintained at 60° C. for about 1 hour to effect dissolution. To the resulting solution was added 5.67 g (0.0464 mol) of propanesultone. Subsequently, 6.19 g (0.0464 mol) of anhydrous aluminum chloride thoroughly ground in a mortar was added thereto with stirring over a period of about 30 minutes. After completion of the addition of anhydrous aluminum chloride, the resulting mixture was refluxed with stirring at 60° C. for 30 hours.

The polymer precipitated was filtered, washed with 150 ml of chloroform and then dried under reduced pressure. The dried polymer was suspended in 250 ml of water and finely ground in a mixer, and the resulting finely ground substance was filtered. This procedure was repeated four times. After thorough washing with water, the water-insoluble finely ground substance thus obtained was dried at 90° C. under reduced pressure.

The dried substance was subjected to $^1$HNMR measurement to find that new peaks due to a —CH$_2$CH$_2$CH$_2$SO$_3$H group were present at 2.2 ppm and 3.8 ppm. This fact confirmed the introduction of sulfopropyl groups.

The sulfonic acid equivalent weight of the sulfopropylated poly(1,6-naphthalene ether ether sulfone) solid polymer electrolyte XIV thus obtained was 770 g/equivalent.

Since the sulfopropylated poly(1,6-naphthalene ether ether sulfone) solid polymer electrolyte XIV can be produced through one step by using the poly(1,6-naphthalene ether ether sulfone), a relatively inexpensive commercial engineering plastic, as a starting material, the cost of production thereof is as low as less than one-fiftieth that of the perfluorocarbon sulfonic acid solid polymer electrolyte (Nafion 117) produced through five steps by using an expensive starting material.

In a Teflon-coated closed container made of SUS, 1.0 g of the obtained sulfopropylated poly(1,6-naphthalene ether ether sulfone) solid polymer electrolyte XIV and 20 ml of ion-exchanged water were maintained at 120° C. for 2 weeks. After cooling and thorough washing with water, the ion-exchange group equivalent weight of the sulfopropylated poly(1,6-naphthalene ether ether sulfone) solid polymer electrolyte XIV was measured. As a result, it was found that the ion-exchange group equivalent weight of the sulfopropylated poly(1,6-naphthalene ether ether sulfone) solid polymer electrolyte XIV was 770 g/equivalent, the same value as the initial value, namely, the solid polymer electrolyte XIV was stable like the perfluorocarbon sulfonic acid solid polymer electrolyte (Nafion 117).

On the other hand, as described hereinafter in Comparative Example 3, (1), the ion-exchange group equivalent weight of an inexpensive sulfonated poly(1,6-naphthalene ether ether sulfone) solid polymer electrolyte XV was increased to 1,300 g/equivalent from its initial value of 760 g/equivalent under the same conditions of hydrolysis by heating as above, namely, sulfonic acid groups were released from the solid polymer electrolyte XV.

Thus, unlike the inexpensive sulfonated poly(1,6-naphthalene ether ether sulfone) solid polymer electrolyte XV described hereinafter in Comparative Example 3, (1), the inexpensive sulfopropylated poly(1,6-naphthalene ether ether sulfone) solid polymer electrolyte XIV was stable like the perfluorocarbon sulfonic acid solid polymer electrolyte (Nafion 117) and was excellent in both cost and resistance to hydrolysis (durability).

(2) Formation of a Solid Polymer Electrolyte Membrane

The product obtained in the above item (1) was dissolved in a N,N-dimethylformamide-cyclohexanone-methyl ethyl ketone mixed solvent (volume ratio; 20:80:25) to a concentration of 5 wt %. The resulting solution was spread on a glass plate by spin coating, air-dried and then dried in vacuo at 80° C. to form a solid polymer electrolyte membrane XIV of 25 μm in thickness. The ion electric conductivity of the obtained solid polymer electrolyte membrane XIV was 15 S/cm.

In a Teflon-coated closed container made of SUS, the aforesaid solid polymer electrolyte membrane XIV obtained and 20 ml of ion-exchanged water were maintained at 120° C. for 2 weeks. After the maintenance, the ion electric conductivity of the solid polymer electrolyte membrane XIV was the same as its initial value like that of the perfluorocarbon sulfonic acid solid polymer electrolyte membrane (Nafion 117), and the solid polymer electrolyte membrane XIV was firm.

On the other hand, as described hereinafter in Comparative Example 3, (2), the relatively inexpensive sulfonated aromatic hydrocarbon solid polymer electrolyte membrane XV was broken to tatters under the same conditions of hydrolysis by heating as above.

Thus, unlike the inexpensive sulfonated poly(1,6-naphthalene ether ether sulfone) solid polymer electrolyte membrane XV described hereinafter in Comparative Example 3, (2), the inexpensive sulfopropylated poly(1,6-naphthalene ether ether sulfone) solid polymer electrolyte membrane XIV was stable like the perfluorocarbon sulfonic acid solid polymer electrolyte membrane (Nafion 117) and was excellent in both cost and resistance to hydrolysis (durability).

(3) Production of Electrocatalyst-coating Solutions and Membrane-electrodes Assemblies The same solution as in the above item (2), i.e., a 5 wt % solution of the solid polymer electrolyte XIV in the N,N-dimethylformamide-cyclohexanone-methyl ethyl ketone mixed solvent was added to platinum-supporting carbon (content of platinum supported: 40 wt %), so that the weight ratio of platinum catalyst to the solid polymer electrolyte might be 2:1. The platinum-supporting carbon was uniformly dispersed in the solution to prepare a paste (an electrocatalyst-coating solution XIV).

In a Teflon-coated closed container made of SUS, 1.0 g of the aforesaid electrocatalyst-coating solution XIV and 20 ml of ion-exchanged water were maintained at 120° C. for 2 weeks. After cooling, the solvent was vaporized and the resulting solid was washed with water. Then, the ion-exchange group equivalent weight of the electrocatalyst-coating solution XIV after the maintenance was measured.

As a result, it was found that the ion-exchange group equivalent weight of the electrocatalyst-coating solution XIV was 760 g/equivalent, the same value as the initial value, namely, the electrocatalyst-coating solution XIV was stable like the perfluorocarbon sulfonic acid (Nafion 117) electrocatalyst-coating solution.

On the other hand, as described hereinafter in Comparative Example 3, (2), the ion-exchange group equivalent weight of the electrocatalyst-coating solution XV was increased to 1,300 g/equivalent from its initial value of 760 g/equivalent under the same conditions of hydrolysis by heating as above, namely, sulfonic acid groups were released.

Thus, unlike the inexpensive electrocatalyst-coating solution XV described in Comparative Example 3, (2), the inexpensive electrocatalyst-coating solution XIV was stable like the perfluorocarbon sulfonic acid (Nafion 117) electrocatalyst-coating solution and was excellent in both cost and resistance to hydrolysis (durability).

The aforesaid electrocatalyst-coating solution XIV was applied on both sides of the solid polymer electrolyte membrane XIV obtained in the above item (2), and was dried to produce a membrane-electrodes assembly XIV having an amount of platinum supported of 0.25 mg/cm$^2$.

The electrocatalyst-coating solution XV described hereinafter in Comparative Example 3, (2) was applied on both sides of the same solid polymer electrolyte membrane XIV as that obtained in the above item (2), and was dried to produce a membrane-electrodes assembly XIV' having an amount of platinum supported of 0.25 mg/cm$^2$.

A 5 wt % solution of the perfluorocarbon sulfonic acid solid polymer electrolyte in an alcohol-water mixed solvent was added to platinum-supporting carbon (content of platinum supported: 40 wt %), so that the weight ratio of platinum catalyst to the solid polymer electrolyte might be 2:1. The platinum-supporting carbon was uniformly dispersed in the solution to prepare a paste (an electrocatalyst-coating solution). This electrocatalyst-coating solution was applied on both sides of the same solid polymer electrolyte membrane XIV as that obtained in the above item (2), and was dried to produce a membrane-electrodes assembly XIV''' having an amount of platinum supported of 0.25 mg/cm$^2$.

In a Teflon-coated closed container made of SUS, the aforesaid membrane-electrodes assembly XIV obtained and 20 ml of ion-exchanged water were maintained at 120° C. for 2 weeks. After the maintenance, the membrane-electrodes assembly XIV was not different from that before the maintenance like a membrane-electrodes assembly produced by using the perfluorocarbon sulfonic acid solid polymer electrolyte membrane (Nafion 117) and the perfluorocarbon sulfonic acid solid polymer electrolyte (Nafion 117), and its membrane was firm.

In a Teflon-coated closed container made of SUS, the aforesaid membrane-electrodes assembly XIV' obtained and 20 ml of ion-exchanged water were maintained at 120° C. for 2 weeks. In the membrane-electrodes assembly XIV' after the maintenance, the electrodes were peeling a little but the membrane was firm. The assembly XIV' after the maintenance had power-generating capability.

In a Teflon-coated closed container made of SUS, the aforesaid membrane-electrodes assembly XIV''' obtained and 20 ml of ion-exchanged water were maintained at 120° C. for 2 weeks. In the membrane-electrodes assembly XIV''' after the maintenance, the electrodes were peeling a little but the membrane was firm. The assembly XIV''' after the maintenance had power-generating capability.

On the other hand, as described hereinafter in Comparative Example 3, (3), the membrane of a membrane-electrodes assembly XV produced by using the relatively inexpensive sulfonated aromatic hydrocarbon solid polymer electrolyte membrane XV and the electrocatalyst-coating solution XV was broken to tatters and the electrodes of the assembly were peeled, under the same conditions of hydrolysis by heating as above.

Thus, unlike the inexpensive membrane-electrodes assembly XV described hereinafter in Comparative Example 3, (3), i.e., the assembly of the sulfonated aromatic hydrocarbon solid polymer electrolyte membrane and electrodes, the inexpensive assembly XIV of the sulfopropylated poly(1,6-naphthalene ether ether sulfone) solid polymer electrolyte membrane and electrodes was stable like the assembly of the perfluorocarbon sulfonic acid (Nafion 117) membrane and electrodes, and was excellent in both cost and resistance to hydrolysis (durability).

(4) Durability Test on Single Cells for Fuel Cell

The above-mentioned membrane-electrodes assemblies XIV, XIV' and XIV" were allowed to absorb water by immersion in boiling deionized water for 2 hours. Each of the thus treated membrane-electrodes assemblies was incorporated into a cell for evaluation and the output capability of the resulting single cell for fuel cell was evaluated.

In detail, the single cell for solid polymer electrolyte fuel cell shown in FIG. 1 was produced by adhering a packing material (a supporting current collector) 5 of thin carbon paper to each of the electrodes of each membrane-electrodes assembly 4 obtained in Example 17 and composed of a solid polymer electrolyte membrane 1, an oxygen electrode 2 and a hydrogen electrode 3, and providing an electroconductive separator (a bipolar plate) 6 capable of serving as a separator between electrode chambers and passageways for gas supply to the electrodes, on the outer surface of each packing material. The single cells for fuel cells thus obtained were subjected to a long-term deterioration test at a current density of 300 mA/cm². The results obtained are shown in FIG. 17.

Figure 17:
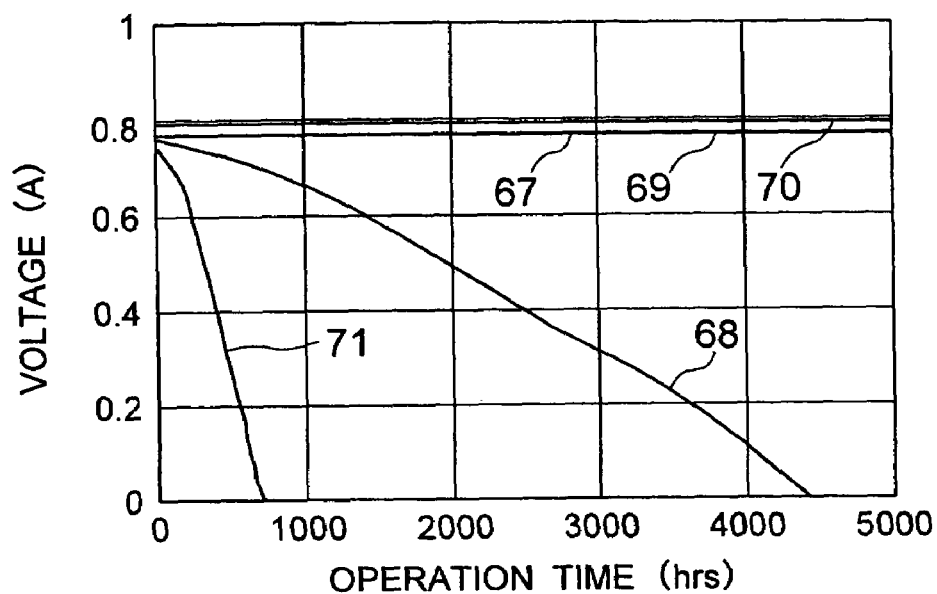
FIG. 17 is a graph showing the results of a durability test on single cells for solid polymer electrolyte fuel cell produced in Example 17.

In FIG. 17, numerals 67, 68 and 69 indicate the results of the durability test on the single cells for fuel cell obtained by using the assemblies XIV, XIV' and XIV", respectively, of the solid polymer electrolyte membrane of the present invention and electrodes.

In FIG. 17, numeral 70 indicates the result of the durability test on a single cell for fuel cell obtained by using the assembly of the perfluorocarbon sulfonic acid (Nafion 117) solid polymer electrolyte membrane and electrodes.

In FIG. 17, numeral 67 indicates the change with time of output voltage of the single cell for fuel cell of Example 17 produced by using a solid polymer electrolyte membrane of a polyether ether sulfone having sulfonic acid groups bonded thereto through alkylene groups and an electrocatalyst-coating solution containing the polyether ether sulfone solid polymer electrolyte having sulfonic acid groups bonded thereto through alkylene groups. Numeral 68 indicates the change with time of output voltage of the single cell for fuel cell produced in Example 17 by using a solid polymer electrolyte membrane of the polyether ether sulfone having sulfonic acid groups bonded thereto through alkylene groups and an electrocatalyst-coating solution containing a polyether ether sulfone solid polymer electrolyte having sulfonic acid groups directly bonded thereto. Numeral 69 indicates the change with time of output voltage of the single cell for fuel cell produced in Example 17 by using a solid polymer electrolyte membrane of the polyether ether sulfone having sulfonic acid groups bonded thereto through alkylene groups and an electrocatalyst-coating solution containing the perfluorocarbon sulfonic acid solid polymer electrolyte (Nafion 117). Numeral 70 indicates the change with time of output voltage of the single cell for fuel cell obtained by using the perfluorocarbon sulfonic acid solid polymer electrolyte membrane (Nafion 117). Numeral 71 indicates the change with time of output voltage of a single cell for fuel cell of Comparative Example 17 produced by using a solid polymer electrolyte membrane of a polyether ether sulfone having sulfonic acid groups directly bonded thereto and an electrocatalyst-coating solution containing the polyether ether sulfone solid polymer electrolyte having sulfonic acid groups directly bonded thereto.

As can be seen from the results indicated by numerals 67 and 69 in FIG. 17, the initial voltage of the single cells obtained by using the assemblies XIV and XIV" respectively, of the solid polymer electrolyte membrane of the present invention and electrodes was 0.76 V, and the single cells had the same voltage as the initial voltage even after 5,000 hours of operation. These results were equal to those obtained by the use of the perfluorocarbon sulfonic acid solid polymer electrolyte membrane (Nafion 117) and indicated by numeral 70 in FIG. 17.

On the other hand, the initial output voltage of the single cell for fuel cell indicated by numeral 71 in FIG. 17 (the single cell for fuel cell obtained by using the sulfonated aromatic hydrocarbon solid polymer electrolyte XV which is described hereinafter in Comparative Example 3) was 0.73 V, and the output of this single cell was zero after 600 hours of operation.

From this fact, it is clear that the single cell for fuel cell produced by using the aromatic hydrocarbon solid polymer electrolyte obtained by bonding sulfonic acid groups to the aromatic rings of an aromatic hydrocarbon polymer through alkylene groups is superior in durability to the single cell for fuel cell produced by using the aromatic hydrocarbon solid polymer electrolyte having sulfonic acid groups directly bonded thereto.

The single cell for fuel cell obtained by using the membrane-electrodes assembly XIV is superior in durability to the single cell for fuel cell obtained by using the membrane-electrodes assembly XIV'. That is, the electrocatalyst-coating solution XIV is more suitable than the electrocatalyst-coating solution XV, for coating an electrocatalyst for a membrane-electrodes assembly.

The reason why the output voltage of the single cell for fuel cell of Example 17 is higher than that of the single cell for fuel cell of Comparative Example 3 though the membrane-electrodes assemblies of Example 17 and Comparative Example 3 have the same amount of platinum supported of 0.25 mg/cm², is that the ion electric conductivity of the solid polymer electrolyte membrane and electrocatalyst-coating solution used in the membrane-electrodes assembly of Example 17 is higher than that of the solid polymer electrolyte membrane and electrocatalyst-coating solution used in the membrane-electrodes assembly of Comparative Example 3.

(5) Production of a Fuel Cell

A solid polymer electrolyte fuel cell was produced by laminating 36 single cells produced in the same manner as in the above item (4) according to the present invention. The fuel cell had an output of 3 kW.

COMPATATIVE EXAMPLE 3

(1) Synthesis of a sulfonated poly(1,6-naphthalene ether ether sulfone)

The inner atmosphere of a 500-ml four-necked round bottom flask equipped with a stirrer, a thermometer and a reflux condenser having a calcium chloride tube connected thereto was replaced with nitrogen. Then, 3.22 g (0.0103 mol) of a poly(1,6-naphthalene ether ether sulfone) [(—$C_6H_4$-4-$SO_2C_6H_4$-1-$OC_{10}H_6$-5-O—)$_n$] dried by its maintenance at 110° C. for 10 hours and 100 ml of chloroform were placed in the flask and maintained at 60° C. for about 1 hour to effect dissolution. To the resulting solution was added a solution of 1.165 g (0.01 mol) of chlorosulfonic acid in 50 ml of 1,1,2,2-tetrachloroethane over a period of about 10 minutes.

Subsequently, the resulting mixture was stirred at 60° C. for 4 hours, and the precipitate was filtered and then washed with 150 ml of chloroform. The washed precipitate was dissolved in 250 ml of methanol at 60° C. The resulting solution was dried at 60° C. under reduced pressure. The polymer thus obtained was finely ground in a mixer together with 250 ml of water, and the resulting mixture was filtered. This procedure was repeated three times.

The water-insoluble fine powder thus obtained was dried over phosphorus pentaoxide at 90° C. under reduced pressure. This fine powder was insoluble in water and soluble in methanol.

The dried fine powder was subjected to $^1$HNMR measurement to find that absorptions at 7.3 to 8.0 ppm due to the hydrogen atoms of the naphthalene rings and benzene rings in the starting poly(1,6-naphthalene ether ether sulfone) had been decreased, and that a new absorption due to the hydrogen atom of a phenyl group adjacent to a $SO_3H$ group was present at 8.3 ppm. This fact confirmed the introduction of sulfonic acid groups. The sulfonic acid equivalent weight of the sulfonated poly(1,6-naphthalene ether ether sulfone) solid polymer electrolyte XV thus obtained was 760 g/equivalent.

In a Teflon-coated closed container made of SUS, 1.0 g of the aforesaid sulfonated poly(1,6-naphthalene ether ether sulfone) solid polymer electrolyte XV obtained and 20 ml of ion-exchanged water were maintained at 120° C. for 2 weeks. After cooling and thorough washing with water, the ion-exchange group equivalent weight of the sulfonated poly(1,6-naphthalene ether ether sulfone) solid polymer electrolyte XV was measured. As a result, it was found that the sulfonic acid equivalent weight of the sulfonated poly(1,6-naphthalene ether ether sulfone) solid polymer electrolyte XV had been increased to 1,300 g/equivalent from its initial value of 760 g/equivalent, namely, sulfonic acid groups had been released from the solid polymer electrolyte XV.

(2) Formation of a Solid Polymer Electrolyte Membrane

The sulfonated poly(1,6-naphthalene ether ether sulfone) solid polymer electrolyte XV obtained in the above item (1) was dissolved in a N,N-dimethylformamide-cyclohexanone-methyl ethyl ketone mixed solvent (volume ratio; 20:80:25) to a concentration of 5 wt %. The resulting solution was spread on a glass plate by spin coating, air-dried and then dried in vacuo at 80° C. to form a solid polymer electrolyte membrane XV of 45 μm in thickness. The ion electric conductivity of the obtained solid polymer electrolyte membrane XV was 8 S/cm.

In a Teflon-coated closed container made of SUS, the aforesaid solid polymer electrolyte membrane XV obtained and 20 ml of ion-exchanged water were maintained at 120° C. for 2 weeks. As a result, the solid polymer electrolyte membrane XV was broken to tatters.

(3) Production of an Electrocatalyst-coating Solution and a Membrane-electrodes Assembly The same solution as in the above item (2), i.e., a 5 wt % solution of the solid polymer electrolyte XV in the N,N-dimethylformamide-cyclohexanone-methyl ethyl ketone mixed solvent was added to platinum-supporting carbon (content of platinum supported: 40 wt %), so that the weight ratio of platinum catalyst to the solid polymer electrolyte might be 2:1. The platinum-supporting carbon was uniformly dispersed in the solution to prepare a paste (an electrocatalyst-coating solution XV).

In a Teflon-coated closed container made of SUS, 1.0 g of the aforesaid electrocatalyst-coating solution XV and 20 ml of ion-exchanged water were maintained at 120° C. for 2 weeks. After cooling, the solvent was vaporized and the resulting solid was washed with water. Then, the ion-exchange group equivalent weight of the electrocatalyst-coating solution XV after the maintenance was measured. As a result, it was found that the ion-exchange group equivalent weight of the electrocatalyst-coating solution XV had been increased to 1,300 g/equivalent from its initial value of 760 g/equivalent, namely, sulfonic acid groups had been released.

The aforesaid electrocatalyst-coating solution XV was applied on both sides of the solid polymer electrolyte membrane XV obtained in the above item (2), and was dried to produce a membrane-electrodes assembly XV having an amount of platinum supported of 0.25 mg/cm$^2$.

In a Teflon-coated closed container made of SUS, the aforesaid membrane-electrodes assembly XV obtained and 20 ml of ion-exchanged water were maintained at 120° C. for 2 weeks. As a result, the membrane of the membrane-electrodes assembly XV was broken to tatters and its electrodes were peeled.

(4) Durability Test on a Single Cell for Fuel Cell

A single cell for solid polymer electrolyte fuel cell was produced by adhering a packing material (a supporting current collector) of thin carbon paper to each side of the membrane-electrodes assembly XV of Comparative Example 3, and providing an electroconductive separator (a bipolar plate) capable of serving as a separator between electrode chambers and passageways for gas supply to the electrodes, on the outer surface of each packing material. The single cell was subjected to a long-term operation test at a current density of 300 mA/cm$^2$. As a result, it was found that as indicated by numeral 71 in FIG. 17, the initial output voltage of the single cell was 0.73 V and that the output voltage of the single cell was zero after 600 hours of operation.

EXAMPLE 18

(1) Synthesis of a sulfobutylated poly(1,6-naphthalene ether ether sulfone)

The inner atmosphere of a 500-ml four-necked round bottom flask equipped with a stirrer, a thermometer and a reflux condenser having a calcium chloride tube connected thereto was replaced with nitrogen. Then, 6.08 g (0.0155 mol) of a poly(1,5-naphthalene ether ether sulfone) [(—$C_6H_4$-4-$SO_2C_6H_4$-1-$OC_{10}H_6$-5-O—)$_n$] dried by its maintenance at 110° C. for 10 hours and 150 ml of dehydrated chloroform were placed in the flask and maintained at 60° C. for about 1 hour to effect dissolution. To the resulting solution was added 6.26 g (0.0464 mol) of butanesultone.

Subsequently, 6.19 g (0.0464 mol) of anhydrous aluminum chloride thoroughly ground in a mortar was added thereto with stirring over a period of about 30 minutes. After completion of the addition of anhydrous aluminum chloride, the resulting mixture was refluxed with stirring at 60° C. for 30 hours. The polymer precipitated was filtered, washed with 150 ml of chloroform and then dried under reduced pressure. The dried polymer was suspended in 250 ml of water and finely ground in a mixer, and the resulting finely ground substance was filtered. This procedure was repeated four times. After thorough washing with water, the water-insoluble finely ground substance thus obtained was dried at 90° C. under reduced pressure.

The dried substance was subjected to $^1$HNMR measurement to find that new peaks due to a —$CH_2CH_2CH_2CH_2SO_3H$ group were present at 2.2 ppm and 3.8 ppm. This fact confirmed the introduction of sulfobutyl groups. The sulfonic acid equivalent weight of the sulfobutylated poly(1,6-naphthalene ether ether sulfone) solid polymer electrolyte XVI thus obtained was 770 g/equivalent.

Since the sulfobutylated poly(1,6-naphthalene ether ether sulfone) solid polymer electrolyte XVI can be produced through one step by using the poly(1,6-naphthalene ether ether sulfone), a relatively inexpensive commercial engineering plastic, as a starting material, the cost of production thereof is as low as less than one-fiftieth that of the perfluorocarbon sulfonic acid solid polymer electrolyte (Nafion 117) produced through five steps by using an expensive starting material.

In a Teflon-coated closed container made of SUS, 1.0 g of the obtained sulfobutylated poly(1,6-naphthalene ether ether sulfone) solid polymer electrolyte XVI and 20 ml of ion-exchanged water were maintained at 120° C. for 2 weeks. After cooling and thorough washing with water, the ion-exchange group equivalent weight of the sulfobutylated poly (1,6-naphthalene ether ether sulfone) solid polymer electrolyte XVI was measured.

As a result, it was found that the ion-exchange group equivalent weight of the sulfobutylated poly(1,6-naphthalene ether ether sulfone) solid polymer electrolyte XVI was 750 g/equivalent, the same value as the initial value, namely, the solid polymer electrolyte XVI was stable like the perfluorocarbon sulfonic acid solid polymer electrolyte (Nafion 117).

On the other hand, as described in Comparative Example 3, (1), the ion-exchange group equivalent weight of the inexpensive sulfonated poly(1,6-naphthalene ether ether sulfone) solid polymer electrolyte XV was increased to 1,300 g/equivalent from its initial value of 760 g/equivalent under the same conditions of hydrolysis by heating as above, namely, sulfonic acid groups were released from the solid polymer electrolyte XV.

Thus, unlike the inexpensive sulfonated poly(1,6-naphthalene ether ether sulfone) solid polymer electrolyte XV described in Comparative Example 3, (1), the inexpensive sulfobutylated poly(1,6-naphthalene ether ether sulfone) solid polymer electrolyte XVI was stable like the perfluorocarbon sulfonic acid solid polymer electrolyte (Nafion 117) and was excellent in both cost and resistance to hydrolysis (durability).

(2) Formation of a Solid Polymer Electrolyte Membrane

The product obtained in the above item (1) was dissolved in a N,N-dimethylformamide-cyclohexanone-methyl ethyl ketone mixed solvent (volume ratio; 20:80:25) to a concentration of 5 wt %. The resulting solution was spread on a glass plate by spin coating, air-dried and then dried in vacuo at 80° C. to form a solid polymer electrolyte membrane XVI of 25 μm in thickness. The ion electric conductivity of the obtained solid polymer electrolyte membrane XVI was 25 S/cm.

In a Teflon-coated closed container made of SUS, the aforesaid solid polymer electrolyte membrane XVI and 20 ml of ion-exchanged water were maintained at 120° C. for 2 weeks. After the maintenance, the ion electric conductivity of the solid polymer electrolyte membrane XVI was the same as its initial value like that of the perfluorocarbon sulfonic acid solid polymer electrolyte membrane (Nafion 117), and the solid polymer electrolyte membrane XVI was firm.

On the other hand, as described in Comparative Example 3, (2), the relatively inexpensive sulfonated aromatic hydrocarbon solid polymer electrolyte membrane XV was broken to tatters under the same conditions of hydrolysis by heating as above. Thus, unlike the inexpensive sulfonated poly(1,6-naphthalene ether ether sulfone) solid polymer electrolyte membrane XV described in Comparative Example 3, (2), the inexpensive sulfobutylated poly(1,6-naphthalene ether ether sulfone) solid polymer electrolyte membrane XVI was stable like the perfluorocarbon sulfonic acid solid polymer electrolyte membrane (Nafion 117) and was excellent in both cost and resistance to hydrolysis (durability).

(3) Production of Electrocatalyst-coating Solutions and Membrane-electrodes Assemblies The same solution as in the above item (2), i.e., a 5 wt % solution of the solid polymer electrolyte XVI in the N,N-dimethylformamide-cyclohexanone-methyl ethyl ketone mixed solvent was added to platinum-supporting carbon (content of platinum supported: 40 wt %), so that the weight ratio of platinum catalyst to the solid polymer electrolyte might be 2:1. The platinum-supporting carbon was uniformly dispersed in the solution to prepare a paste (an electrocatalyst-coating solution XVI).

In a Teflon-coated closed container made of SUS, 1.0 g of the aforesaid electrocatalyst-coating solution XVI and 20 ml of ion-exchanged water were maintained at 120° C. for 2 weeks. After cooling, the solvent was vaporized and the resulting solid was washed with water. Then, the ion-exchange group equivalent weight of the electrocatalyst-coating solution XVI after the maintenance was measured.

As a result, it was found that the ion-exchange group equivalent weight of the electrocatalyst-coating solution XVI was 750 g/equivalent, the same value as the initial value, namely, the solution XVI was stable like the perfluorocarbon sulfonic acid (Nafion 117) electrocatalyst-coating solution.

On the other hand, as described in Comparative Example 3, (2), the ion-exchange group equivalent weight of the electrocatalyst-coating solution XV was increased to 1,300 g/equivalent from its initial value of 760 g/equivalent under the same conditions of hydrolysis by heating as above, namely, sulfonic acid groups were released.

Thus, unlike the inexpensive electrocatalyst-coating solution XV described in Comparative Example 3, (2), the inexpensive electrocatalyst-coating solution XVI was stable like the perfluorocarbon sulfonic acid (Nafion 117) electrocatalyst-coating solution and was excellent in both cost and resistance to hydrolysis (durability).

The aforesaid electrocatalyst-coating solution XVI was applied on both sides of the solid polymer electrolyte membrane XVI obtained in the above item (2), and was dried to produce a membrane-electrodes assembly XVI having an amount of platinum supported of 0.25 mg/cm$^2$.

The electrocatalyst-coating solution XV described in Comparative Example 3, (2) was applied on both sides of the same solid polymer electrolyte membrane XVI as that obtained in the above item (2), and was dried to produce a membrane-electrodes assembly XVI' having an amount of platinum supported of 0.25 mg/cm$^2$.

A 5 wt % solution of the perfluorocarbon sulfonic acid solid polymer electrolyte in an alcohol-water mixed solvent was added to platinum-supporting carbon (content of platinum supported: 40 wt %), so that the weight ratio of platinum catalyst to the solid polymer electrolyte might be 2:1. The platinum-supporting carbon was uniformly dispersed in the solution to prepare a paste (an electrocatalyst-coating solution). This electrocatalyst-coating solution was applied on both sides of the same solid polymer electrolyte membrane XVI as that obtained in the above item (2), and was dried to produce a membrane-electrodes assembly XVI'' having an amount of platinum supported of 0.25 mg/cm$^2$.

In a Teflon-coated closed container made of SUS, the aforesaid membrane-electrodes assembly XVI obtained and 20 ml of ion-exchanged water were maintained at 120° C. for 2 weeks. After the maintenance, the membrane-electrodes assembly XVI was not different from that before the maintenance like a membrane-electrodes assembly produced at a high cost by using the perfluorocarbon sulfonic acid solid polymer electrolyte membrane (Nafion 117) and the perfluorocarbon sulfonic acid solid polymer electrolyte (Nafion 117), and its membrane was firm.

In a Teflon-coated closed container made of SUS, the aforesaid membrane-electrodes assembly XVI' obtained and 20 ml of ion-exchanged water were maintained at 120° C. for 2 weeks. In the membrane-electrodes assembly XVI' after the maintenance, the electrodes were peeling a little but the membrane was firm. The assembly XVI' after the maintenance had power-generating capability.

In a Teflon-coated closed container made of SUS, the aforesaid membrane-electrodes assembly XVI'' and 20 ml of ion-exchanged water were maintained at 120° C. for 2 weeks. In the membrane-electrodes assembly XVI'' after the maintenance, the electrodes were peeling a little but the membrane was firm. The assembly XVI'' after the maintenance had power-generating capability.

On the other hand, as described in Comparative Example 3, (3), the membrane of the membrane-electrodes assembly XV produced by using the relatively inexpensive sulfonated aromatic hydrocarbon solid polymer electrolyte membrane XV and the electrocatalyst-coating solution XV was broken to tatters and the electrodes of the assembly were peeled, under the same conditions of hydrolysis by heating as above.

Thus, unlike the inexpensive membrane-electrodes assembly XV described in Comparative Example 3, (3), i.e., the assembly of the sulfonated aromatic hydrocarbon solid polymer electrolyte membrane and electrodes, the inexpensive assembly XVI of the sulfobutylated poly(1,6-naphthalene ether ether sulfone) solid polymer electrolyte membrane and electrodes was stable like the assembly of the perfluorocarbon sulfonic acid (Nafion 117) membrane and electrodes, and was excellent in both cost and resistance to hydrolysis (durability).

(4) Durability Test on Single Cells for Fuel Cell

The above-mentioned membrane-electrodes assemblies XVI, XVI' and XVI'' were allowed to absorb water by immersion in boiling deionized water for 2 hours. Each of the thus treated membrane-electrodes assemblies was incorporated into a cell for evaluation and the output capability of the resulting single cell for fuel cell was evaluated.

In detail, the single cell for solid polymer electrolyte fuel cell shown in FIG. 1 was produced by adhering a packing material (a supporting current collector) 5 of thin carbon paper to each of the electrodes of each membrane-electrodes assembly 4 obtained in Example 18 and composed of a solid polymer electrolyte membrane 1, an oxygen electrode 2 and a hydrogen electrode 3, and providing an electroconductive separator (a bipolar plate) 6 capable of serving as a separator between electrode chambers and passageways for gas supply to the electrodes, on the outer surface of each packing material. The single cells for fuel cells thus obtained were subjected to a long-term deterioration test at a current density of 300 mA/cm$^2$. The results obtained are shown in FIG. 18.

Figure 18:
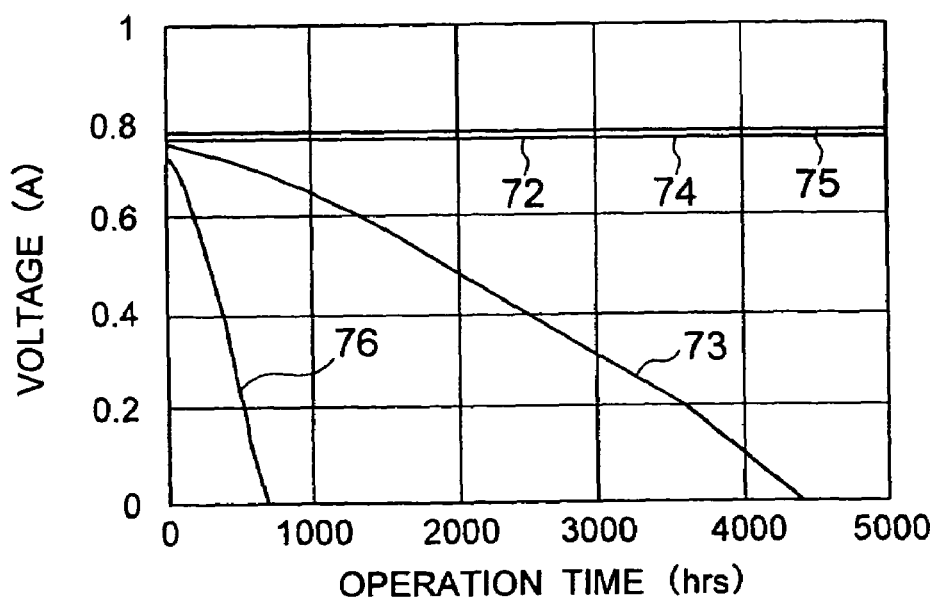
FIG. 18 is a graph showing the results of a durability test on single cells for solid polymer electrolyte fuel cell produced in Example 18.

In FIG. 18, numerals 72, 73 and 74 indicate the results of the durability test on the single cells for fuel cell obtained by using the assemblies XVI, XVI' and XVI'', respectively, of the solid polymer electrolyte membrane of the present invention and electrodes. In FIG. 18, numeral 75 indicates the result of the durability test on a single cell for fuel cell obtained by using the assembly of the perfluorocarbon sulfonic acid (Nafion 117) solid polymer electrolyte membrane and electrodes.

In FIG. 18, numeral 72 indicates the change with time of output voltage of the single cell for fuel cell of Example 18 produced by using a solid polymer electrolyte membrane of a polyether ether sulfone having sulfonic acid groups bonded thereto through alkylene groups and an electrocatalyst-coating solution containing the polyether ether sulfone solid polymer electrolyte having sulfonic acid groups bonded thereto through alkylene groups. Numeral 73 indicates the change with time of output voltage of the single cell for fuel cell produced in Example 18 by using a solid polymer electrolyte membrane of the polyether ether sulfone having sulfonic acid groups bonded thereto through alkylene groups and an electrocatalyst-coating solution containing a polyether ether sulfone solid polymer electrolyte having sulfonic acid groups directly bonded thereto. Numeral 74 indicates the change with time of output voltage of the single cell for fuel cell produced in Example 18 by using a solid polymer electrolyte membrane of the polyether ether sulfone having sulfonic acid groups bonded thereto through alkylene groups and an electrocatalyst-coating solution containing the perfluorocarbon sulfonic acid solid polymer electrolyte (Nafion 117). Numeral 75 indicates the change with time of output voltage of the single cell for fuel cell obtained by using the perfluorocarbon sulfonic acid solid polymer electrolyte membrane (Nafion 117). Numeral 76 indicates the change with time of output voltage of a single cell for fuel cell of Comparative Example 18 produced by using a solid polymer electrolyte membrane of a polyether ether sulfone having sulfonic acid groups directly bonded thereto and an electrocatalyst-coating solution containing the polyether ether sulfone solid polymer electrolyte having sulfonic acid groups directly bonded thereto.

As can be seen from the results indicated by numerals 72 and 74 in FIG. 18, the initial voltage of the single cells obtained by using the assemblies XVI and XVI'', respectively, of the solid polymer electrolyte membrane and electrodes was 0.79 V, and the single cells had the same voltage as the initial voltage even after 5,000 hours of operation. These results were equal to those obtained by the use of the perfluorocarbon sulfonic acid solid polymer electrolyte membrane (Nafion 117) and indicated by numeral 75 in FIG. 18.

On the other hand, the initial output voltage of the single cell for fuel cell indicated by numeral 76 in FIG. 18 (the single cell for fuel cell of Comparative Example 3 obtained by using the sulfonated aromatic hydrocarbon solid polymer electrolyte XV) was 0.73 V, and the output of this single cell was zero after 600 hours of operation.

From this fact, it is clear that the single cell for fuel cell produced by using the aromatic hydrocarbon solid polymer electrolyte obtained by bonding sulfonic acid groups to the aromatic rings of an aromatic hydrocarbon polymer through alkylene groups is superior in durability to the single cell for fuel cell produced by using the aromatic hydrocarbon solid polymer electrolyte having sulfonic acid groups directly bonded thereto.

The single cell for fuel cell obtained by using the membrane-electrodes assembly XVI of the present invention is superior in durability to the single cell for fuel cell obtained by using the membrane-electrodes assembly XVI'. That is, the electrocatalyst-coating solution XVI is more suitable than the electrocatalyst-coating solution XV, for coating an electrocatalyst for a membrane-electrodes assembly.

The reason why the output voltage of the single cell for fuel cell of Example 18 is higher than that of the single cell for fuel cell of Comparative Example 3 though the membrane-electrodes assemblies of Example 18 and Comparative Example 3 have the same amount of platinum supported of 0.25 mg/cm$^2$, is that the ion electric conductivity of the solid polymer electrolyte membrane and electrocatalyst-coating solution used in the membrane-electrodes assembly of Example 18 is higher than that of the solid polymer electrolyte membrane and electrocatalyst-coating solution used in the membrane-electrodes assembly of Comparative Example 3.

(5) Production of a Fuel Cell

A solid polymer electrolyte fuel cell was produced by laminating 36 single cells produced in the same manner as in the above item (4) according to the present invention. The fuel cell had an output of 3 kW.

As can be seen from Examples 3 and 4, the initial output voltage of a single cell for fuel cell obtained by using a sulfoalkylated polyether ether sulfone solid electrolyte having a sulfonic acid equivalent weight of 530 to 970 g/equivalent is equal to or higher than the output voltage of a single cell for fuel cell obtained by using the perfluorocarbon sulfonic acid (Nafion 117) membrane. The former single cell for fuel cell is especially preferable because it is not deteriorated even when operated for 5,000 hours.

As can be seen from the items (1) and (2) in Examples 11, 9, 10 and 12, the values of the ion-exchange group equivalent weight (g/equivalent) of the sulfoalkylated poly(1,4-biphenylene ether ether sulfone) solid electrolytes of the formula [3] in which the values of n (the number of carbon atoms of the alkylene group) are 1, 3, 4 and 6 are 660, 680, 670 and 670, respectively, which are substantially the same. The values of ionic conductance (S/cm) of the solid polymer electrolyte membranes obtained by using these solid electrolytes are 7, 15, 25 and 35, respectively.

As can be seen from Examples 15, 13, 14 and 16, the values of the ion-exchange group equivalent weight (g/equivalent) of the sulfoalkylated poly(1,4-phenylene ether ether sulfone) solid electrolytes in which the values of n (the number of carbon atoms of the alkylene group) are 1, 3, 4 and 6 are 650, 670, 650 and 660, respectively, which are substantially the same. The values of ionic conductance (S/cm) of the solid polymer electrolyte membranes obtained by using these solid electrolytes are 5, 15, 25 and 40, respectively.

That is, with an increase of the value of n in the sulfoalkylated aromatic carbon solid electrolytes, the ionic conductance and the proton transportability increase, so that an excellent solid polymer electrolyte fuel cell can be obtained.

On the other hand, from the viewpoint of cost, the sulfopropylated aromatic hydrocarbon solid polymer electrolytes and the sulfobutylated aromatic hydrocarbon solid polymer electrolytes, which can be synthesized by a one-stage reaction with a sultone, are more advantageous than the sulfohexamethylated aromatic hydrocarbon solid polymer electrolytes and the sulfomethylated aromatic hydrocarbon solid polymer electrolytes, which are synthesized by a two-stage reaction. That is, the value of n is preferably 3 or 4 for reconciling the ionic conductance and the cost.

Since the present inventive polyether ether sulfone having sulfonic acid groups introduced thereinto through alkylene groups can be produced through one or two steps by using an inexpensive engineering plastic as a starting material, the cost of production thereof is as very low as less than one-thirtieth that of a fluorine-containing solid polymer electrolyte membrane represented by the perfluorocarbon sulfonic acid membranes produced through five steps by using an expensive starting material.

Thus, unlike bonding of sulfonic acid groups directly to the aromatic rings, bonding of sulfonic acid groups to the aromatic rings through alkylene groups gives a high ion electric conductivity, prevents the release of the sulfonic acid groups even in the presence of a strong acid and at a high temperature, and permits attainment of a high durability sufficient for practical purposes and reduction of the cost.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A solid polymer electrolyte membrane obtained from a solid polymer electrolyte comprising a polyether ether sulfone used as an electrolyte, said polyether ether sulfone having sulfoalkyl groups bonded thereto and represented by the formula [1]:

$$-(CH_2)_n-SO_3H \qquad [1]$$

wherein n is an integer of 1 to 6.

2. A membrane-electrodes assembly comprising a solid polymer electrolyte membrane and a pair of electrodes, that is, an oxygen electrode and a hydrogen electrode, which are located on both sides, respectively, of said solid polymer electrolyte membrane, wherein said solid polymer electrolyte membrane is a solid polymer electrolyte membrane according to claim 1.

3. A solid polymer electrolyte fuel cell comprising single cells for fuel cell which comprise a membrane-electrodes assembly comprising a solid polymer electrolyte membrane according to claim 1 and a pair of electrodes, that is, an oxygen electrode and a hydrogen electrode, which are located on both sides, respectively, of said solid polymer electrolyte membrane; a pair of supporting current collectors provided on both sides, respectively, of said membrane-electrodes assembly; and separators located at the peripheries of said supporting current collectors, respectively.

4. An electrocatalyst-coating solution comprising a solid polymer electrolyte that includes a polyether ether sulfone used as an electrolyte, said polyether ether sulfone having sulfoalkyl groups bonded thereto and represented by the formula [1]:

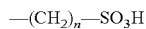  [1]

wherein n is an integer of 1 to 6.

5. A membrane-electrodes assembly comprising a solid polymer electrolyte membrane and a pair of electrodes, that is, an oxygen electrode and a hydrogen electrode, which are formed by coating with an electro-catalyst-coating solution and are located on both sides, respectively, of said solid polymer electrolyte membrane, wherein said solid polymer electrolyte membrane is that obtained by using a polyether ether sulfone having sulfoalkyl groups bonded thereto and represented by the formula [1]:

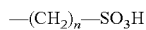  [1]

wherein n is an integer of 1 to 6, and the electro-catalyst-coating solution is an electrocatalyst-coating solution according to claim 4.

6. A membrane-electrodes assembly according to claim 5, wherein the electrocatalyst-coating solution is a perfluorocarbon sulfonic acid solid polymer electrolyte solution.

7. A fuel cell comprising a membrane comprising an electrolyte composed of an aromatic polyether ether sulfone used as a solid polymer electrolyte membrane, said polyether ether sulfone having sulfoalkyl groups bonded thereto and represented by the formula [1]:

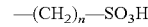  [1]

wherein n is an integer of 1 to 6.

8. A fuel cell according to claim 7, wherein the polyether ether sulfone is represented by the formula [2]:

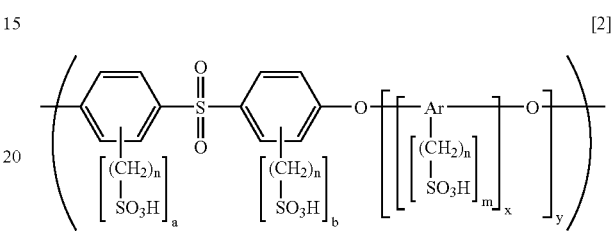

wherein n is an integer of 1 to 6, each of m, a and b is an integer of 0 to 4, provided that m, a and b are not 0 at the same time, x is an integer of 1 to 3, y is an integer of 1 to 5, and Ar is an aromatic residue.

9. A fuel cell according to claim 7, wherein the polyether ether sulfone is represented by the formula [3]:

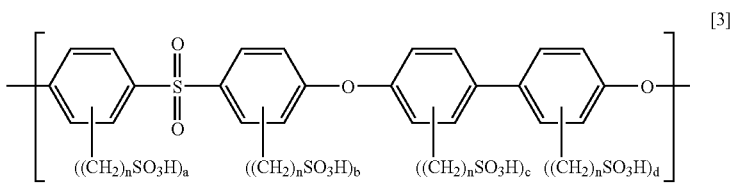

wherein n is an integer of 1 to 6, and each of a, b, c and d is an integer of 0 to 4, provided that a, b, c and d are not 0 at the same time.

10. A fuel cell according to claim 7, wherein the polyether ether sulfone is represented by the formula [4]:

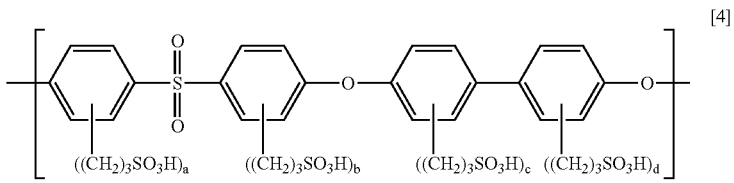

wherein each of a, b, c and d is an integer of 0 to 4, provided that a, b, c and d are not 0 at the same time.

11. A fuel cell according to claim 7, wherein the polyether ether sulfone is represented by the formula [5]:

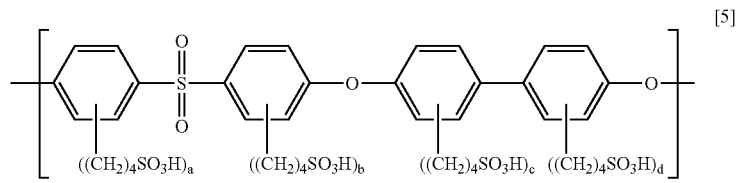

wherein each of a, b, c and d is an integer of 0 to 4, provided that a, b, c and d are not 0 at the same time.

12. A fuel cell according to claim 7, wherein the polyether ether sulfone is represented by the formula [6]:

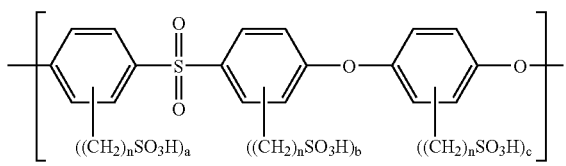

wherein n is an integer of 1 to 6, and each of a, b and c is an integer of 0 to 4, provided that a, b and c are not 0 at the same time.

13. A fuel cell according to claim 7, wherein the polyether ether sulfone is represented by the formula [7]:

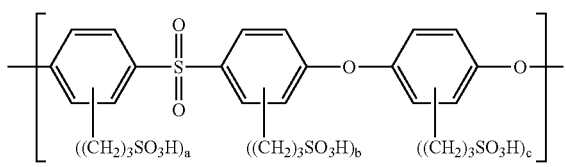

wherein each of a, b and c is an integer of 0 to 4, provided that a, b and c are not 0 at the same time.

14. A fuel cell according to claim 7, wherein the polyether ether sulfone is represented by the formula [8]:

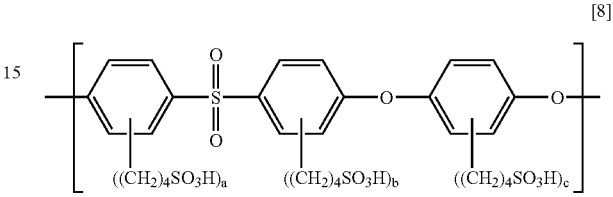

wherein each of a, b and c is an integer of 0 to 4, provided that a, b and c are not 0 at the same time.

15. A fuel cell according to claim 7, wherein the polyether ether sulfone is represented by the formula [9]:

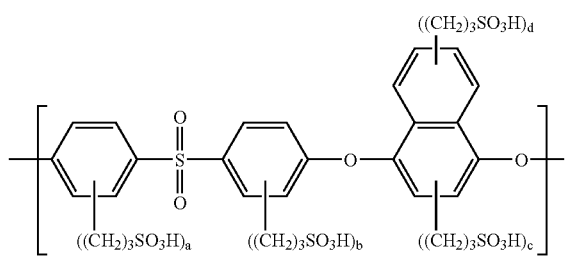

wherein each of a, b, c and d is an integer of 0 to 4, provided that a, b, c and d are not 0 at the same time.

16. A fuel cell according to claim 7, which has an ion-exchange group equivalent weight of 250 to 2500 g/equivalent.

17. A fuel cell according to claim 7, wherein the solid polymer electrolyte membrane has a thickness of 10 μm to 200 μm.

18. A fuel cell according to claim 17, wherein the ion-exchange group equivalent weight is 530 to 970 g/equivalent.

* * * * *